US012698761B2

(12) United States Patent
Steranka et al.

(10) Patent No.: US 12,698,761 B2
(45) Date of Patent: Aug. 4, 2026

(54) CENTRIFUGAL GYROSCOPIC DEVICES, AND ASSOCIATED SYSTEMS AND METHODS

(71) Applicants: Paul Steranka, Seattle, WA (US); Michele S. Sapuppo, Seattle, WA (US)

(72) Inventors: Paul Steranka, Seattle, WA (US); Michele S. Sapuppo, Andover, MA (US)

(73) Assignees: Paul Steranka, Seattle, WA (US); Michele Sapuppo, Seattle, WA (US)

( * ) Notice: Subject to any disclaimer, the term of this patent is extended or adjusted under 35 U.S.C. 154(b) by 139 days.

(21) Appl. No.: 18/596,537

(22) Filed: Mar. 5, 2024

(65) Prior Publication Data

US 2024/0352923 A1    Oct. 24, 2024

Related U.S. Application Data

(63) Continuation of application No. 18/301,178, filed on Apr. 14, 2023, now Pat. No. 11,959,465.

(Continued)

(51) Int. Cl.
*G01C 19/00* (2013.01)
*F03G 3/08* (2006.01)
(Continued)

(52) U.S. Cl.
CPC ............. *F03G 3/083* (2021.08); *G01C 19/00* (2013.01); *G01C 19/02* (2013.01); *H02K 7/02* (2013.01); *H02P 25/024* (2016.02)

(58) Field of Classification Search
CPC ....... F03G 3/083; H02P 25/024; G01C 19/00; G01C 19/02; G01C 19/04
See application file for complete search history.

(56) References Cited

U.S. PATENT DOCUMENTS 2,857,767 A    10/1958  Werndl
3,765,250 A    10/1973  Graefe
(Continued)

FOREIGN PATENT DOCUMENTS

WO    2007084090    7/2007

OTHER PUBLICATIONS

International Search Report and Written Opinion for International Patent Application No. PCT/US23/65822, Applicant: Steranka, Paul, mailed on Oct. 11, 2023, 14 pages.
(Continued)

*Primary Examiner* — George B Bennett

(74) *Attorney, Agent, or Firm* — Perkins Coie LLP

(57) ABSTRACT

Centrifugal gyroscopic devices are described herein. A representative device can include a shaft, an arm coupled to the shaft, a rotor coupled to the arm, and a control system operably coupled to the shaft, the arm, and/or the rotor. The shaft is rotatable about a first axis and the arm is configured to rotate with the shaft. The arm is pivotable about a second axis and the rotor is configured to pivot with the arm about the second axis. The rotor is further pivotable about a third axis. The control system is configured to bring the shaft, the arm, and the rotor into a resonant mode in which the shaft rotates at a rotational rate, the arm oscillates about the second axis at a first frequency substantially equal to the rotational rate, and the rotor oscillates about the third axis at a second frequency substantially equal to the first frequency.

20 Claims, 30 Drawing Sheets

Related U.S. Application Data

(60) Provisional application No. 63/332,196, filed on Apr. 18, 2022.

(51) Int. Cl.

| | |
|---|---|
| *G01C 19/02* | (2006.01) |
| *H02K 7/02* | (2006.01) |
| *H02P 25/024* | (2016.01) |

(56) References Cited

U.S. PATENT DOCUMENTS

| | | | | |
|---|---|---|---|---|
| 3,931,747 | A | | 1/1976 | Erspamer |
| 3,987,555 | A | * | 10/1976 | Haagens ................ G01C 19/28 |
| | | | | 33/324 |
| 4,030,371 | A | * | 6/1977 | Bulman ................ G01C 19/22 |
| | | | | 74/5 F |
| 5,457,993 | A | | 10/1995 | Sapuppo |
| 5,712,426 | A | | 1/1998 | Sapuppo |
| 5,915,275 | A | | 6/1999 | Cardarelli |
| 6,062,818 | A | | 5/2000 | Manfredotti |
| 7,900,874 | B2 | | 3/2011 | Fiala |
| 8,066,226 | B2 | | 11/2011 | Fiala |
| 8,079,258 | B1 | | 12/2011 | Sapuppo |
| 11,959,465 | B2 | | 4/2024 | Steranka et al. |
| 2009/0108136 | A1 | | 4/2009 | Suzuki |
| 2009/0183951 | A1 | | 7/2009 | Fiala et al. |
| 2021/0324837 | A1 | | 10/2021 | Abers |

OTHER PUBLICATIONS

Extended European Search Report and Opinion for European Patent Application No. 23792673.8, Applicant: Steranka et al., completed Feb. 26, 2026, 5 pages.

* cited by examiner

650

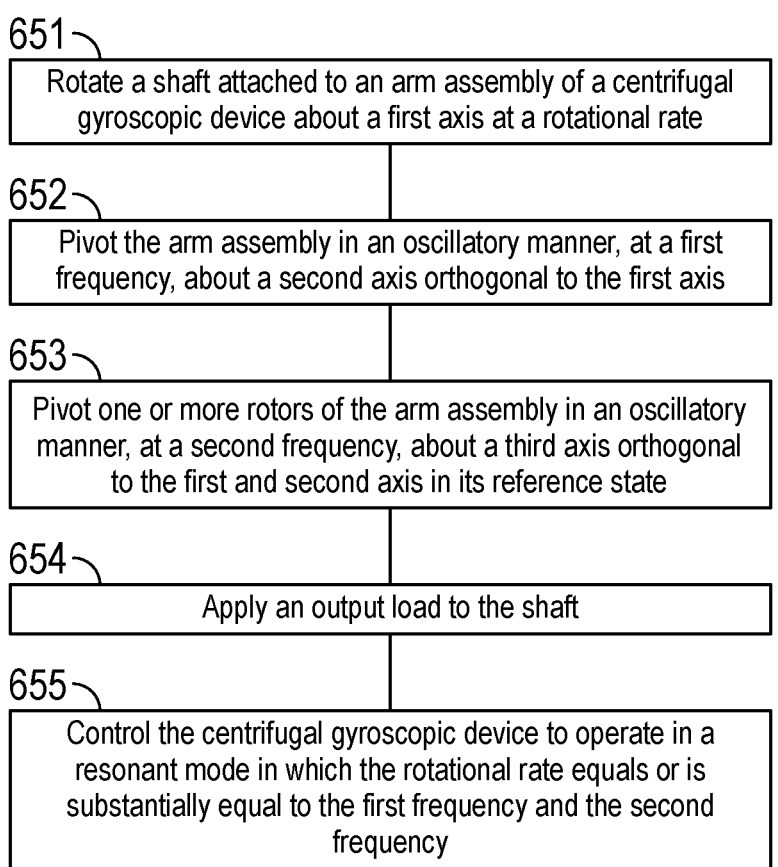

651
Rotate a shaft attached to an arm assembly of a centrifugal gyroscopic device about a first axis at a rotational rate 652
Pivot the arm assembly in an oscillatory manner, at a first frequency, about a second axis orthogonal to the first axis 653
Pivot one or more rotors of the arm assembly in an oscillatory manner, at a second frequency, about a third axis orthogonal to the first and second axis in its reference state 654
Apply an output load to the shaft 655
Control the centrifugal gyroscopic device to operate in a resonant mode in which the rotational rate equals or is substantially equal to the first frequency and the second frequency

Rotor3 Torque vs Speed
Spindle = 3.19, Osc = 3.13
Arm Held by Arm Motor

Rotor Speed (rev/s)

Torque (N-m)

*FIG. 16E*

Rotor3 Torque vs Speed
Rotor3 Amplitude = 36 deg
Spindle = 3.19 Hz, Osc = 3.13 Hz
Arm Free to Move Rotor3 Torque (N-m)

Speed (rev/s)

*FIG. 16F*

CENTRIFUGAL GYROSCOPIC DEVICES, AND ASSOCIATED SYSTEMS AND METHODS

CROSS-REFERENCE TO RELATED APPLICATIONS

This application is a continuation of U.S. patent application Ser. No. 18/301,178, filed on Apr. 14, 2023, and titled "CENTRIFUGAL GYROSCOPIC DEVICES, AND ASSO-CIATED SYSTEMS AND METHODS," which claims the benefit of U.S. Provisional Patent Application No. 63/332,196, filed on Apr. 18, 2022, and titled "CENTRIFUGAL GYROSCOPIC DEVICES, AND ASSOCIATED SYS-TEMS AND METHODS," each of which are incorporated herein by reference in its entirety.

TECHNICAL FIELD

The present technology is directed to centrifugal gyro-scopic devices for generating power and/or efficiently sum-ming energy, and associated systems and methods.

BACKGROUND

U.S. Pat. No. 5,457,993, titled "Pendulous Oscillating Gyroscopic Accelerometer," describes a pendulous oscillat-ing gyroscopic accelerometer. The accelerometer utilizes the principle that a gyroscopic torque is generated when an oscillating gyroscope is oscillated about a transverse axis. When the gyroscopic torque is balanced by a pendulous torque, a measurement of acceleration is provided. If the accelerometer is attached to the earth, gravity is measured. As such, the accelerometer operates as a sensing device.

BRIEF DESCRIPTION OF THE DRAWINGS

Many aspects of the present technology can be better understood with reference to the following drawings. The components in the drawings are not necessarily to scale. Instead, emphasis is placed on clearly illustrating the prin-ciples of the present technology.

FIG. 6 is a flow diagram of a method or process for operating a centrifugal gyroscopic device to generate power in accordance with embodiments of the present technology.

FIGS. 16A-16F are graphs illustrating sample test results for the effects of oscillation of the arm assembly on the torque of the rotors of the centrifugal gyroscopic device of FIGS. 1A-1C.

DETAILED DESCRIPTION

Figure 1A:
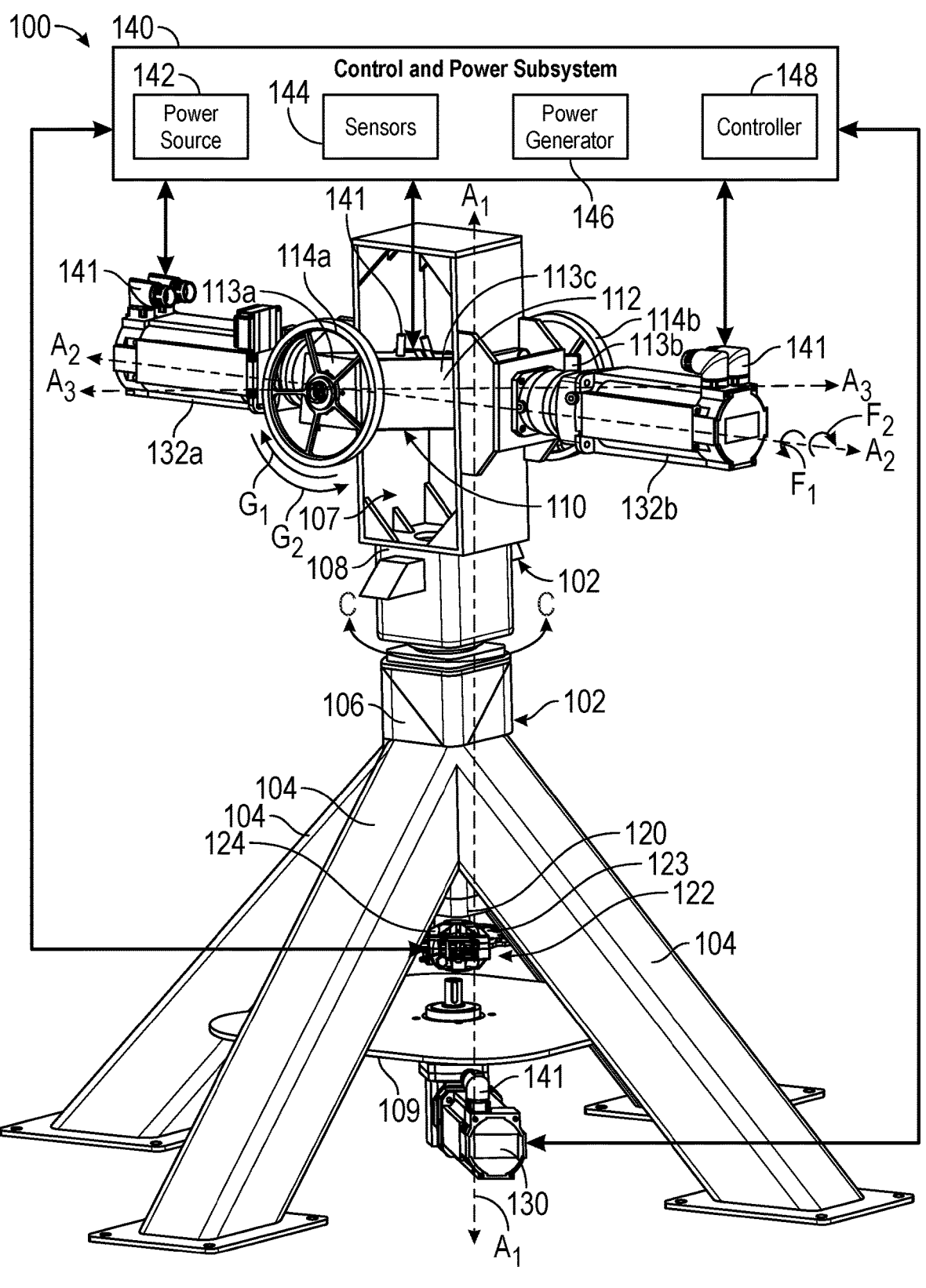
FIGS. 1A and 1B are partially-schematic isometric views of a centrifugal gyroscopic device continued in accordance with embodiments of the present technology.

Aspects of the present disclosure are directed generally toward centrifugal gyroscopic devices for generating power and/or efficiently summing energy, and associated systems and methods. In several of the embodiments described below, a representative centrifugal gyroscopic device includes (i) a shaft, (ii) an arm coupled to the shaft, (iii) at least one rotor coupled to the arm, and (iv) a control system operably coupled to at least one of the shaft, the arm, and the rotor. The shaft is rotatable about a first axis and the arm is configured to rotate with the shaft. The arm is pivotable about a second axis different from the first axis, and the at least one rotor is configured to pivot with the arm about the second axis. The at least one rotor is further pivotable about a third axis different from the first and second axes. The control system is configured to bring the shaft, the arm, and the rotor into a resonant mode of operation in which (a) the shaft rotates at a rotational rate, (b) the arm oscillates about the second axis at a first frequency generally equal to the rotational rate, and (c) the at least one rotor oscillates about the third axis at a second frequency generally equal to the first frequency. Energy can be input into the device via the control system to control the motion of the shaft, the arm, and the rotor; and energy can be output from the device via the shaft, such as via a power generator coupled to the shaft and configured to convert the mechanical energy from the rotation of the shaft into electrical energy.

During operation, the rotation of the shaft rotates the arm and generates a centrifugal force that acts against the arm to oscillate the arm about the second axis. The oscillating motion of the arm and the at least one rotor combine to generate a gyroscopic torque that acts to rotate the shaft about the first axis. In some embodiments, the control system is configured to change a phase relationship between the frequency of the oscillation of the arm about the second axis and the frequency of the oscillation of the at least one rotor about the third axis to change an average value of the gyroscopic torque. For example, the control system can drive the arm and/or the at least one rotor via one or more motor assemblies to bring the frequency of the oscillation of the arm about the second axis and the frequency of the oscillation of the at least one rotor about the third axis more into phase to increase the gyroscopic torque.

In some aspects of the present technology, it is expected that the net energy output from the device will exceed the net energy input into the device via the control system. In some aspects of the present technology, the device can provide an energy output that is more efficient than conventional motor assemblies-even if the energy output from the device is not greater than the energy input to the device. Specifically, the control system can include one or more relatively small motor assemblies configured to drive the shaft, the arm, and/or the rotors. The power input to each of the motor assemblies can be relatively small compared to the total power output of the device via the shaft. Such smaller motors can be relatively more efficient than a comparable motor assembly configured to directly rotate the shaft to achieve the same output power. Therefore, the arrangement of the device can advantageously allow for the power inputs from several smaller motor assemblies to drive a series of motions (e.g., oscillations and rotations) that efficiently combine to generate a relatively larger power output.

Certain details are set forth in the following description and in FIGS. 1-16F to provide a thorough understanding of various embodiments of the present technology. In other instances, well-known structures, materials, operations, and/ or systems often associated with gyroscopes, oscillating and rotating systems, generators, motors, pivotable couplings, and the like, are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. The terminology used below is to be interpreted in its broadest reasonable manner, even though it is being used in conjunction with a detailed description of certain examples of embodiments of the technology.

The accompanying Figures depict embodiments of the present technology and are not intended to limit its scope unless expressly indicated. The sizes of various depicted elements are not necessarily drawn to scale, and these various elements may be enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the present technology. In addition, those of ordinary skill in the art will appreciate that further embodiments of the present technology can be practiced without several of the details described below.

To the extent any materials incorporated herein by reference conflict with the present disclosure, the present disclosure controls. The headings provided herein are for convenience only and should not be construed as limiting the subject matter disclosed.

Figure 1B:
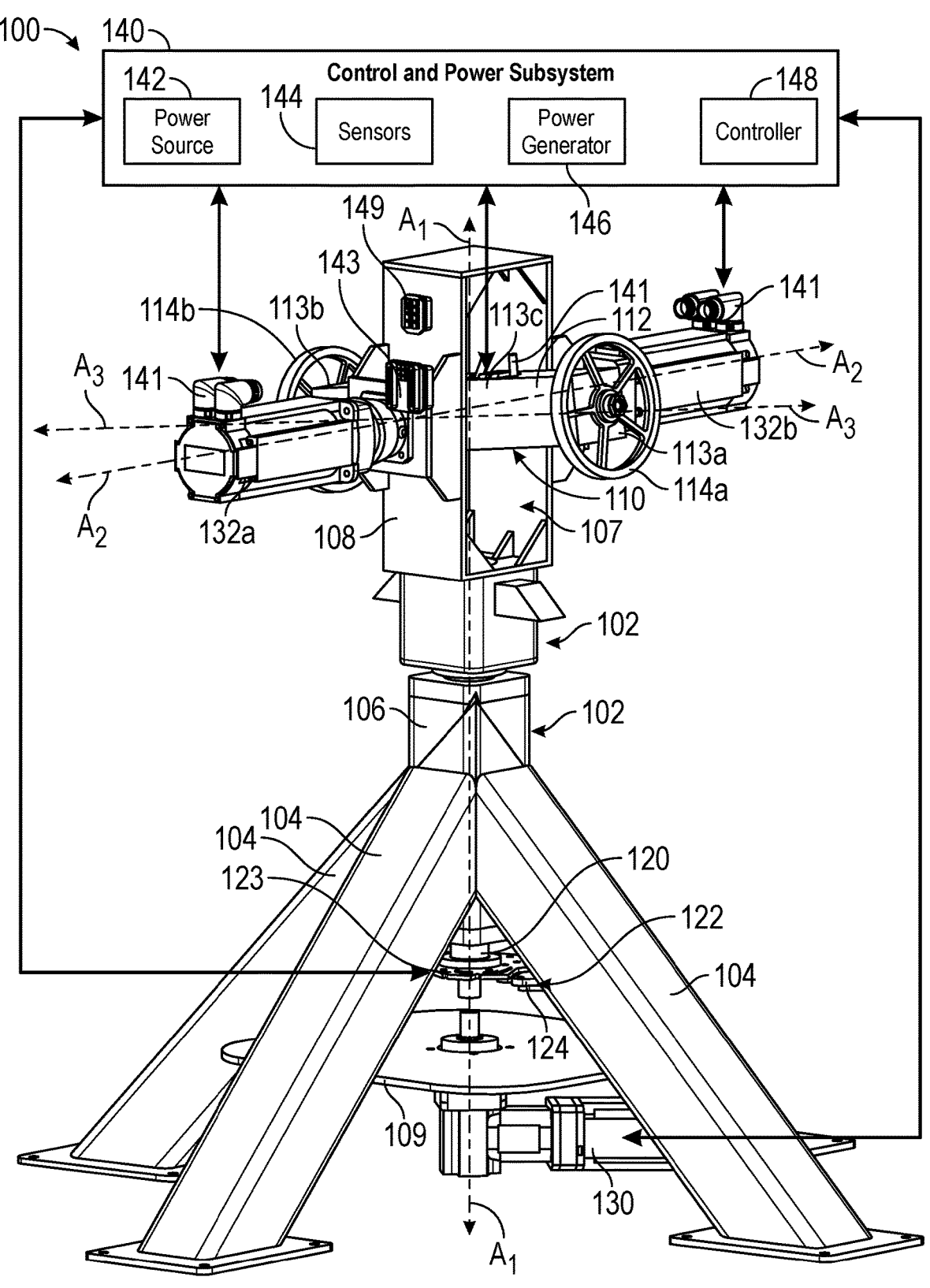
Figure 1C:
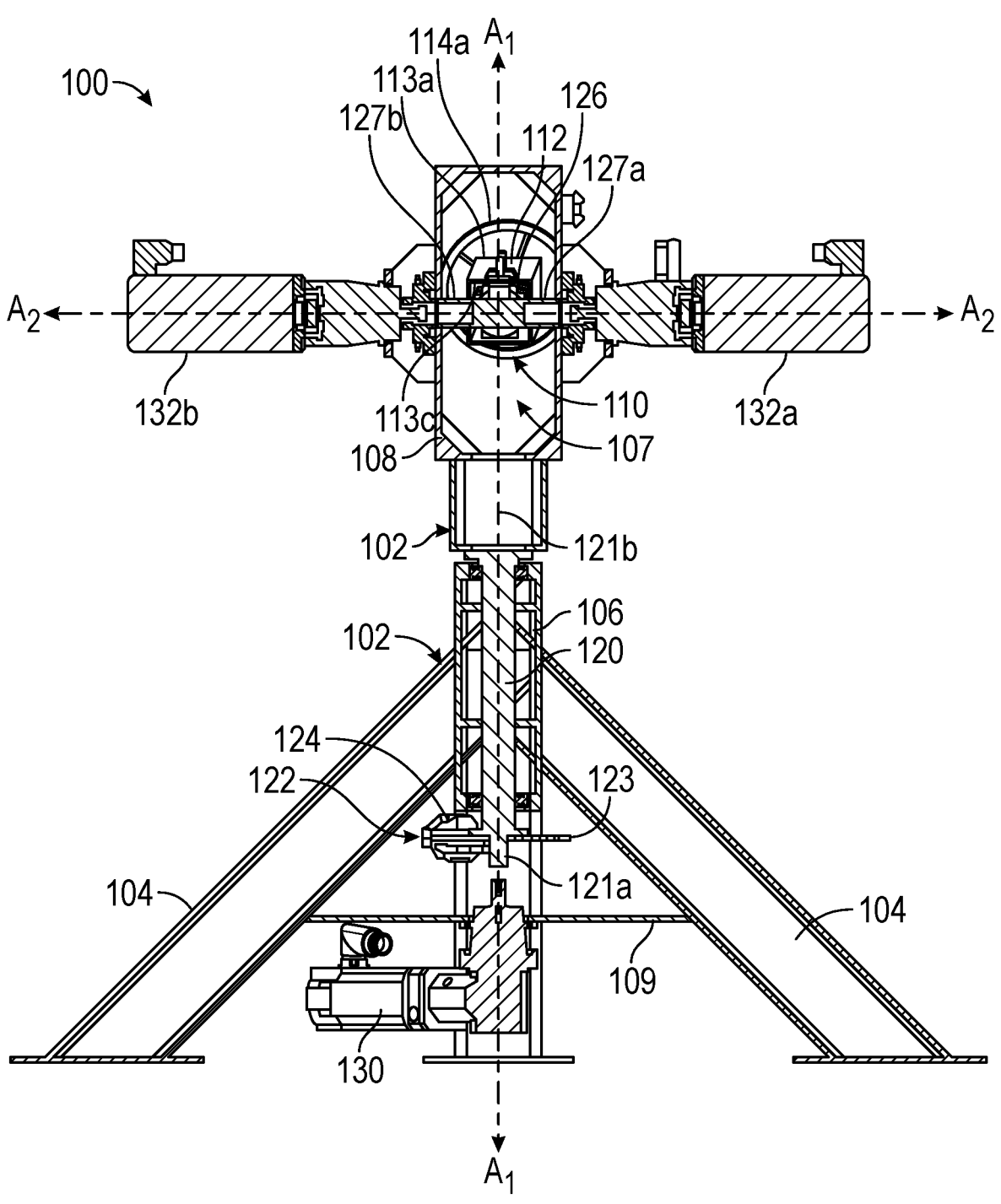
FIG. 1C is a side-cross sectional view of the centrifugal gyroscopic device taken in a plane extending along a first axis and a second axis of the centrifugal gyroscopic device in accordance with embodiments of the present technology.

I. Select Embodiments of Centrifugal Gyroscopic Devices and Associated Systems and Methods FIGS. 1A and 1B are partially-schematic isometric views of a centrifugal gyroscopic device 100 ("device 100") configured in accordance with embodiments of the present technology. The view in FIG. 1B is rotated by about 90 degrees relative to the view shown in FIG. 1A. FIG. 1C is a side-cross sectional view of the device 100 take along a plane extending along a first axis $A_1$ and a second axis $A_2$ of the device 100 in accordance with embodiments of the present technology. Referring to FIGS. 1A-IC together, in the illustrated embodiment the device 100 includes a frame 102 comprising (i) a plurality of legs 104 (e.g., four legs), (ii) a lower support 106 coupled to or integrally formed with the legs 104 (e.g., upper portions thereof), and (iii) an upper support 108 rotatably coupled to the lower support 106 and the legs 104 via a first shaft 120 (best seen in FIG. 1C; e.g., a spindle, a drive shaft, an output shaft, and/or an elongate member). The upper support 108 is rotatable about the first axis $A_1$ (e.g., a spindle axis, a vertical axis, and/or an output axis). In some embodiments, the device 100 can be oriented such that the first axis $A_1$ extends generally parallel to a surrounding gravitational field. The legs 104 can be fixedly secured (e.g., via one or more fasteners) to the ground, a floor, and/or another surface. In some embodiments, the frame 102 further includes a plate 109 secured between the legs 104.

In the illustrated embodiment, the device 100 further includes an arm assembly 110 pivotably mounted to the upper support 108 within an opening 107 therein via a second shaft 126 (FIG. 1C) extending along the second axis $A_2$. The arm assembly 110 can also be referred to as an arm, a torque-summing assembly, and/or the like. The arm assembly 110 includes (i) a housing 112 containing one or more motor assemblies as described in detail below with reference to FIG. 4, and (ii) a pair of rotors 114 (which can also be referred to as masses; identified individually as a first rotor 114a and a second rotor 114b) pivotably mounted to the housing 112. More specifically, the first rotor 114a can be pivotably coupled to/at a first end portion 113a of the housing 112 and the second rotor 114b can be pivotably coupled to/at a second end portion 113b of the housing 112 opposite the first end portion 113a. The housing 112 further includes a central portion 113c between the first and second end portions 113a-b that is pivotably coupled to the housing 112 via the second shaft 126 such that the arm assembly 110 is pivotable about the second axis $A_2$ (e.g., an arm axis, and/or a hinge axis) orthogonal to the first axis $A_1$. The rotors 114 are each independently pivotable about a third axis $A_3$ (e.g., a rotor axis, and/or a momentum reference axis) orthogonal to the first axis Aj and the second axis $A_2$ in its reference state. In some embodiments, the lower support 106 and/or the upper support 108 can be omitted and/or the first shaft 120 can be directly coupled to the arm assembly 110.

As best seen in FIG. 1C, the first shaft 120 extends through an interior of the lower support 106 along the first axis $A_1$ and includes a lower end portion 121a and an upper end portion 121b. In some embodiments, the lower support 106 can at least partially support the first shaft 120 via one or more bearings (not shown). The upper end portion 121b of the first shaft 120 is coupled to the upper support 108. Referring to FIGS. 1A-1C together, the device 100 includes a shaft motor assembly 130 coupled to the plate 109 and operably coupled to the lower end portion 121a of the first shaft 120. The shaft motor assembly 130 can include a motor (e.g., a rotary motor) and associated gearbox and is configured to drive the first shaft 120 to rotate about the first axis $A_1$ in a clockwise and/or counterclockwise direction as indicated by arrow C in FIG. 1A to drive the upper support 108 and arm assembly 110 to rotate together about the first axis $A_1$. Although the first shaft 120 is shown as spaced apart from the shaft motor assembly 130 in FIGS. 1A-1C for clarity, these components can be directly attached together and/or operably coupled together via an intervening structure such as a link, coupling, shaft, and/or the like.

In some embodiments, the device 100 can further include a brake mechanism 122 operably coupled to the first shaft 120. The brake mechanism 122 can include a brake plate 123 fixed to the first shaft 120 and a brake actuator 124 configured to selectively engage the brake plate 123 to slow or stop a rotational rate of the first shaft 120. In some embodiments, the brake mechanism 122 can include other components for selectively slowing the rotational rate of the first shaft 120. In some embodiments, the brake mechanism 122 can be omitted and/or the shaft motor assembly 130 can be configured to brake/slow rotation of the first shaft 120.

Figure 2:
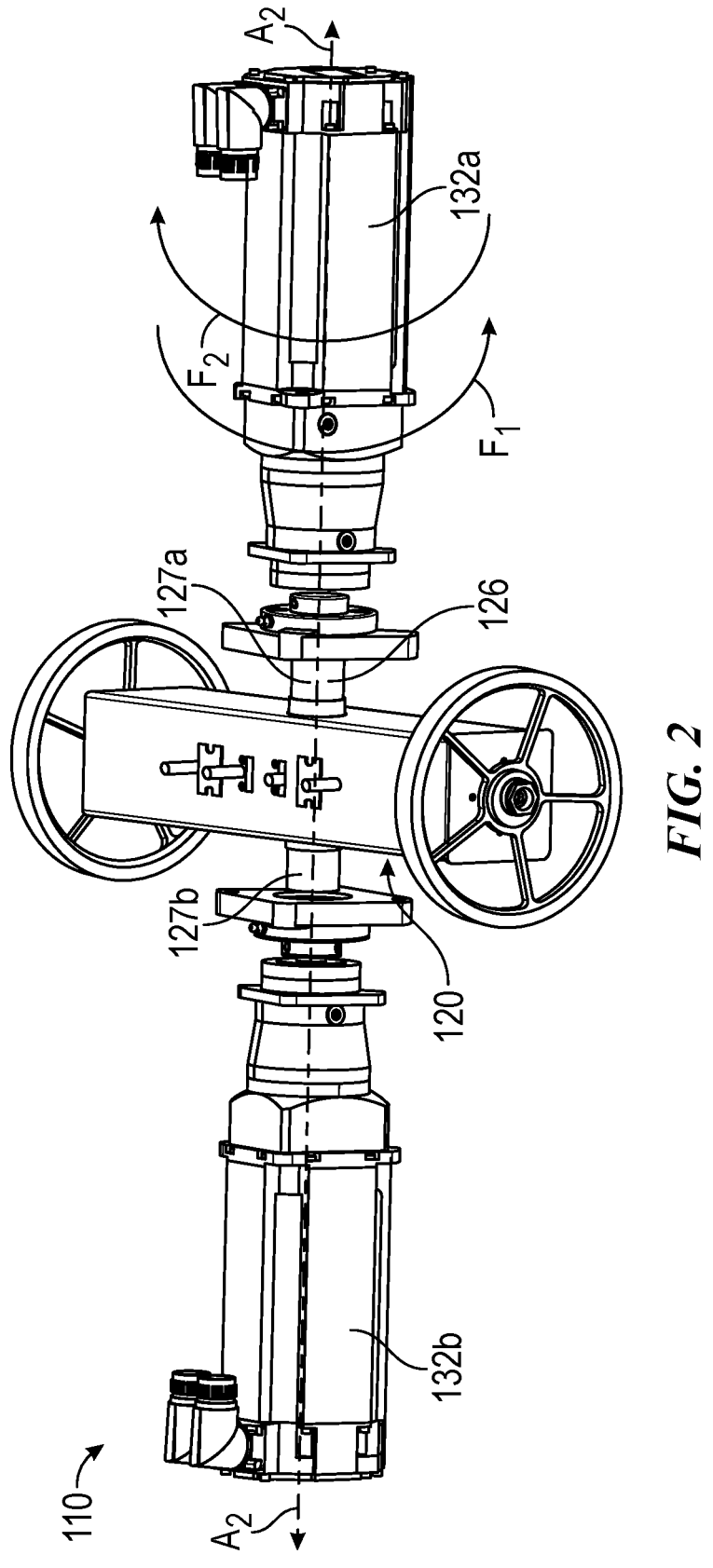
FIG. 2 is an isometric view of a representative arm assembly and arm motor assemblies of the centrifugal gyroscopic device in accordance with embodiments of the present technology.

In the illustrated embodiment, the device 100 further includes a pair of arm motor assemblies 132 (individually identified as a first arm motor assembly 132a and a second arm motor assembly 132b) coupled to the upper support 108 and operably coupled to the arm assembly 110. FIG. 2 is an isometric view of the arm assembly 110 and arm motor assemblies 132, configured in accordance with representative embodiments of the present technology. Referring to FIGS. 1C and 2 together, more specifically, the second shaft 126 can include a first end portion 127a operably coupled to the first arm motor assembly 132a and a second end portion 127b operably coupled to the second arm motor assembly 132b. The arm motor assemblies 132 can include a motor (e.g., a rotary motor) and associated gearbox and are configured to drive the second shaft 126 (FIG. 1C) to rotate about the second axis $A_2$ to drive the arm assembly 110 to pivot about the second axis $A_2$ in a first direction and/or a second direction as indicated by arrows $F_1$ and $F_2$, respectively, in FIGS. 1A and 2. In some embodiments, the arm assembly 110 is constrained (e.g., via one or more mechanical means) to pivot about the second axis $A_2$ in the direction of arrows $F_1$ and $F_2$ by a selected (e.g., predetermined) maximum amplitude. In some embodiments, the arm motor assemblies 132 are identical and are positioned and oriented to be symmetric about the first axis $A_1$. Accordingly, the arm motor assemblies 132 can together define a center of mass positioned along or substantially along the first axis $A_1$. In some embodiments, the device 100 can include only a single one of the arm motor assemblies 132 or more than two of the arm motor assemblies 132.

Figure 3:
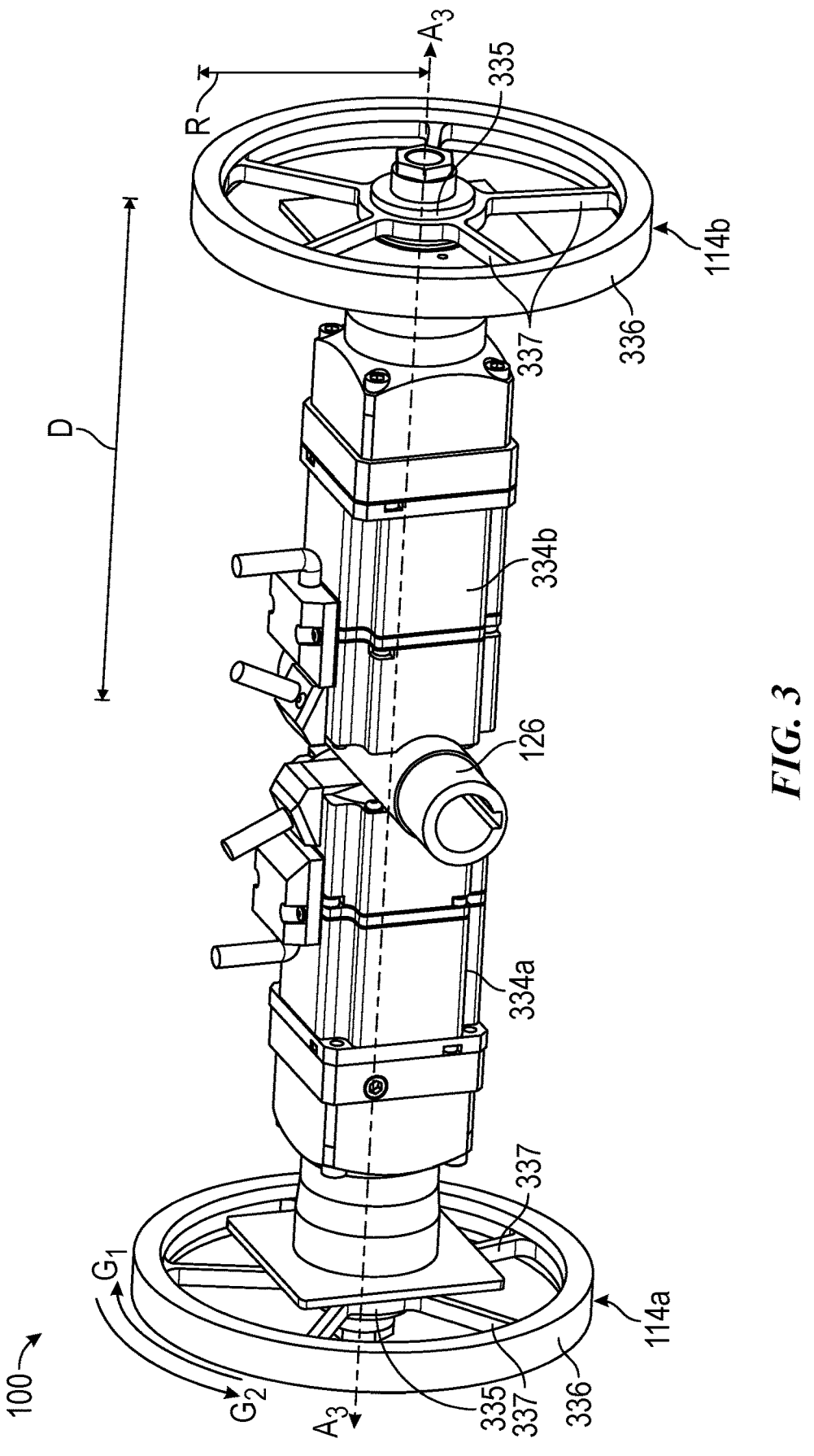
FIG. 3 is an isometric side view of a representative arm assembly of the centrifugal gyroscopic device with a hous-ing of the arm assembly removed in accordance with embodiments of the present technology.

FIG. 3 is an isometric side view of the arm assembly 110 with the housing 112 (FIGS. 1A-1C) omitted for clarity in accordance with embodiments of the present technology. In the illustrated embodiment, the arm assembly 110 includes a pair of rotor motor assemblies 334 (individually identified as a first rotor motor assembly 334a and a second rotor motor assembly 334b) secured within the housing 112 on opposing sides of the second shaft 126. The first and second rotor motor assemblies 334a-b can each include a motor (e.g., a rotary motor) and associated gearbox and are configured to drive the first rotor 114a and the second rotor 114b, respectively, to pivot about the third axis $A_3$ in a first direction and/or a second direction as indicated by arrows $G_1$ and $G_2$, respectively, in FIG. 1A. In some embodiments, the rotors 114 are constrained (e.g., via one or more mechanical means) to pivot about the third axis $A_3$ in the direction of arrows $G_1$ and $G_2$ by a selected (e.g., predetermined) amplitude. In some embodiments, the rotor motor assemblies 334 are identical and are positioned and oriented to be symmetric about the first axis $A_1$ and the second axis $A_2$. Accordingly, the rotor motor assemblies 334 can together define a center of mass positioned along or substantially along the second axis $A_2$. In some embodiments, the device 100 can include only a single one of the rotor motor assemblies 334 or more than two of the rotor motor assemblies 334.

With continued reference to FIG. 3, in some embodiments the rotors 114 can be identical—for example, having the same shape, mass, density, geometry, and/or the like. In some embodiments, the rotors 114 can have a wheel-and-spoke shape such that they are each symmetric about the third axis $A_3$. More specifically, the rotors 114 can each include a central portion 335 coupled to the corresponding one of the rotor motor assemblies 334, an outer portion 336 (e.g., an outer ring), and a plurality of spokes 337 extending radially outward from the central portion 335 and the third axis $A_3$ and connecting the central portion 335 to the outer portion 336. In some embodiments, the outer portion 336 can have a greater mass than the central portion 335 such that a majority of the mass of the rotor 114 is positioned radially outward from the third axis $A_3$. In some embodiments, the rotors 114 can have different shapes, sizes, and/or configurations, and/or one of the rotors 114 can be omitted. For example, in some embodiments each of the rotors 114 can have a planar disc-shape. In some embodiments, the rotors 114 are each positioned at a distance D from the second shaft 126 and the second axis $A_2$ and each have a radius R. The distance D, the radius R, and/or the shape of the rotors 114 can be selected to change the inertia and/or torque-summing properties of the arm assembly 110 as described in greater detail below. In some embodiments, the device 100 includes only one of the rotors 114 such that the arm assembly 110 is pendulously arranged.

Referring to FIGS. 1A and 1B together, the device 100 can further include a control and power subsystem 140 that in turn includes one or more power sources 142, one or more sensors 144, one or more power generators 146, and a controller 148. The control and power subsystem 140 can be operably coupled to the shaft motor assembly 130, the arm motor assemblies 132, the rotor motor assemblies 334 (FIG. 3), the brake mechanism 122, and/or other components of the device 100 via wired and/or wireless connections. For example, in the illustrated embodiment the shaft motor assembly 130, the arm motor assemblies 132, and the rotor motor assemblies 334 each have one or more electrical connectors 141 that can be electrically coupled to the control and power subsystem 140 for passing data, power, and/or other signals therebetween.

The power source 142 can be an AC power source and/or a DC power source and, in some embodiments, can include/comprise a servo drive 143 (FIG. 1B) coupled to the upper support 108 or elsewhere. The power source 142 can provide electrical power to the shaft motor assembly 130, the arm motor assemblies 132, and the rotor motor assemblies 334. The sensors 144 can include one or more sensors configured (e.g., positioned) for detecting (i) a rotational and/or pivotal rate of the first shaft 120, the arm assembly 110, and/or the rotors 114, (ii) a power usage of the shaft motor assembly 130, the arm motor assemblies 132, and/or the rotor motor assemblies 334, and/or (iii) a power output of the device 100 (e.g., via the power generator 146), and/or the like. The power generator 146 can be or can include a dynamo or other suitable generator coupled to the first shaft 120 for converting the mechanical rotation of the first shaft 120 to electrical energy.

In some embodiments, the power generator 146 can comprise/include the shaft motor assembly 130. That is, the shaft motor assembly 130 can drive the first shaft 120 to rotate in a first operating configuration and convert the rotation of the first shaft 120 to electrical energy in a second operating configuration. In some embodiments, the power generator 146 can be or can include a mechanical device for converting the mechanical rotation of the first shaft 120 to another useful output. In some embodiments, the power generator 146 can generate electrical energy and provide the electrical energy to the power source 142 or directly to the shaft motor assembly 130, the arm motor assemblies 132, and/or the rotor motor assemblies 334. That is, the power generator 146 can function as the power source 142 and/or can provide feedback to the power source 142. In other embodiments, the power generator 146 can comprise/include one or both of the arm motor assemblies 132. That is, the arm motor assemblies 132 can drive the second shaft 126 to pivot in a first operating configuration and convert the pivotable motion of the second shaft 126 to electrical energy (and/or another useful output, such as mechanical energy) in a second operating configuration.

The controller 148 can receive data from the sensors 144 and control the power source 142 to operate the shaft motor assembly 130, the arm motor assemblies 132, and/or the rotor motor assemblies 334. Specifically, as described in further detail below, the controller 148 can cause (i) the shaft motor assembly 130 to rotate the first shaft 120 at a selected (e.g., predetermined) rotational rate about the first axis $A_1$, (ii) the arm motor assemblies 132 to pivot the arm assembly 110 about the second axis $A_2$ at a selected amplitude and frequency, and (iii) the rotor motor assemblies 334 to pivot the rotors 114 about the third axis $A_3$ at a selected amplitude and frequency. In some embodiments, the controller 148 can include/comprise a printed circuit board (PCB) 149 (FIG. 1B) coupled to the upper support 108 or elsewhere.

The controller 148 can comprise a processor and a non-transitory computer-readable storage medium that stores instructions that, when executed by the processor, carry out the functions attributed to the controller 148 as described herein. Although not required, aspects and embodiments of the present technology can be described in the general context of computer-executable instructions, such as routines executed by a general-purpose computer (e.g., a server or personal computer). Those skilled in the relevant art will appreciate that the present technology can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The present technology can be embodied in a special purpose computer or data processor that is specifically programmed, configured and/or constructed to perform one or more of the computer-executable instructions explained in detail below. Indeed, the terms "controller" and "computer" (and like terms), as used generally herein, refers to any of the above devices, as well as any suitable data processor or any suitable device capable of communicating with a network, including consumer electronic goods or other electronic devices having a processor and other components (e.g., network communication circuitry).

The present technology can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or sub-routines can be located in both local and remote memory storage devices. Aspects of the present technology described below can be stored or distributed on computer-readable media, including magnetic and optically readable and removable computer discs, stored as in chips (e.g., EEPROM or flash memory chips). Alternatively, aspects of the present technology can be distributed electronically over the Internet or over other networks (including wireless networks). Those skilled in the relevant art will recognize that portions of the present technology can reside on a server computer, while corresponding portions reside on a client computer. Data structures and transmission of data particular to aspects of the present technology are also encompassed within the scope of the present technology.

In some embodiments, the control and power subsystem 140, the shaft motor assembly 130, the arm motor assemblies 132, the rotor motor assemblies 334 can together be referred to as a "control system" or the like for controlling the motion of the first shaft 120, the arm assembly 110, and the rotors 114. Referring to FIGS. 1A-3 together, in general during operation of the device 100, the control system is configured to control a rotation rate of the first shaft 120 about the first axis $A_1$, a frequency and/or amplitude of oscillation of the arm assembly 110 about the second axis $A_2$, and a frequency and/or amplitude of oscillation of the rotors 114 about the third axis $A_3$. More specifically, the shaft motor assembly 130 can direct the first shaft 120 and the coupled arm assembly 110 to rotate about the first axis $A_1$ at and/or to a selected rotational rate. The rotating arm assembly 110 generates a centrifugal force that acts against the arm assembly 110 to oscillate the arm assembly 110 about the second axis $A_2$ in the directions indicated by arrows $F_1$ and $F_2$ in FIG. 1A. In some embodiments, the arm motor assemblies 132 can drive the arm assembly 110 about the second axis $A_2$ (augmenting the centrifugal force acting against the arm assembly 110) such that the arm assembly 110 oscillates at a selected frequency and maximum amplitude. The resulting motion of the arm assembly 110 can be periodic (e.g., sinusoidal). The maximum angular amplitude is limited by the torque due to the centrifugal force from the rotation of the arm assembly 110.

The rotor motor assemblies 334 can drive the rotors 114 to pivot about the third axis $A_3$ in an oscillatory/modulated manner in which the rotors 114 pivot in the directions indicated by arrows $G_1$ and $G_2$ (FIG. 1A) about the third axis $A_3$ to a selected frequency and maximum angular amplitude. The resulting motion of the rotors 114 can be periodic (e.g., sinusoidal). In some embodiments, the periodic motion of the first rotor 114a is opposite (e.g., 180 degrees out of phase with) the periodic motion of the second rotor 114b and at the same frequency such that the rotors 114 move in opposite directions past one another and reach their maximum angular amplitudes in opposite directions at the same time or at least approximately the same time.

In some embodiments, the power source 142 can supply an oscillatory/modulated voltage to the arm motor assemblies 132 and the rotor motor assemblies 334 to generate the oscillatory motion of the arm assembly 110 and the rotors 114. The oscillatory angular momentum of the rotors 114 and the arm assembly 110 together exert a gyroscopic torque on the first shaft 120 about the first axis $A_1$ that acts to rotate the first shaft 120. Accordingly, the rotation of the first shaft 120 drives the arm assembly 110 to oscillate about the second axis $A_2$, and the resulting oscillation of the arm assembly 110 and the oscillation of the rotors 114 acts to drive the rotation of the first shaft 120 in a feed-back loop. The mechanical rotation of the first shaft 120 can be coupled to the power generator 146 for generating output power.

Figure 4:
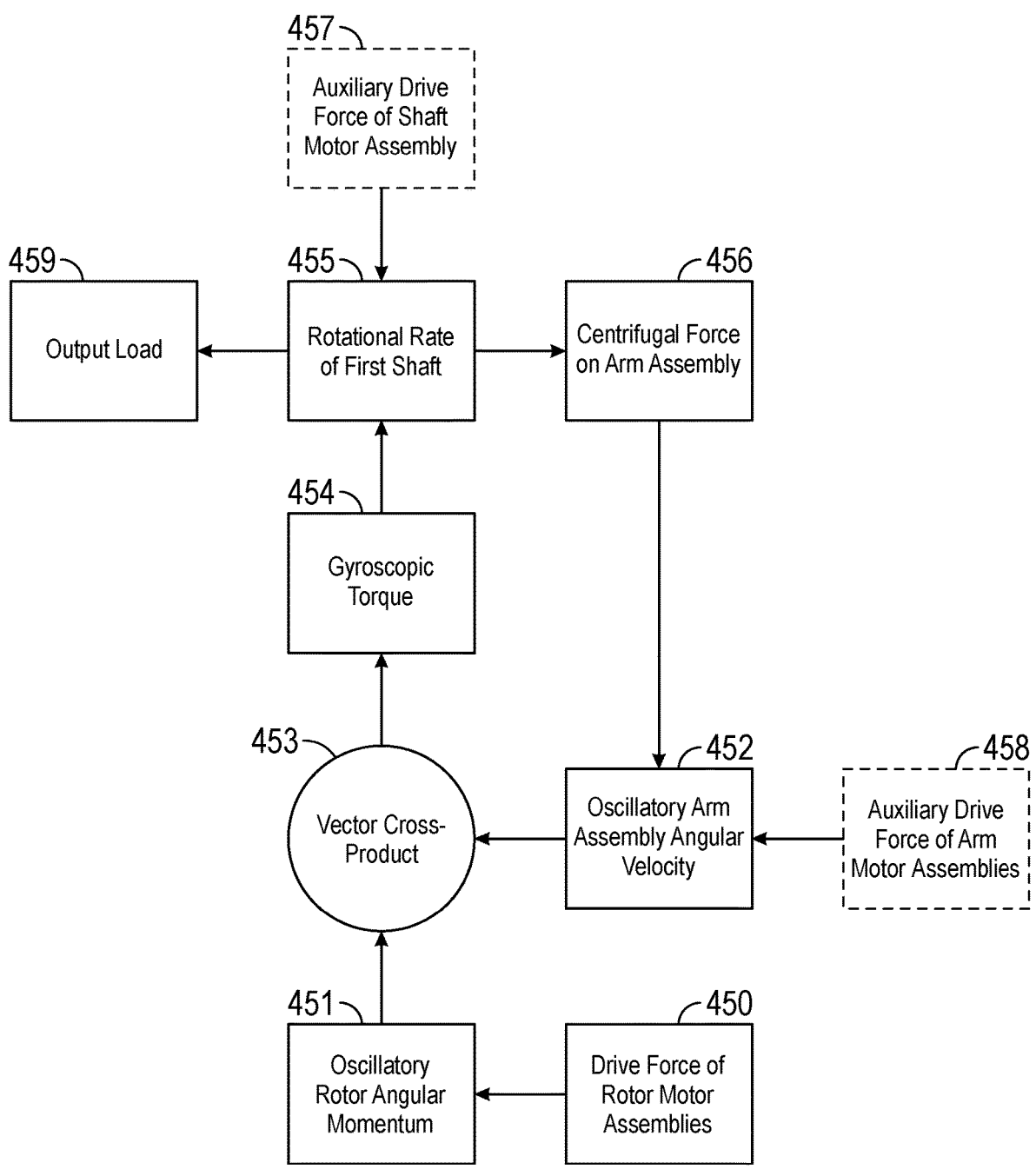
FIG. 4 is block diagram illustrating physical properties/forces acting on a centrifugal gyroscopic device during operation in accordance with embodiments of the present technology.

FIG. 4 is block diagram more specifically illustrating representative physical properties/forces as the device 100 operates in accordance with embodiments of the present technology. With additional reference to FIGS. 1A-3, in the illustrated embodiment, the rotor motor assemblies 334 provide a drive force 450 that oscillates the rotors 114 about the third axis $A_3$. The oscillation of the rotors 114 generates an oscillatory rotor angular momentum 451. The oscillation of the arm assembly 110 about the second axis $A_2$ generates an oscillatory arm assembly angular velocity 452. The oscillatory rotor angular momentum 451 and the oscillatory arm assembly angular velocity 452 generate a gyroscopic torque 454 about the first axis $A_1$ defined as the vector cross-product 453 thereof. The gyroscopic torque 454 has an oscillating magnitude and average value, which drives the first shaft 120 to rotate at a rotational rate 455. The rotation of the first shaft 120 can deliver mechanical energy to an output load 459, such as the power generator 146. The rotation of the first shaft 120 also rotates the arm assembly 110, thereby generating a centrifugal force 456 on the arm assembly 110 that acts to oscillate the arm assembly 110 about the second axis $A_2$ and generate the oscillatory arm assembly angular velocity 452. Torque generated on the arm assembly 110 by the centrifugal force 456 reaches a maximum value when the arm assembly is oriented at a 45 degree angle relative to the second axis $A_2$ (e.g., above or below horizontal) and is always directed toward the horizontal. As such, the torque due to the centrifugal force 456 can (i) be the primary force that drives the arm assembly 110 to have the oscillatory arm angular velocity 452 and (ii) limit the angular excursion of the arm assembly 110 about the second axis $A_2$ (e.g., with a maximum angular excursion typically of about 45 degrees).

In some embodiments, the shaft motor assembly 130 can provide an auxiliary drive force 457 that augments the gyroscopic torque 454 to control the rotational rate 455 of the first shaft 120. In some embodiments, the shaft motor assembly 130 can provide the input auxiliary drive force 457 initially during startup of the device 100 until the first shaft 120 is rotating at or near a desired rotational rate. Likewise, in some embodiments the arm motor assemblies 132 can provide an auxiliary drive force 458 that oscillates the arm assembly 110 to control the oscillatory arm assembly angular velocity 452.

In some embodiments, the device 100 is configured to operate in a "resonant" mode or at least approximately resonant mode (e.g., within at least 1%, 2%, 5%, 8%, or 10% of resonance) in which the gyroscopic torque 454 is maximized or approximately maximized. In some embodiments, in the resonant mode, the rotational rate of the first shaft 120 (and the arm assembly 110) about the first axis $A_1$ equals or at least approximately equals an oscillation frequency of the arm assembly 110 about the second axis $A_2$ and an oscillation of frequency of the rotors 114 about the third axis $A_3$. For example, if the first shaft 120 rotates at 18 rotations per second, the arm assembly 110 and the rotors 114 can each have an oscillation frequency of 18 hertz in the resonant mode. In some embodiments, in the resonant mode, the rotational rate of the first shaft 120 is different (e.g., slightly different) than the oscillation frequency of the arm assembly 110 and/or the oscillation frequency of the rotors 114. That is, there can be a slight dissonance in the rotational rate of the first shaft 120, the oscillation frequency of the arm assembly 110, and/or the oscillation frequency of the rotors 114. For example, if the arm assembly 110 and the rotors 114 each have an oscillation frequency of 18 hertz, the first shaft 120 can rotate at between about 15-21 rotations per second, and at a rotation rate different than 18 rotations per second, in the resonant mode in which the gyroscopic torque 454 is maximized or approximately maximized. In other embodiments, the device 100 can operate in a "non-resonant" mode of operation in which the rotational rate of the first shaft 120 (and the arm assembly 110) about the first axis $A_1$ does not equal the oscillation frequency of the arm assembly 110 about the second axis $A_2$ and the oscillation of frequency of the rotors 114 about the third axis $A_3$.

Figure 5A:
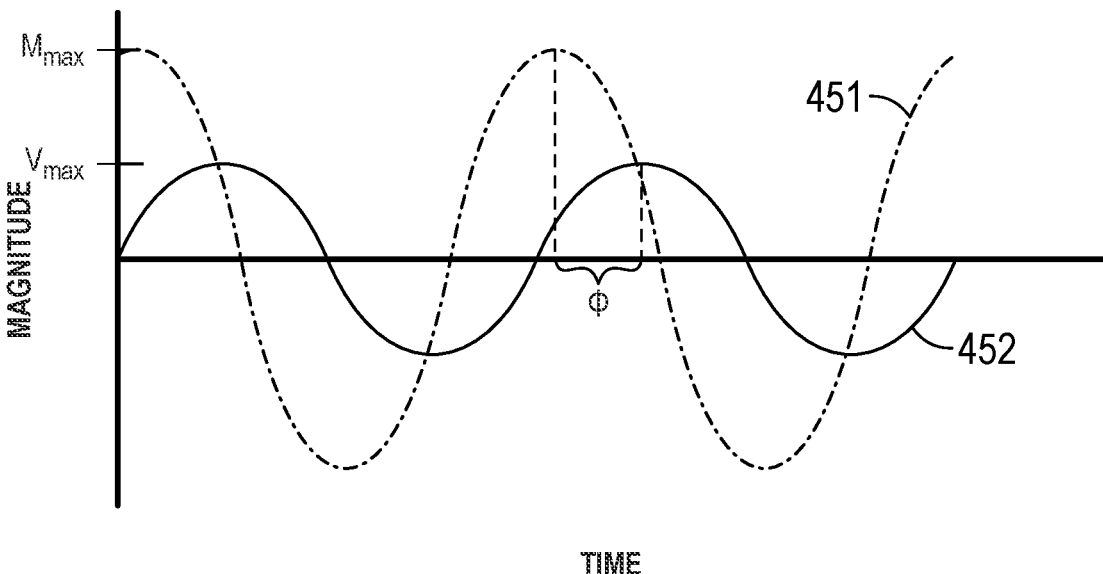
FIGS. 5A and 5B are graphs illustrating components of an oscillatory rotor angular momentum and an oscillatory arm assembly angular velocity of the centrifugal gyroscopic device over time in accordance with embodiments of the present technology.
Figure 5B:
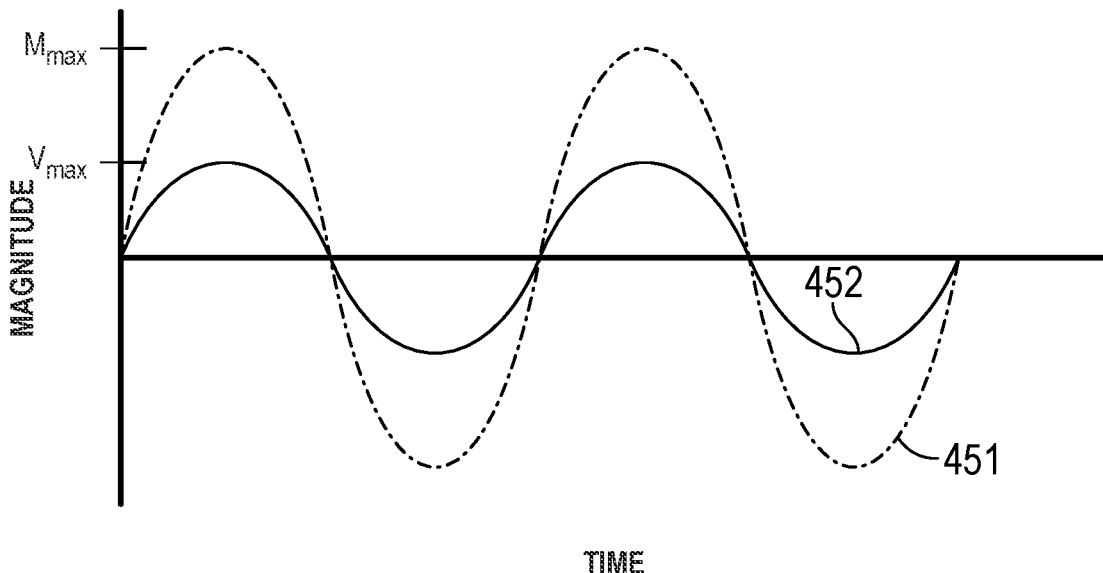

Additionally, the device 100 can drive the arm assembly 110 and/or the rotors 114 to adjust a phase angle and/or phase relationship between the oscillations of the rotors 114 and the arm assembly 110—and thus a phase angle between the associated oscillatory rotor angular momentum 451 and the associated oscillatory arm assembly angular velocity 452. FIGS. 5A and 5B are graphs illustrating components of the oscillatory rotor angular momentum 451 and the oscillatory arm assembly angular velocity 452 of FIG. 4 over time in accordance with embodiments of the present technology. Referring to FIGS. 1A-5B together, the oscillatory rotor angular momentum 451 and the oscillatory arm assembly angular velocity 452 can each be periodic due to the oscillatory motion of the rotors 114 and the arm assembly 110, respectively. The oscillatory rotor angular momentum 451 can have a maximum amplitude $M_{max}$ and the oscillatory arm assembly angular velocity 452 can have a maximum amplitude $V_{max}$. In FIGS. 5A and 5B the oscillatory rotor angular momentum 451 and the oscillatory arm assembly angular velocity 452 have the same frequency (e.g., as in the resonant mode of operation). The oscillatory rotor angular momentum 451 and the oscillatory arm assembly angular velocity 452 are offset by a phase angle $\Phi$ in FIG. 5A and are in phase (e.g., $\Phi=0$) in FIG. 5B.

In some embodiments, the device 100 is configured to adjust the phase angle $\Phi$ (and/or another phase relationship) between the oscillatory rotor angular momentum 451 and the oscillatory arm assembly angular velocity 452 (and the corresponding motion of the rotors 114 and the arm assembly 110) to an optimum value such that the device 100 operates in the resonant or substantially resonant mode and/or maximizes the gyroscopic torque 454 applied to the first shaft 120. To effect such a change in the phase angle $\Phi$, the controller 148 can control the arm motor assemblies 132 and/or the rotor motor assemblies 334 to adjust the oscillations of the arm assembly 110 and/or the rotors 114, respectively. Because the oscillatory rotor angular momentum 451 and the oscillatory arm assembly angular velocity 452 are each sinusoidal (or quasi-sinusoidal), the vector cross-product 453 between them will yield an average value of the gyroscopic torque 454 and a second harmonic. The average value of the gyroscopic torque 454 is dependent on the phase angle $\Phi$, and is zero when the oscillatory rotor angular momentum 451 and the oscillatory arm assembly angular velocity 452 are in quadrature.

In some embodiments, the average value of the gyroscopic torque 454 is maximized when the phase angle $\Phi$ is 0 degrees or 180 degrees. However, the optimum phase angle $\Phi$ that maximizes the value of the gyroscopic torque 454 can have values other than 0 degrees or 180 degrees based on the operating conditions of the device 100. In particular, the device 100 may generate other torques on the arm assembly 110 and/or the rotors 114 that inhibit or even prevent the oscillations of the arm assembly 110 and the rotors 114 from being totally in phase—that is, such that the arm assembly 110 and the rotors have an oscillation component that is always out of phase.

FIG. 6 is a flow diagram of a method or process 650 for operating representative devices to generate power in accordance with embodiments of the present technology. Although some features of the method 650 are described in the context of the device 100 described in detail with reference to FIGS. 1A-5B for the sake of illustration, one skilled in the art will readily understand that the method 650 can be carried out using other suitable devices and/or systems described herein.

Beginning at block 651, the method 650 includes rotating the first shaft 120 (e.g., a drive shaft) and the arm assembly 110 attached thereto about the first axis $A_1$ at a selected rotational rate. In some embodiments, the shaft motor assembly 130 can provide an initial (start-up) torque to rotate the first shaft 120 until the arm assembly 110 generates the gyroscopic torque 454, at which point the torque from the shaft motor assembly 130 can be reduced or eliminated and the rotation of the first shaft 120 driven entirely or substantially entirely by the generated gyroscopic torque 454. In some embodiments, the shaft motor assembly 130 can be omitted and instead rotated entirely by the generated gyroscopic torque 454.

At block 652, the method 650 includes pivoting the arm assembly 110 in an oscillatory manner about the second axis $A_2$ at a first frequency. In some embodiments, the arm motor assemblies 132 can provide an initial (start-up) torque to rotate the arm assembly 110 until the centrifugal force 456 acts to oscillate the arm assembly 110—at which point the torque from the arm motor assemblies 132 can be reduced or eliminated and the oscillation of the arm assembly 110 driven entirely or substantially entirely by the generated centrifugal force 456. In some embodiments, the arm motor assemblies 132 can be used only to adjust the frequency of the oscillation of the arm assembly 110 (and a resulting phase relationship between the generated oscillatory arm assembly angular velocity 452 and the oscillatory rotor angular momentum 451.

At block 653, the method 650 includes pivoting the rotors 114 in an oscillatory manner about the third axis $A_3$ at a second frequency. As described in detail above, when the first shaft 120 is rotating (block 651), the arm assembly 110 is oscillating (block 652), and (the rotors 114 are oscillating (block 653), the device 100 includes a feedback loop in which (i) the angular velocity 452 of the arm assembly 100 and the angular momentum 451 of the rotors 114 combine to generate a gyroscopic torque 454 that acts to rotate the first shaft 120, and (ii) the rotation of the first shaft 120 rotates the arm assembly 110 to generate a centrifugal force 456 that acts to oscillate the arm assembly 110.

At block 654, the method 650 includes applying the output load 459 to the first shaft 120. The output load 459 extracts energy from the device 100—acting to slow the rotational rate of the first shaft 120 absent any adjustments to the operating parameters of the device 100.

At block 655, the method 650 includes controlling the device 100 to operate in the resonant mode in which the rotational rate of the first shaft 120 equals or is at least approximately equal to both the first frequency of oscillation of the arm assembly 110 and the second frequency of oscillation of the rotors 114. In some embodiments, controlling the device 100 to operate in the resonant mode includes setting/adjusting the phase angle $\Phi$ to increase the gyroscopic torque 454 applied to the first shaft 120 to compensate for the load 459 and maintain the resonant mode of operation. Accordingly, in some aspects of the present technology the phase angle $\Phi$ can control the resonance of the device 100. In some embodiments, the device 100 can be specifically designed for a known load such that the phase angle $\Phi$ need not be adjusted/set during operation. However, in some embodiments the load 459 can be variable and the oscillations of the arm assembly 110 and/or rotors 114 can be controlled automatically by the controller 148 or manually by a user to maintain the device 100 in the resonant mode during variations in the load 459. In other embodiments, controlling the device 100 to operate in the resonant mode includes controlling the device 100 such that the rotational rate of the first shaft 120 is different (e.g., slightly different) than the first frequency of oscillation of the arm assembly 110 and/or the second frequency of oscillation of the rotors 114. That is, the device 100 can be operated with a slight dissonance in the rotational rate of the first shaft 120, the first frequency of oscillation of the arm assembly 110, and/or the second frequency of oscillation of the rotors 114 to promote/create a centrifugal resonance in which gyroscopic torques are maximized.

In some aspects of the present technology, it is expected that the net energy output from the device 100 (e.g., via the first shaft 120 to the load 459) will exceed the net energy input into the device 100 via, for example, the shaft motor assembly 130, the arm motor assemblies 132, and/or the rotor motor assemblies 334. That is, for example, the net mechanical power available from the gyroscopic torque 454 can exceed the sum of the input power to the rotor motor assemblies 334 that drives the rotors 114 and the input power to the arm motor assemblies 132 that provides auxiliary power to the arm assembly 110 for controlling the phase angle $\Phi$—even when considering impediments (e.g., friction and/or other losses) to the various components of the device 100.

Section II below, for example, models the motion of the device 100 with equations. In Section II, the first axis $A_1$ is referred to as a "spindle axis," the second axis $A_2$ is referred to as a "hinge axis," the third axis $A_3$ is referred to as a "rotor axis," the first shaft 120 is referred to as a "spindle," and the arm assembly 110 is referred to as an "arm." As outlined in Section II, the difference between the output power and the total input power of the device 100 is dependent on the phase angle $\Phi$ and, even factoring in impediments to the motion of the first shaft 120, the arm assembly 110, and/or the rotors 114, there can be a range of phase angles for which the output is greater than the input. For example, as shown in Section II, the device 100 can generate net power (e.g., output power greater than input power) for phase angles $\Phi$ between about 5-75 degrees and can generate a maximum amount of net power when the phase angle $\Phi$ is between about 30-45 degrees (e.g., about 40 degrees).

In some aspects of the present technology, the device 100 can provide an energy output via the first shaft 120 that is more efficient than conventional motor assemblies—even if the power output from the device 100 is not greater than the power input to the device 100. Specifically, the power inputs to the shaft motor assembly 130, the arm motor assemblies 132, and/or the rotor motor assemblies 334 can each be relatively small compared to the total power output of the device 100. Such smaller motors can be relatively more efficient than a comparable motor assembly configured to directly rotate the first shaft 120 at the same output power. Therefore, the arrangement of the device 100 advantageously allows for the power inputs from several smaller motor assemblies to drive a series of motions (e.g., oscillations and rotations) that efficiently combine to generate a relatively great power output.

In general, the operating/design parameters of the device 100 can be optimized to maximize power output (e.g., based on the equations detailed in Section II) based on a selected application of the device 100. For example, the device 100 can have a small form factor (e.g., for powering a watch or cell phone), a medium form factor (e.g., for powering home appliances), a large form factor (e.g., for powering a remote well or lift station), and so on. Depending on the application, the operating/design parameters that can be optimized include: (i) the oscillation frequency of the rotors 114, (ii) the oscillation amplitude of the rotors 114, (iii) the oscillation frequency of the arm assembly 110, (iv) the oscillation amplitude of the arm assembly 110, (v) the number of arm assemblies 110 (e.g., including one or more arm assemblies), (vi) the number of rotors 114 mounted to each of the arm assemblies 110, (vii) the rotation rate of the first shaft 120, (viii) the size and/or mass of any of the components which can directly affect the inertia, momentum, velocity, and/or forces generated by the components, among others. For example, Sections III and IV below provide examples of representative design parameters that can be selected for a centrifugal gyroscopic device in accordance with the present technology that-even when considering impediments—can operate very efficiently or even to produce more output than input.

Figure 7:
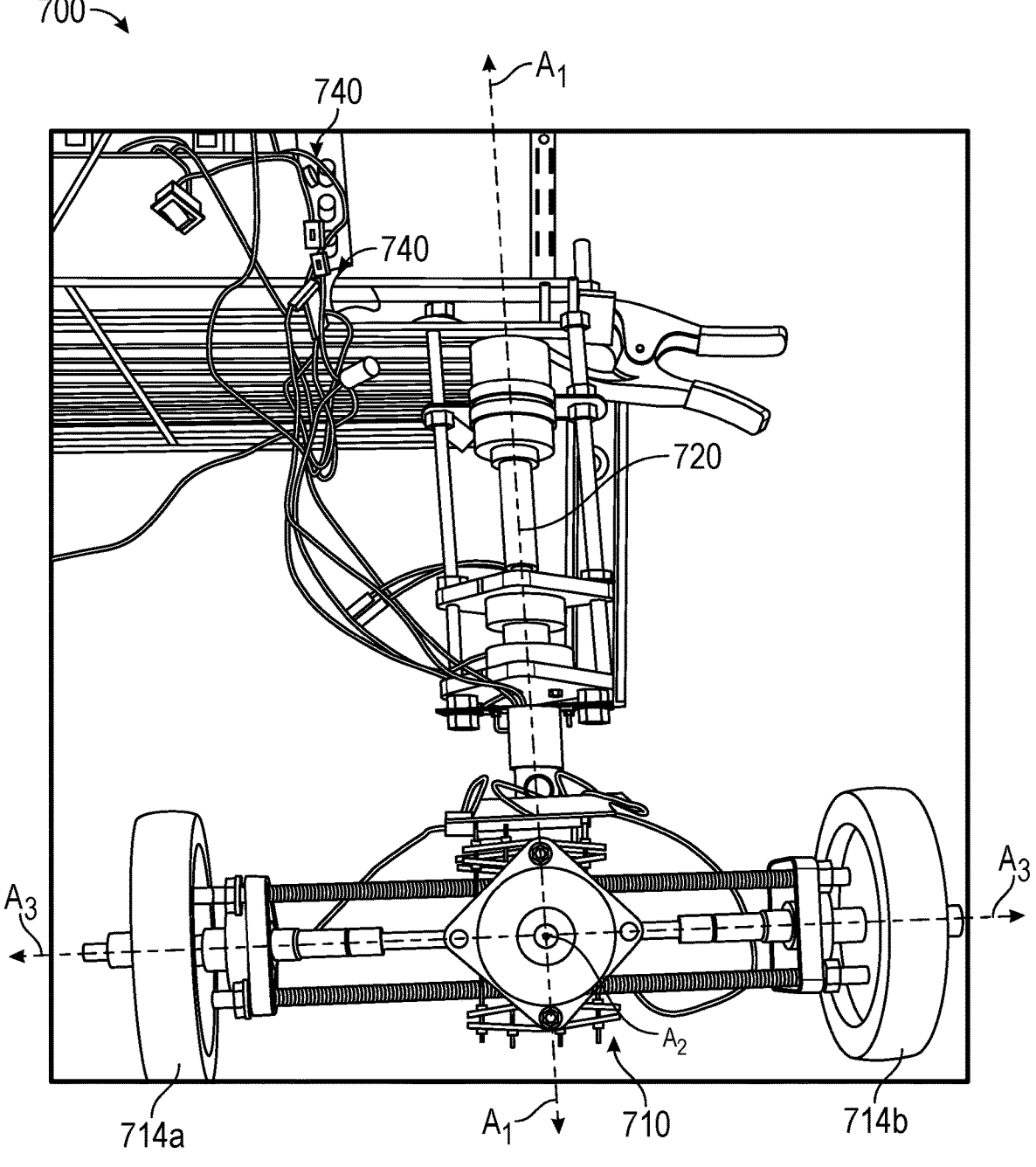
FIG. 7 is a perspective side view of a centrifugal gyro-scopic device continued in accordance with additional embodiments of the present technology.

FIG. 7 is a perspective side view of a centrifugal gyroscopic device 700 ("device 700") configured in accordance with additional embodiments of the present technology. The device 700 can include some features that are at least generally similar in structure and function, or identical in structure and function, to the corresponding features of the device 100 described in detail above with reference to FIGS. 1A-6, and can operate in a generally similar or identical manner to the device 100. In the illustrated embodiment, for example, the device 700 includes: (i) a drive shaft 720 rotatable along the first axis $A_1$, (ii) an arm assembly 710 rotatable with the drive shaft 720 and pivotable about the second axis $A_2$, (iii) a pair of rotors 714 (identified individually as a first rotor 714a and a second rotor 714b) pivotable about the third axis $A_3$, and (iv) a control and power subsystem 740 operable to drive (via one or more motor assemblies) the arm assembly 710 to oscillate about the second axis $A_2$ (extending into the page in FIG. 7) and the rotors 714 to oscillate about the third axis $A_3$ (and/or to drive the drive shaft 720 to rotate about the first axis $A_1$).

In some embodiments, the device 700 is configured to operate in a resonant mode or substantially resonant mode in which the rotational rate of the drive shaft 720 (and the arm assembly 710) about the first axis $A_1$ equals or substantially equals an oscillation frequency of the arm assembly 710 about the second axis $A_2$ and an oscillation of frequency of the rotors 714 about the third axis $A_3$. FIGS. 8A-8D are enlarged perspective views of the device 700 illustrating the movement of the arm assembly 710 and the rotors 714 during one complete revolution of the arm assembly 710 about the first axis $A_1$ in the resonant mode of operation in accordance with embodiments of the present technology. FIGS. 8A-8D sequentially illustrate the arm assembly 720 at different quarter (e.g., 90 degrees) revolutions about the first axis $A_1$. If the rotation of the arm assembly 720 is at a sufficient rate to blur the oscillatory movement of the arm assembly 720, an optical illusion presents itself that the axis of rotation of the arm assembly 720 is tilted by the angle shown in FIGS. 8B and 8D.

Figure 8A:
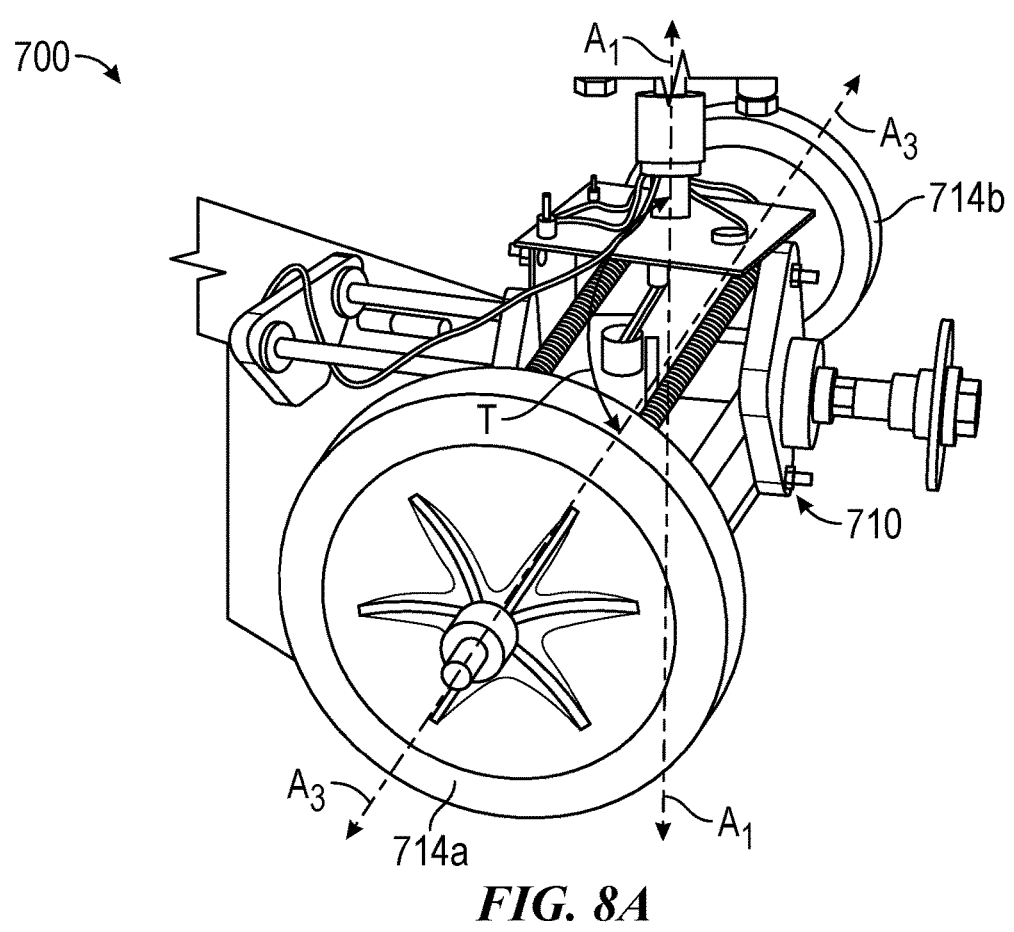
FIGS. 8A-8D are enlarged perspective views of the cen-trifugal gyroscopic device of FIG. 7, illustrating the move-ment of an arm assembly and rotors of the centrifugal gyroscopic device during a complete revolution of the arm assembly in a resonant mode of operation, in accordance with embodiments of the present technology.

In FIG. 8A, the arm assembly 710 extends generally parallel to the horizontal (e.g., horizontal to gravity). That is, the third axis $A_3$ extends orthogonal to the first axis $A_1$ (e.g., such that an angle between the first and third axes $A_1$, $A_3$ is about 90 degrees). Accordingly, the arm assembly 710 can have a minimum angular amplitude in the position in shown FIG. 8A. Further, the rotors 714 are each at a first angular position relative to the third axis $A_3$.

Figure 8B:
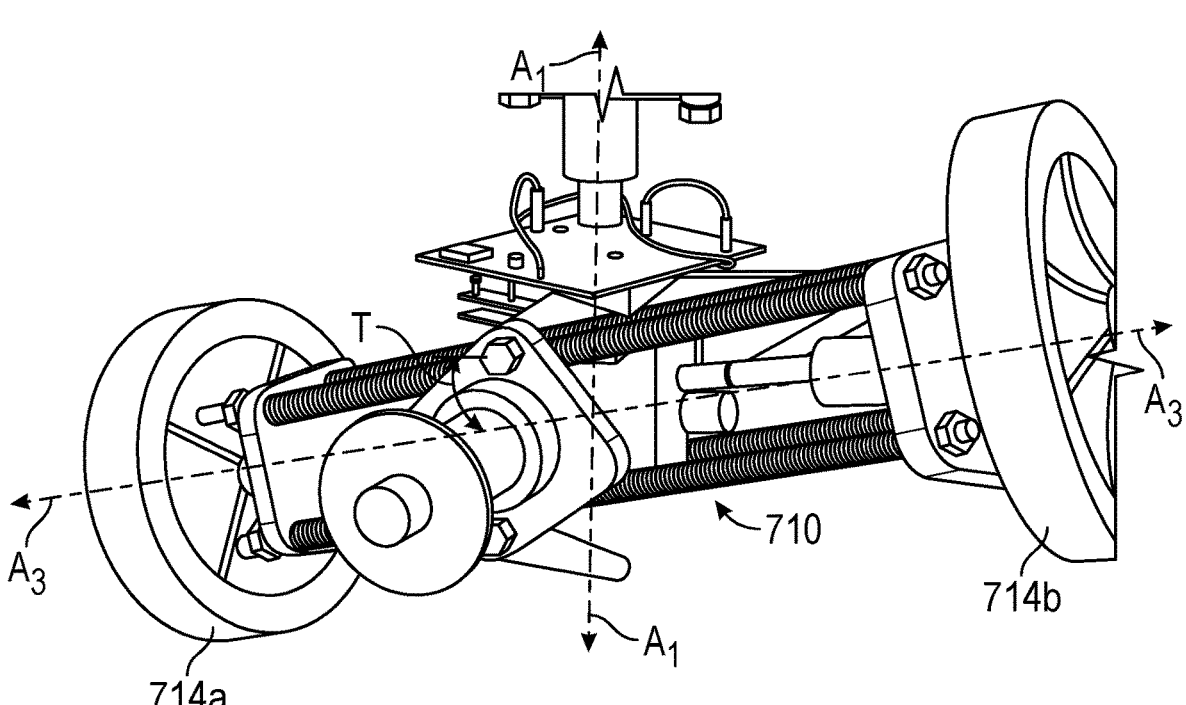

In FIG. 8B, the arm assembly 710 has rotated by about 90 degrees (e.g., in a clockwise direction) about the first axis Aj from the position shown in FIG. 8A and such that arm assembly 710 extends at angle T relative to the horizontal. In the illustrated embodiment, the second rotor 714b is positioned above the first rotor 714a relative to the horizontal. In some embodiments, the angle T can be a maximum angular amplitude of the oscillation of the arm assembly 720. Further, the rotors 714 are each at a second angular position relative to the third axis $A_3$ in FIG. 8B. In some embodiments, where the phase of the arm assembly 710 and the rotors 714 is generally the same (e.g., phase angle equal to zero), the rotors 714 can—the same as the arm assembly 720—have a maximum angular amplitude in FIG. 8B and a minimum angular amplitude in FIG. 8A.

Figure 8C:
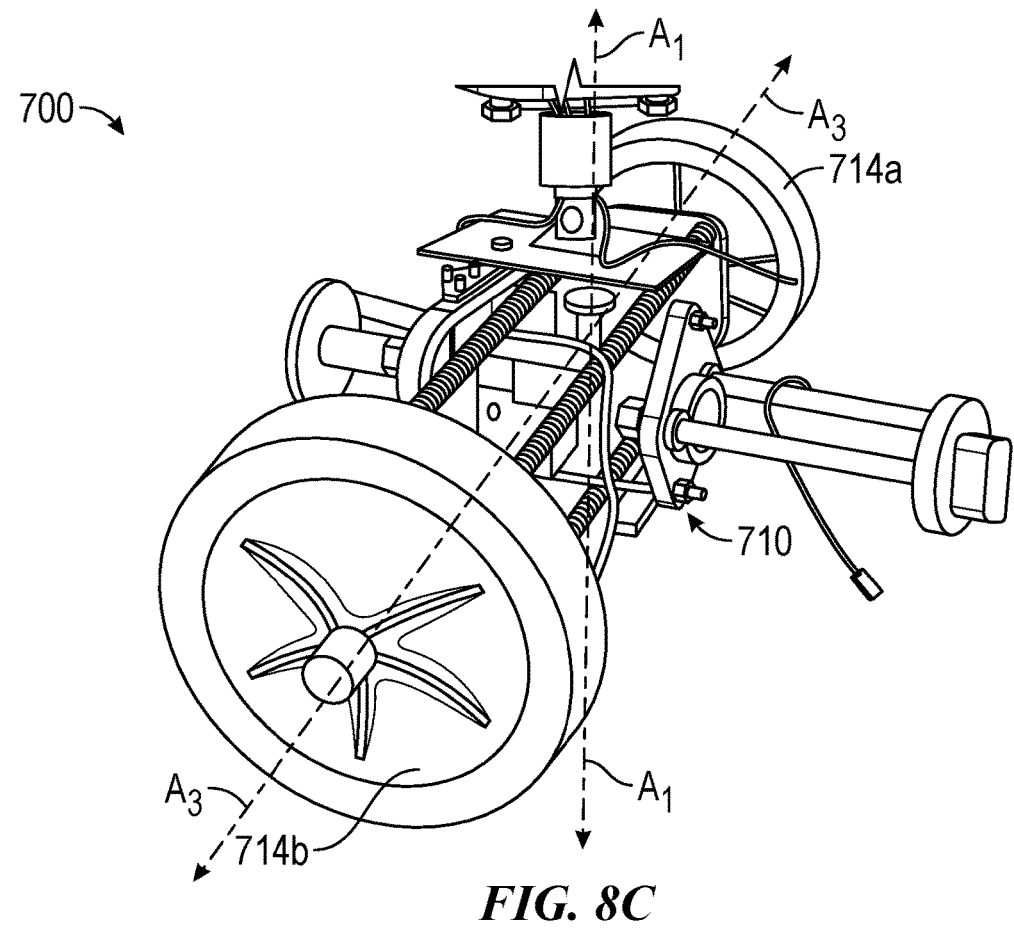

In FIG. 8C, the arm assembly 710 has rotated by about 90 degrees (e.g., in a clockwise direction) about the first axis $A_1$ from the position shown in FIG. 8B and such that the arm assembly 710 extends generally parallel to the horizontal and again has the minimum angular amplitude. The rotors 714 are each at a third angular position relative to the third axis $A_3$ in FIG. 8C. In the resonant mode where the oscillation frequency of the arm assembly 710 equals the oscillation frequency of the rotors 714, the third angular position can be the same as the first angular position (e.g., both at the minimum angular amplitude) or the third angular position can have the opposite sign as the first angular position.

Figure 8D:
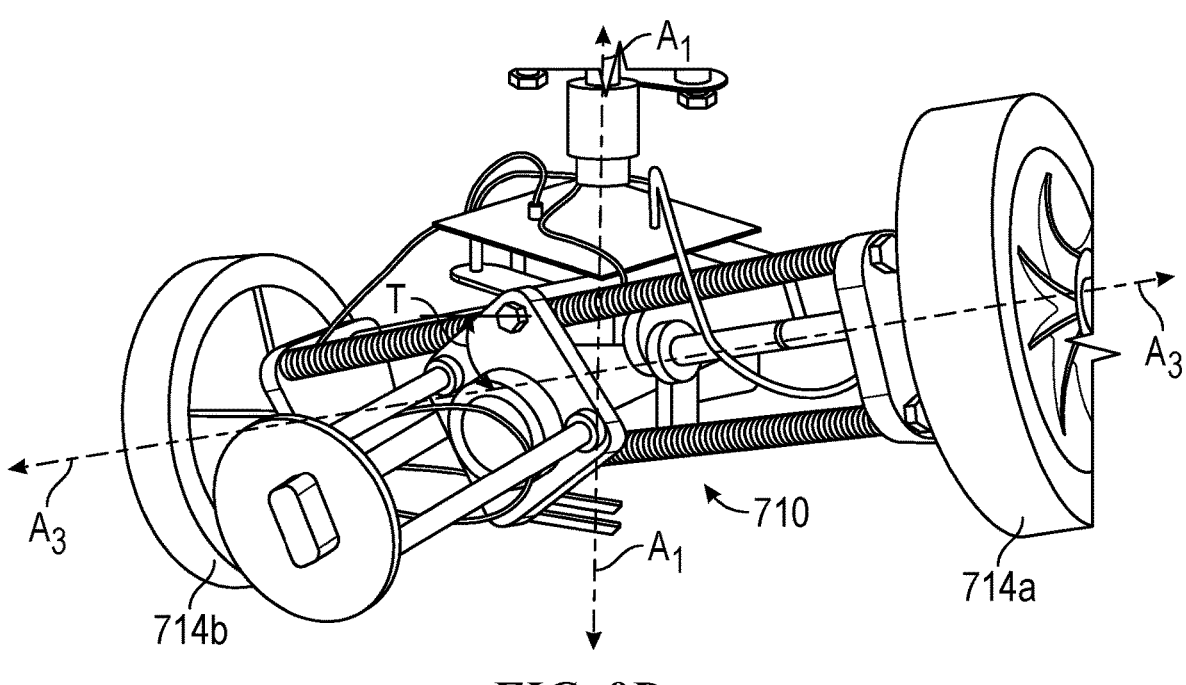

In FIG. 8D, the arm assembly 710 has rotated by about 90 degrees (e.g., in a clockwise direction) about the first axis $A_1$ from the position shown in FIG. 8C and such that arm assembly 710 extends again at the angle T relative to the horizontal. In the illustrated embodiment, however, the first rotor 714a is positioned above the second rotor 714b relative to the horizontal. The rotors 714 are each at a fourth angular position relative to the third axis $A_3$ in FIG. 8D. In the resonant mode where the oscillation frequency of the arm assembly 710 equals the oscillation frequency of the rotors 714, the fourth angular position can be the same as the second angular position (e.g., both at a maximum angular amplitude) or the fourth angular position can have the opposite sign as the second angular position.

The arm assembly 710 completes a revolution by returning to the position shown in FIG. 8A. Referring to FIGS. 8A-8D together, the movement of the device 700 in the resonant mode can create an optical illusion when viewed from the side at a particular azimuthal angle as shown in FIGS. 8A-8D. Namely, the arm assembly 710 can appear to be consistently pivoted about the second axis $A_2$ (FIG. 7) off vertical (e.g., typically at a tilt angle of 45 degrees) in a particular direction. This occurs because, for example, the rotors 714 each reach a maximum angular amplitude below horizontal when located at the same or approximately the same circumferential position about the first axis $A_1$ (e.g., to the left of the page as shown in FIGS. 8B and 8D). Similarly, the rotors 714 each reach a maximum angular amplitude above horizontal when located at the same or substantially the same circumferential position about the first axis $A_1$ (e.g., to the right of the page as shown in FIGS. 8B and 8D). In some embodiments, the optical illusion will rotate in azimuth when the device 100 is off resonance.

Figure 9:
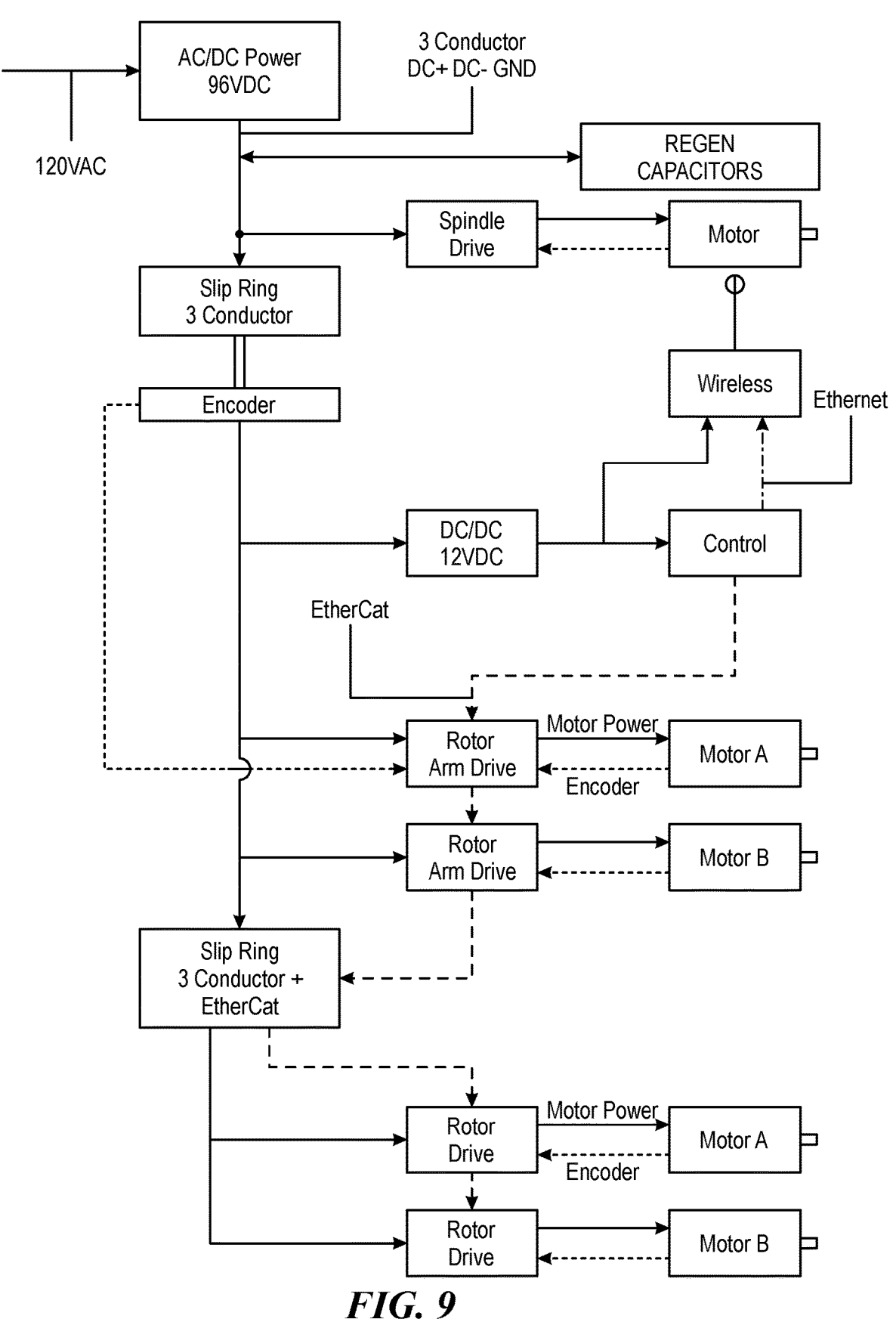
FIG. 9 is a schematic diagram of a control assembly for controlling a spindle in accordance with embodiments of the present technology.
Figure 10:
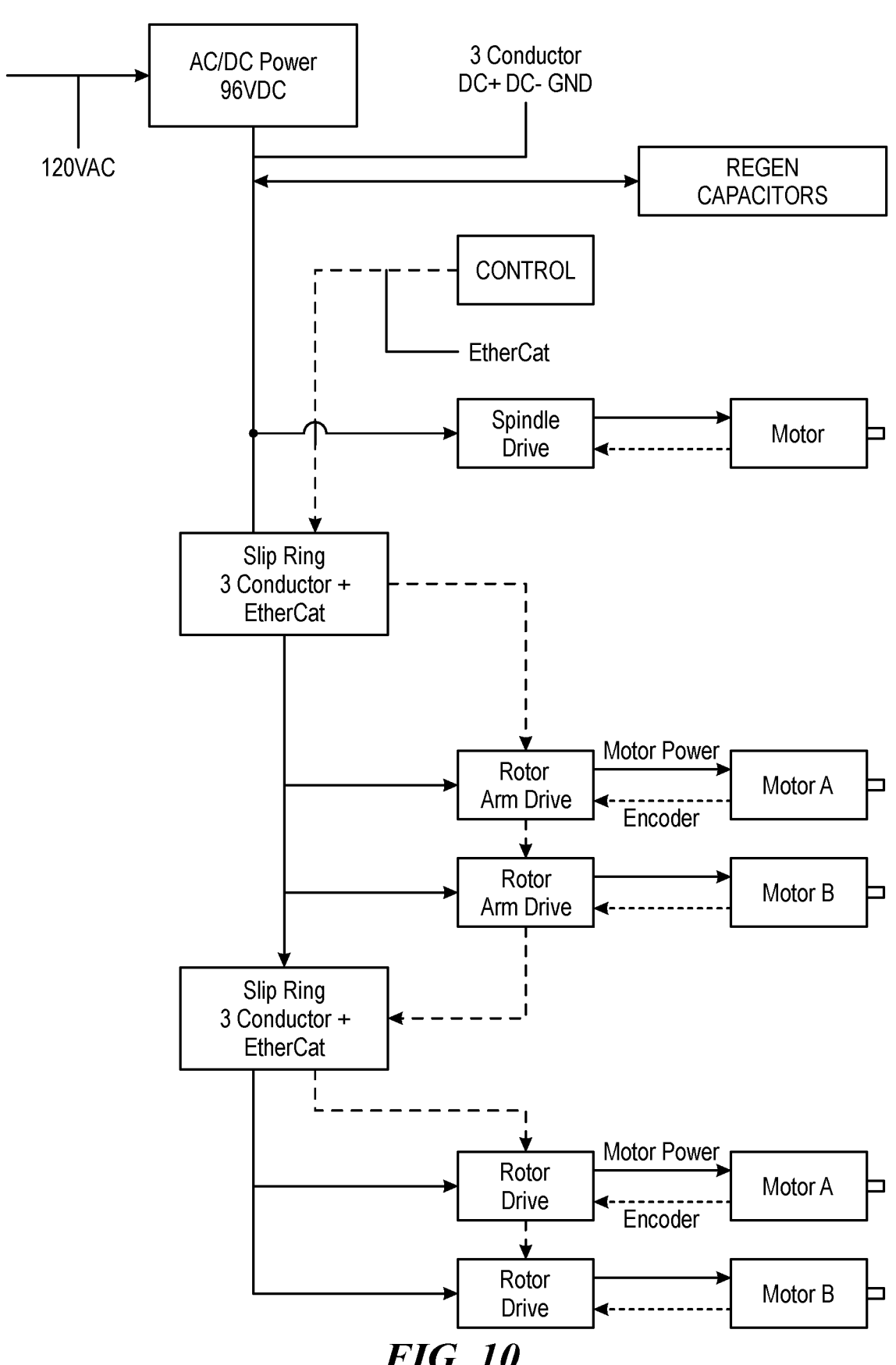
FIG. 10 is a schematic diagram of a control assembly for controlling a spindle in accordance with additional embodi-ments of the present technology.
Figure 11:
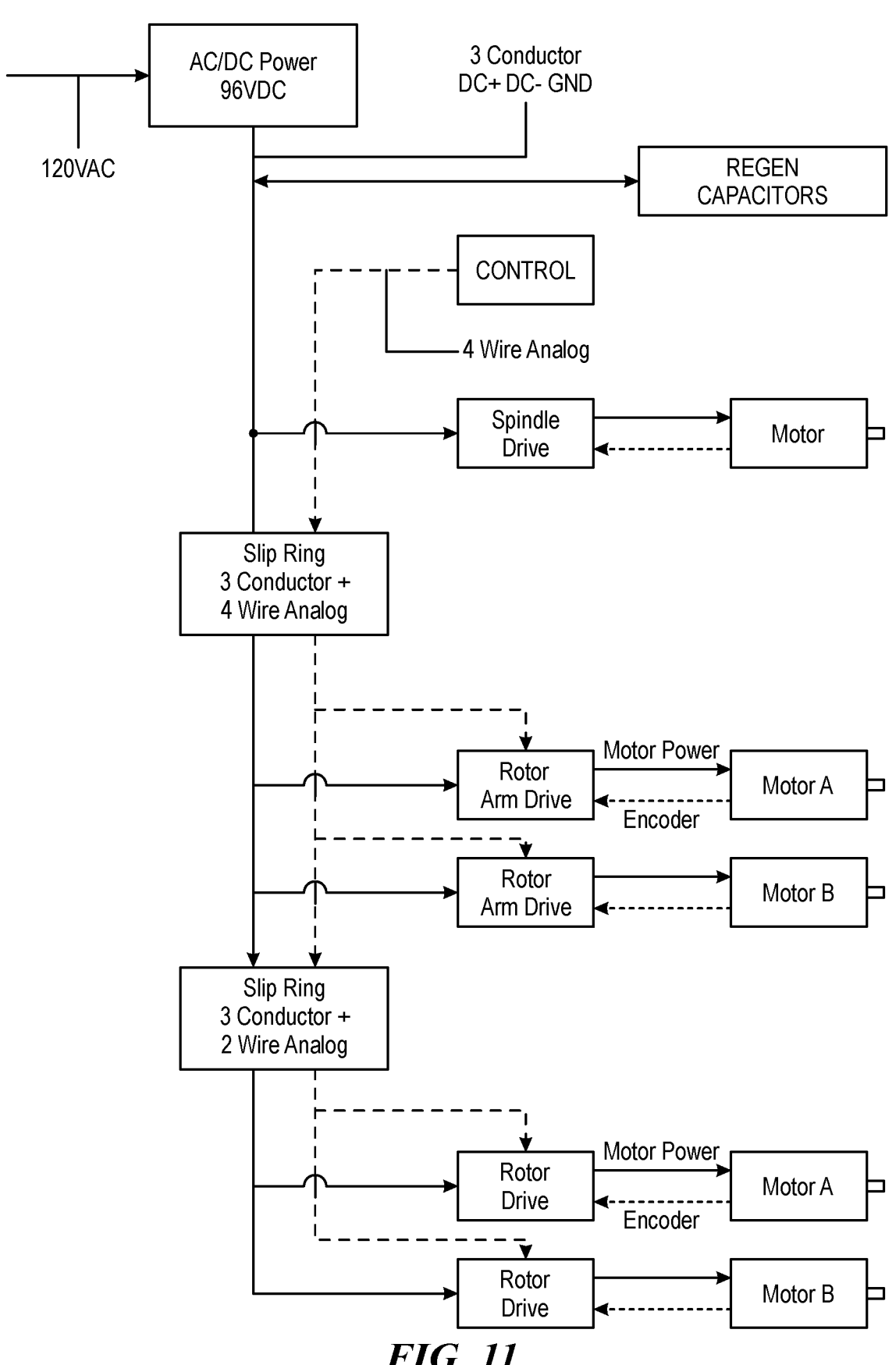
FIG. 11 is a schematic diagram of an analog control assembly for controlling a spindle in accordance with addi-tional embodiments of the present technology.

FIG. 9 is a schematic diagram of a control assembly for controlling a spindle (e.g., the first shaft 120) in accordance with embodiments of the present technology. FIG. 10 is a schematic diagram of a control assembly for controlling a spindle (e.g., the first shaft 120) in accordance with additional embodiments of the present technology. FIG. 11 is a schematic diagram of an analog control assembly for controlling a spindle (e.g., the first shaft 120) in accordance with additional embodiments of the present technology.

II. Additional Equations Representative of Operating Centrifugal Gyroscopic Devices A set of gyroscopic axes is defined by the vector cross-product, according to the righthand rule. The axes are termed the rotor reference axis, the spindle axis, and the hinge axis. For convenience, the spindle axis is considered to be vertical. If the rotor axis is at an angle to the rotor reference axis about the hinge axis, the vector cross-product automatically takes it into account. The vector cross-product of (vector along the rotor axis)×(vector along the spindle axis) yields a (vector along the hinge axis). Similarly, the vector cross-product of (vector along the spindle axis)×(vector along the hinge axis) yields a (vector along the rotor axis). And, similarly, the vector cross-product of (vector along the hinge axis)×(vector along the rotor axis) yields a (vector along the spindle axis). Reverse vector cross-products are also applicable. Specifically, the vector cross-product of (vector along the spindle axis)×(vector along the rotor axis) yields a (vector along the negative hinge axis). Similarly, the vector cross-product of (vector along the hinge axis)×(vector along the spindle axis) yields a (vector along the negative rotor axis). And, similarly, the vector cross-product of (vector along the rotor axis)×(vector along the hinge axis) yields a (vector along the negative spindle axis). The six vector cross-products are summarized as follows:

$$\tau_R \times \tau_S = \tau_H$$
$$\tau_S \times \tau_H = \tau_R$$
$$\tau_S \times \tau_R = -\tau_H$$
$$\tau_H \times \tau_S = -\tau_R$$
$$\tau_R \times \tau_S = \tau_H$$
$$\tau_S \times \tau_R = -\tau_H$$

where: $\tau_R$=unit vector along rotor axis
$\tau_S$=unit vector along spindle axis
$\tau_H$=unit vector along hinge axis In terms of gyroscopic action, each vector can represent either angular momentum or angular velocity. The vector cross-product of angular momentum and its angular velocity about an orthogonal axis yields a gyroscopic torque about the third axis. Thus, in general, the angular momentum of the rotor, arm, and spindle can each have an angular velocity about either of the two orthogonal axes, yielding six combinations of gyroscopic torque.

In this particular case, the spindle has only one degree of freedom, that is, rotation about the spindle axis. Therefore, its angular momentum is restricted from rotating about an orthogonal axis, thus eliminating two of the generalized gyroscopic torques, leaving four.

Also, the arm is prohibited from rotating about the rotor axis. Therefore, the gyroscopic torque that would arise from the angular momentum of the arm being rotated about the rotor axis is eliminated, leaving three. Further, although the spindle rotates the angular momentum of the arm, thus exerting a gyroscopic torque on the arm about the rotor axis, the arm is prohibited from rotating about the rotor axis. This gyroscopic torque exerts a stress on the supporting structure of the hinge axis. With the elimination of this gyroscopic torque as having an effect on the dynamic motion in the system, there remain two gyroscopic torques that do affect the dynamic motion of the system. The two gyroscopic torques that are effective are as follows:

$$M_{R/S} = -I_{R/R}\omega_{R/R}\omega_{R/H}\cos\theta_{A/H}$$
$$M_{R/H} = I_{R/R}\omega_{R/S}\cos\theta_{A/H}$$

where: $I_{R/R}$=moment of inertia of rotor about rotor axis
$\omega_{R/R}$=angular velocity of rotor about rotor axis
$\omega_{R/S}$=angular velocity of rotor and arm about spindle axis
$\omega_{R/H}$=angular velocity of rotor and arm about hinge axis
$\theta_{A/H}$=arm angle off horizontal about hinge axis
$M_{R/S}$=gyroscopic torque on rotor and arm about spindle axis
$M_{R/H}$=gyroscopic torque on rotor and arm about hinge axis If the angular momentum about one axis and its velocity about an orthogonal axis are both constant, the gyroscopic torque about the third axis is constant. If either the angular momentum or angular velocity is oscillatory and the other is constant, the gyroscopic torque is oscillatory. If both the angular momentum and angular velocity are oscillatory at the same frequency, the gyroscopic torque has two components, a constant (which is zero, if the oscillations are in quadrature, that is, 90 degrees apart in phase) and a second harmonic.

For an arm that is balanced along the rotor reference axis and along the spindle axis, the differential equations for rotor oscillation about the rotor axis, spindle rotation, and arm oscillation about the hinge axis, respectively, are given by:

$$I_{R/R}\ddot{\theta}_{R/R} = (M_R)_{IN} - (M_R)_I$$
$$I_{S/S}\ddot{\theta}_S = -I_{R/R}\dot{\theta}_{R/R}\dot{\theta}_{A/H}\cos\theta_{A/H} + (M_S)_{IN} - (M_S)_I - M_{LOAD}$$
$$I_{A/H}\ddot{\theta}_{A/H} = \left[-m_A(r_{G/R}^2 - r_{G/S}^2)(\dot{\theta}_S)^2\sin\theta_{A/H}\cos\theta_{A/H} + \right.$$
$$\left. I_{R/R}\dot{\theta}_{R/R}\dot{\theta}_S\cos\theta_{A/H} + (M_A)_M - (M_A)_I\right]$$

where: $I_R$=Moment of inertia of rotor about rotor axis
$I_{S/S}$=Moment of inertia of spindle (including arm) about spindle axis
$I_{A/H}$=Moment of inertia of arm about hinge axis $\ddot{\theta}_{R/R}$=Angular acceleration of rotor about rotor axis $\ddot{\theta}_S$=Angular acceleration of spindle about spindle axis $\ddot{\theta}_{A/H}$=Angular acceleration of arm about hinge axis $\dot{\theta}_{R/R}$=Angular velocity of rotor about rotor axis $\dot{\theta}_S$=Angular velocity of spindle about spindle axis $\dot{\theta}_{A/H}$=Angular velocity of arm about hinge axis $\theta_{A/H}$=Angle of arm horizontal $(M_R)_{IN}$=Input torque for rotor oscillation $(M_S)_{IN}$=Input torque for startup of spindle rotation $(M_A)_M$=Input torque about hinge axis $(M_R)_I$=Impediment torque to rotor oscillation about rotor axis $(M_A)_I$=Impediment torque to arm oscillation about hinge axis $(M_S)_I$=Impediment torque to spindle rotation $M_{LOAD}$=Load torque on spindle $m_A$=Mass of arm $r_{G/R}$=Radius of gyration along rotor reference axis $r_{G/S}$=Radius of gyration along spindle axis The equations are mathematically intractable, mainly because the expression for the torque due to centrifugal force contains the product of the sine and cosine of the angle of the arm about the hinge axis, which itself is a quasi-sinusoidal function. A closed form solution is available under ideal impediment-free conditions and small amplitudes of oscillation where small-angle approximations are valid.

The spindle velocity is assumed to be constant. The phase of the torque from the motor is assumed to be in phase with the rotor angular acceleration. The rotor and arm are oscillated with the same frequency of oscillation. The differential equation for motion about the hinge/arm axis can be rewritten with slightly different nomenclature, as follows:

$$I_A \ddot{\theta}_A = M_A + I_R \dot{\theta}_R \omega_S - I_C \omega_S^2 \theta_A$$

$I_A$=Moment of inertia of arm and rotor about the arm axis $I_R$=Moment of inertia of rotor about rotor axis $M_A$=Torque provided by arm motor $\omega_S$=Angular velocity of spindle $I_C$=Constant relating spindle speed to centrifugal torque on arm The arm position is assumed to have the amplitude $\theta_{A,max}$ at time t=0. The rotor acceleration and the arm torque have a phase $\phi$ relative to the arm position.

$$\theta_A = \theta_{A,max} \cos \omega t$$

$$\dot{\theta}_A = -\omega \theta_{A,max} \sin \omega t$$

$$\ddot{\theta}_A = -\omega^2 \theta_{A,max} \cos \omega t$$

$$M_A = -M_{A,max} \cos(\omega t + \phi)$$

$$\ddot{\theta}_A = \frac{M_A}{I_A} + \frac{I_R}{I_A} \dot{\theta}_R \omega_S - \frac{I_C}{I_A} \omega_S^2 \theta_A$$

let $\omega=\omega_R=\omega_A$=frequency of oscillation let $\omega_S=\omega$ $M_A$ and $\ddot{\theta}_R$ are in phase $\dot{\theta}_R=-\omega\theta_{R,max} \cos(\omega t+\phi)$ $\ddot{\theta}_R=-\omega^2\theta_{R,max} \sin(\omega t+\phi)$ $\ddot{\theta}_R=-\omega^2\theta_{R,max} \cos(\omega t+\phi)$ Substitute these values for rotor and arm positions, velocities, and accelerations into the torque equation.

$$-\omega^2 \theta_{A,max} \cos \omega t = -\left(\frac{M_{A,max}}{I_A}\right)\cos(\omega t + \phi)$$

$$-\frac{I_R}{I_A}\omega\omega_S\theta_{R,max}\sin(\omega t + \phi) - \frac{I_C}{I_A}\omega_S^2\theta_{A,max}\cos(\omega t)$$

Replace cos ($\omega$t) with $$\cos(\omega t + \phi - \phi) = \sin \phi \sin(\omega t + \phi) + \cos \phi \cos(\omega t + \phi).$$

$$-\omega^2 \theta_{A,max}\sin \phi \sin(\omega t + \phi) - \omega^2 \theta_{A,max}\cos \phi \cos(\omega t + \phi) =$$

$$-\left(\frac{M_{A,max}}{I_A}\right)\cos(\omega t + \phi) - \frac{I_R}{I_A}\omega\omega_S\theta_{R,max}\sin(\omega t + \phi)$$

$$-\frac{I_C}{I_A}\omega_S^2\theta_{A,max}\sin \phi \sin(\omega t + \phi) - \frac{I_C}{I_A}\omega_S^2\theta_{A,max}\cos \phi \cos(\omega t + \phi)$$

Collecting the sin ($\omega$t+$\phi$) terms results in:

$$-\omega^2 \theta_{A,max}\sin \phi = -\frac{I_R}{I_A}\omega\omega_S\theta_{R,max} - \frac{I_C}{I_A}\omega_S^2\theta_{A,max}\sin \phi$$

$$\theta_{R,max} = \frac{\left(\omega^2 - \frac{I_C}{I_A}\omega_S^2\right)}{\frac{I_R}{I_A}\omega\omega_S}\theta_{A,max}\sin \phi$$

Define $$\omega_o = \sqrt{\frac{I_C}{I_A}}\,\omega_S$$

Resonance for the arm would occur at $$\omega_o = \sqrt{\frac{I_C}{I_A}}\,\omega_S$$

which implies that $\omega_o<\omega_S$ since $I_C<I_A$.

$$\theta_{R,max} = \left(\frac{I_A}{I_R}\right)\frac{(\omega^2 - \omega_o^2)}{\omega\omega_S}\theta_{A,max}\sin \phi$$

$$\theta_{A,max} = \left(\frac{I_R}{I_A}\right)\frac{\omega\omega_S}{(\omega^2 - \omega_o^2)\sin \phi}\theta_{R,max}$$

There is no resonance for the arm for $\omega_S=\omega$. True, resonance is indicated when spindle speed is a bit higher than the oscillating frequency of the rotors and arm, if the small-angle approximations were still valid at large amplitudes and with impediment torques acting on the arm. The stiffness afforded by the centrifugal-forced torque is not constant at larger amplitudes. Nevertheless, it is an intriguing notion as to whether some resonant-like behavior can be used to advantage at larger amplitudes. As a cautionary note, as arm amplitudes of oscillation are enlarged, they become subject to limitations imposed by centrifugal effects.

There is no indication of resonance for the rotor.
Collecting the cos ($\omega t+\phi$) terms gives:

$$-\omega^2 \theta_{A,max}\cos\phi = -\left(\frac{M_{a,max}}{I_A}\right) - \frac{I_C}{I_A}\omega_S^2 \theta_{A,max}\cos\phi$$

$$\frac{M_{A,max}}{I_A} = \left(\omega^2 - \omega_o^2\right)\theta_{A,max}\cos\phi$$

$$M_{A,max} = I_A\left(\omega^2 - \omega_o^2\right)\theta_{A,max}\cos\phi$$

$$M_{A,max} = I_A\omega^2\left(1 - \frac{I_C}{I_A}\right)\theta_{A,max}\cos\phi$$

Dividing these two equations:

$$\tan\phi = \frac{\theta_{R,max}I_R\omega\omega_S}{M_{A,max}}$$

The gyroscopic torque applied to the spindle is given by this equation:

$$M_{POGA} = -I_R\dot\theta_R\dot\theta_A = -I_R(-\omega\theta_{R,max}\sin(\omega t + \phi))(-\omega\theta_{A,max}\sin\omega t) =$$

$$-I_R\omega^2\theta_{R,max}\theta_{A,max}\left(\sin^2(\omega t)\cos\phi + \sin(\omega t)\cos(\omega t)\sin\phi\right) =$$

$$-I_R\omega^2\theta_{R,max}\theta_{A,max}\left(\frac{1}{2}(1 - \sin(2\omega t))\cos\phi + \sin(\omega t)\cos(\omega t)\sin\phi\right)$$

Integrate with respect to time to get the average gyroscopic torque. The sin ($2\omega t$) and the sin ($\omega t$) terms integrate to zero.

$$\overline{M_{POGA}} = -\frac{1}{2}I_R\omega^2\theta_{R,max}\theta_{A,max}\cos\phi$$

As was mentioned for $\theta_{A,max}$ previously, if the solution with small-angle approximations is a harbinger of performance in general, the average gyroscopic torque can be enlarged by approaching resonance.

Replace $\theta_{R,max}$ with expression above from sin terms:

$$\overline{M_{POGA}} = -\frac{1}{2}I_A\omega\frac{\left(\omega^2 - \omega_o^2\right)}{\omega_S}\theta_{A,max}^2\sin\phi\cos\phi$$

$$\overline{M_{POGA}} = -\frac{1}{2}I_A\omega\frac{\left(\omega^2 - \omega_o^2\right)}{\omega_S}\theta_{A,max}^2\sin(2\phi)\times 0.5$$

$$\overline{M_{POGA}}\omega_S = P_{out} = -\frac{1}{2}I_A\omega\left(\omega^2 - \omega_o^2\right)\theta_{A,max}^2\sin(2\phi)\times 0.5$$

When the spindle is used as the source of output power, it is not convenient to compare the output torque with the input torques, because the output is an average value and the input torques are oscillatory. However, the output power can be compared to the total input power. The output power is the product of the average output torque and the spindle rate. Each input power is the average power over a quarter oscillatory cycle (being independent of algebraic signs and being the same in each of the other three quarters) and is given by the average of the product of the oscillatory input torque and the instantaneous angular velocity attributed to input torque. The expressions for output power and input power to the rotor and to the arm by an auxiliary motor are given by:

$$P_{OUT} = \bar{M}_{OUT}\omega = \frac{1}{2}I_{R/R}\omega^3(\theta_{A/H})_{max}^2\left(\frac{r_{G/S}}{r}\right)^2\sin\phi\cos\phi$$

$$P_{IN,R} = \frac{1}{\pi/2}\int_0^2\left[I_{R/R}\omega^2(\theta_{R/R})_{max}\sin\omega\tau\right]\left[\omega(\theta_{R/R})_{max}\cos\omega\tau\right]\phi[\omega\tau] =$$

$$\frac{1}{\pi}I_{R/R}\omega^3(\theta_{R/R})_{max}^2 = \frac{1}{\pi}I_{R/R}\omega^3\left(\frac{r_{G/S}}{r}\right)^T(\theta_{A/H})_{max}^2\sin^2\phi$$

$$P_{IN,M} =$$

$$\frac{1}{\pi}(M_A)_{M,max}\left[\omega\left(\frac{(M_A)_{M,NR}}{I_{R/R}\omega^2}\right)\right] = \frac{1}{\pi}I_{R/R}\omega^3\left(\frac{r_{G/S}}{r}\right)^2\left(\frac{r_{G/S}}{r_{G/R}}\right)^2(\theta_{A/H})_{max}^2\cos^2\phi$$

The difference between the output power and total input power can be expressed in normalized fashion as follows:

$$\frac{P_{OUT} - (P_{IN,R} + P_{IR,M})}{I_{R/R}\omega^3(\theta_{A/H})_{max}^2} =$$

$$\frac{1}{2}\left(\frac{r_{G/S}}{r}\right)^2\sin\phi\cos\phi - \frac{1}{\pi}\left(\frac{r_{G/S}}{r}\right)\sin^2\phi - \frac{1}{\pi}\left(\frac{r_{G/S}}{r}\right)^2\left(\frac{r_{G/S}}{r_{G/R}}\right)^2\cos^2\phi$$

Figure 12:
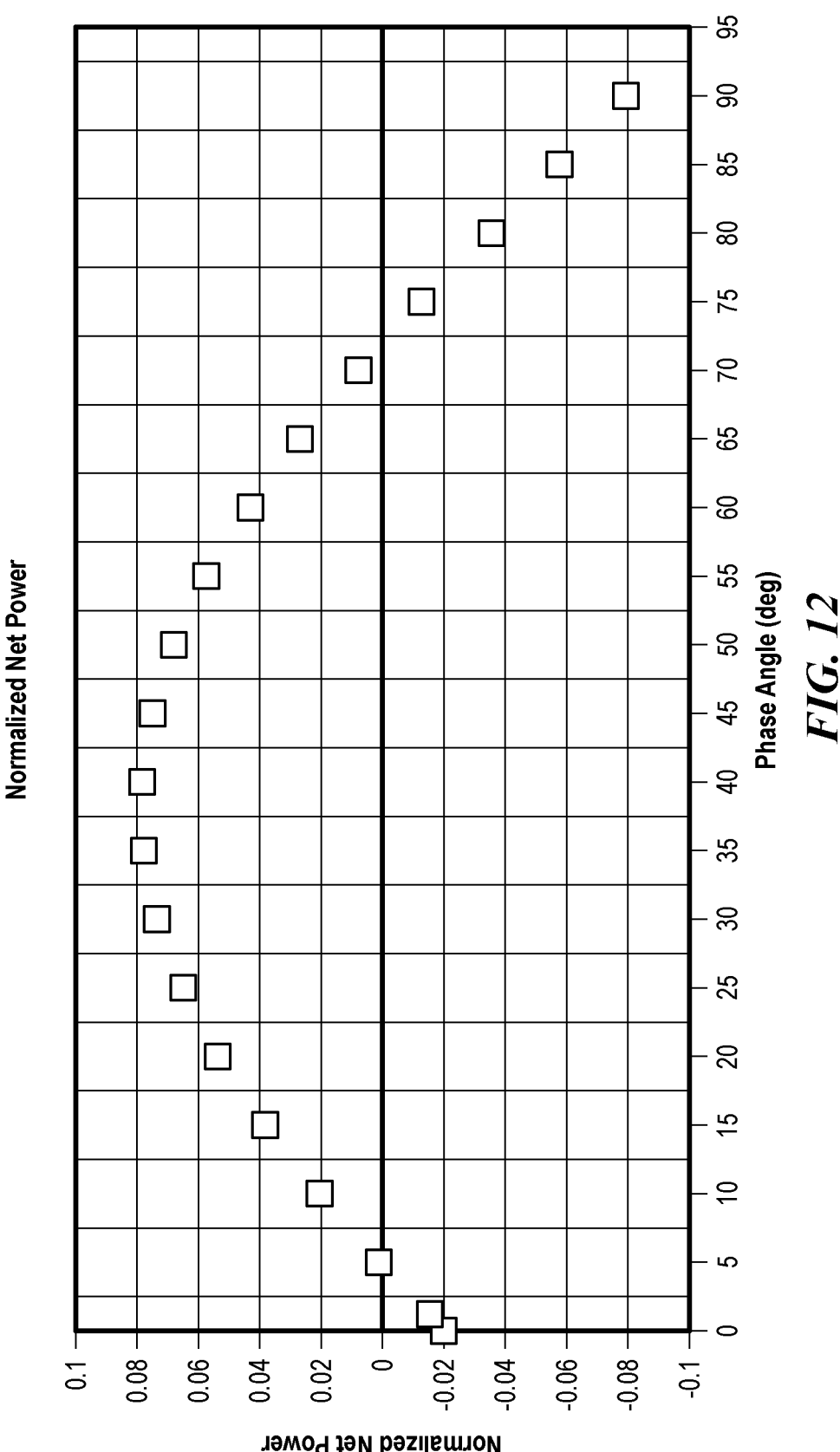
FIG. 12 is a graph illustrating normalized net power versus the phase angle between rotor and arm oscillations.

FIG. 12 is a graph illustrating normalized net power versus the phase angle between rotor and arm oscillations. As shown, the normalized net power depends on the phase angle between the rotor and arm oscillations for a practical set of design geometries. There is a range of phase angles where the output is greater than the input.

Alternately, the input power is given by the in-phase component of the product of torque and velocity. The expressions for the rotor and arm motors are:

$P-in-r = 2\times$ time integral of $$\left(M-r-\text{max}*\sin(2*pi*f*t)\right)*\left(w-r-\text{max}*\sin(2*pi*f*t+phi-r)\right)/T$$

$P-in-a =$ time integral of $$\left(M-a-\text{max}*\sin(2*pi*f*t)\right)*\left(w-a-\text{max}*\sin(2*pi*f*t+phi-a)\right)/T$$

$$M-r-\text{max} = Kt-r*Amp-r-\text{max}$$

$$M-a-\text{max} = Kt-a*Amp-a-\text{max}$$

where: P-in-r=input power from each rotor motor (watts)
P-in-a=input power from arm motor (watts)
M-r-max=amplitude of torque provided by rotor motor (N-m)
M-a-max=amplitude of torque provided by arm motor (N-m)
Kt-r=torque constant for rotor motor (N-m/amp)
Kt-a=torque constant for arm motor (N-m/amp)
Amp-r-max=amplitude of current in rotor motor (amp)
Amp-a-max=amplitude of current in arm motor (amp)
w-r-max=amplitude of rotor angular velocity about rotor axis (rad/sec)
w-a-max=amplitude of arm angular velocity about arm axis (rad/sec)
f=frequency of oscillation of rotor and arm (hz)
phi-r=phase angle between rotor torque and angular velocity waveforms (rad)
phi-a=phase angle between arm torque and angular velocity waveforms (rad)
t=time (sec)
T=1/f=period of oscillation of rotor and arm (sec)
pi=3.14159

21

The mechanical efficiency in percent is expressed as:

$$Eff-mech = P-\text{out}/(P-\text{in}-r + P-\text{in}-a) \times 100$$

where: Eff-mech=efficiency of mechanical power in instrument (%)

When the arm is used as the source of output power, it provides AC power at the oscillation frequency. The input power is supplied by a spindle motor and the rotor motors. The expression for the spindle motor is given by:

$$P-\text{in}-s = M-s * w-s = M-s * (w-s') * (2 * pi/60)$$

$$M-s = Kt-s * Amp-s$$

where: P-in-s=input power from spindle motor (watts)
M-s=torque provided by spindle motor (N-m)
Kt-s=torque constant for spindle motor (N-m/amp)
Amp-s=current in spindle motor (amp)
w-s=spindle rate (rad/sec)
w-s'=spindle speed (rps)

The expression for the rotor motor power to oscillate the rotor is given by:

$$P-\text{in}-r = 2 \times \text{time integral of}$$

$$(M-r-\max * \sin(2 * pi * f * t)) * (w-r-\max * \sin(2 * pi * f * t + phi-r)/T$$

The input power supplied by the rotor motors to the arm is given by:

$$P-r/a-\max =$$

$$2 \times (M-r-\max * \sin(2 * pi * f * t)) * (w-a-\max * \sin(2 * pi * f * t + phi-r/a)$$

where: P-r/a-max=amplitude of power supplied by rotor motor to arm (N-m/sec)
phi-r/a=phase angle between rotor torque and arm angular velocity waveforms (rad)

The input power supplied by centrifugal-forced torque to the arm is given by:

$$P-\text{cent}-\max = (2 \times I-\text{cent} * (w-s)^2 *$$

$$\sin(\text{Theta}-a) * \cos(\text{Theta}-a) * w-a-\max * \sin(2 * pi * f)$$

$$\text{Theta}-a = \text{Theta}-a-\max * \sin(2 * pi * f * t)$$

where: P-cent-max=amplitude of power supplied centrifugal forces (N-m/sec)

I-cent=constant relating spindle speed to centrifugal torque on half-arm (N-m-sec^2)
Theta-a=arm angle (rad)
Theta-a-max=amplitude of arm oscillation (rad)

The power required to oscillate the arm is given by:

$$P-a-osc-\max =$$

$$2 \times (MOI-a * (2 * pi * f * t) * \text{Theta}-a-\max * \sin(2 * pi * f * t)) *$$

$$(w-a-\max * \sin(2 * pi * f * t)$$

where: P-a-osc-max=power required to oscillate arm to Theta-a-max amplitude (watts)
MOI-a=moment of inertia of half arm (N-m-sec^2)

The output power available from the oscillation of the arm is the difference between the total power being applied to the arm and the power required to oscillate the arm. The expression for the output power is given by the equations:

$$P-\text{out} = (P-r/a-avg + P-\text{cent}-avg) - P-a-osc-avg$$

where: P-out=mechanical power available (watts)
P-r/a-avg=contribution of power from rotor motor to oscillate arm (watts)
P-cent-avg=contribution of power from centrifugal forces to oscillate arm (watts)
P-a-osc-avg=power required to oscillate arm to Theta-a-max amplitude (watts)

The input power supplied by a spindle motor and the rotor motors is even by:

$$P-\text{in} = P-\text{in}-s + P-\text{in}-r + P-r/a-\max$$

where: P-in=total input power supplied to operate instrument (watts)

The mechanical efficiency in percent is given by:

$$Eff-mech = P-\text{out}/(P-\text{in}) \times 100$$

III. Select Embodiments of Representative Design Parameters and Performance Calculations of Centrifugal Gyroscopic Devices Table 1 below provides a list of the design parameters and calculated performance for a representative embodiment of the centrifugal gyroscopic device 100 shown in FIGS. 1A-1C.

TABLE 1

| Design Parameter | Calculated Performance and/or User Input (bold + underline) | Units | Notes |
|---|---|---|---|
| General Device Parameters | | | |
| Rotor Inertia | 1.20E−03 | kg-m² | |
| Rotor Radius | 0.10 | m | |
| Rotor Mass | 0.12 | kg | I = mr² Assumes all mass is at |

TABLE 1-continued

| Design Parameter | Calculated Performance and/or User Input (bold + underline) | Units | Notes |
|---|---|---|---|
| | | | radius, ignores motor. |
| Rotor Arm Length | 0.18 | m | Minimum of 2 × (Rotor Radius). |
| Rotor Amplitude | 12.00 | deg | |
| Rotor Amplitude (Radians) | 0.21 | rad | |
| Spindle Frequency | 4.17 | Hz | |
| Spindle RPM | 250 | RPM | |
| Spindle Angular Velocity (W) | 26.20 | rad/s | |
| | For Sinusoidal Motion | | |
| Rotor Position Maximum | 0.21 | rad | |
| Max Rotor Angular Velocity (W) | 5.49 | rad/sec | (Max Rotor Position) × (Spindle W). |
| Max Rotor RPM | 52 | RPM | Convert to RPM. |
| Max Rotor Acceleration | 144 | rad/s$^2$ | (Max Rotor W) × (Spindle W). |
| Max Rotor Torque | 0.17 | N-m | Motor torque required. (Rotor Inertia) × (Max Rotor Acceleration). |
| Rotor Angular Momentum (L) | 0.0132 | kg-m$^2$/sec$^2$ | (2 × Angular Momentum) × (Rotor W (both rotors)). |
| | Rotor Arm | | |
| Arm Amplitude | 3.60 | degrees | |
| Max Arm Position | 0.06 | rad | Amplitude converted to radians. |
| Max Arm Angular Velocity (W) | 1.65 | rad/sec | (Amplitude) × (Spindle W). |
| Arm Acceleration | 43.13 | rad/sec$^2$ | (Max Arm W) × (Spindle W). |
| Arm Inertia from Rotors | 7.52E−03 | kg-m$^2$ | Both rotors (2 m × (Rotor Arm Length)$^2$) |
| | Torques | | |
| Max Torque from Rotors | 0.32 | N-m | Motor torque required to tilt the arm due to acceleration considering rotors only. |
| Estimated Inertia Not Including Rotors | 0.07 | kg-m$^2$ | 4 kg at 0.1 m. |
| Estimated Torque Not Including Rotors | 3.02 | N-m | |
| Max Total Torque | 3.34 | N-m | Total motor torque required to tilt arm (not considering the torque that the rotors and spindle apply to the arm). |
| Arm Moment of Inertia | 0.08 | kg-m$^2$ | Rotors plus estimate of rest of arm. |
| Arm Angular Momentum | 2.03 | kg-m$^2$/sec$^2$ | Angular momentum around spindle. |
| | Centrifugal Forces | | |
| Force at Horizontal | 14.58 | N | On one rotor m × w$^2$ × r |
| Torque from Both Rotors | 2.58 | N-m | Force at horizontal times sin(2 * theta) from 2 * cos(theta) * sin(theta). Torque at 45 degrees. This torque is direction of rotor arm axis. This torque is in a direction to restore the arm to horizontal. |
| Max Gyroscopic Torque on Arm | 0.35 | N-m | (Rotor Angular Momentum) × (Spindle W). Max torque on arm from rotor momentum at horizontal. This torque opposes torque that the arm is applying to the rotor. |
| Max Gyroscopic Torque on Spindle | 0.02 | N-m | (Rotor Angular Momentum) × (Arm W). Max torque on spindle from rotor momentum due to arm movement. |
| | Powers | | |
| Spindle Power | 0.57 | watts | Max instantaneous power @600 RPM = (Gyroscopic torque) × (Spindle W due to arm movement). |
| Rotor Arm Power | 5.50 | watts | Max instantaneous rotor arm power = (Max motor torque required) × (Max Rotor Arm W) |
| Rotor Power | 0.95 | watts | Max instantaneous rotor power = (Max Rotor Torque) × (Max Rotor W) |

TABLE 1-continued

| Design Parameter | Calculated Performance and/or User Input (bold + underline) | Units | Notes |
|---|---|---|---|
| Other Performance Calculations | | | |
| Rotor Inertia Diameter | 6.00E–04 | kg-m$^2$ | Moment of inertia of rotor about diameter. |
| Rotor Arm Torque | 0.01 | N-m | Torque on rotor at max arm velocity. |
| Rotor Spindle Torque | 0.03 | N-m | Torque on rotor at spindle velocity. |
| Centrifugal Force Rotor | 15.22 | N | Thrust force on rotor motor. |
| Rotor Acceleration Torque | 0.03 | N-m | Torque on rotor shaft by rotor accelerating by the arm movement. |

Figure 13A:
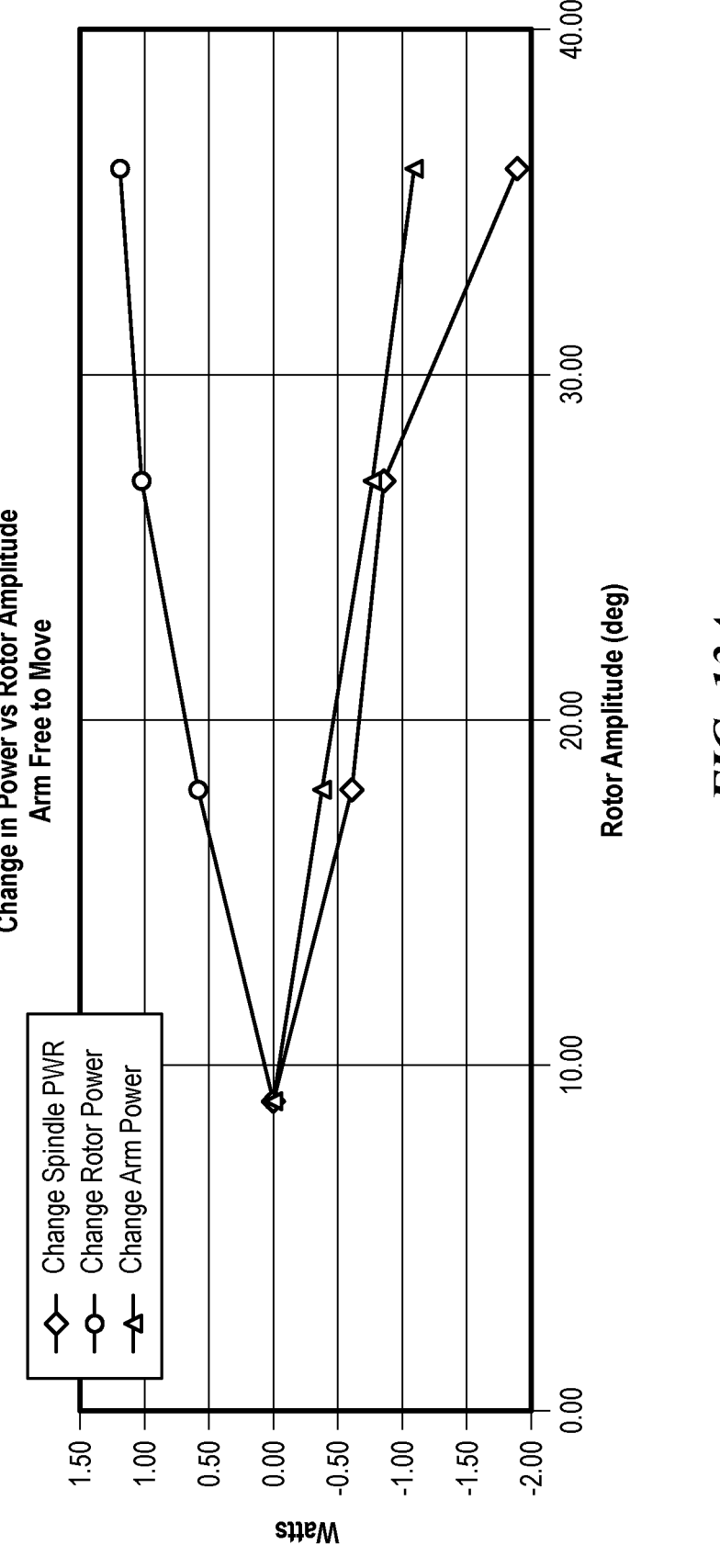
FIG. 13A is a graph illustrating sample test results for the centrifugal gyroscopic device of FIGS. 1A-1C showing the change in mechanical power of the spindle versus the amplitude of oscillation of the rotors.
Figure 13B:
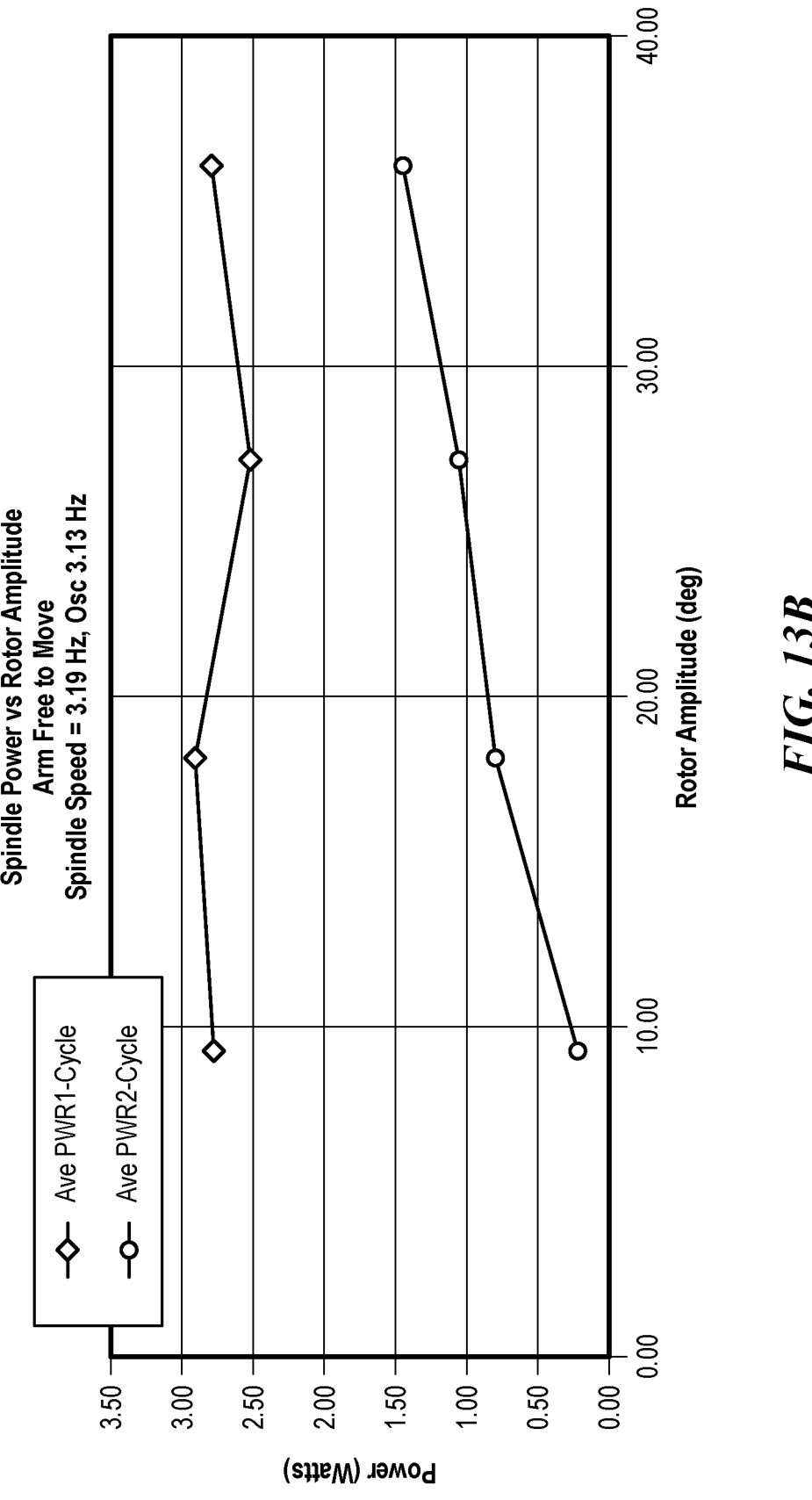
FIG. 13B is a graph illustrating sample test results for the centrifugal gyroscopic device of FIGS. 1A-1C showing the extraction of gyroscopic power from spindle rate harmonics.

FIG. 13A is a graph illustrating sample test results for the centrifugal gyroscopic device 100 having the characteristics described in Table 1 above showing the change in mechanical power of the spindle versus the amplitude of oscillation of the rotors. Table 2 below provides corresponding sample test results showing the change in mechanical power of the spindle versus the amplitude of oscillation of the rotors. FIG. 13B is a graph illustrating sample test results for the centrifugal gyroscopic device 100 having the characteristics described in Table 1 showing the extraction of gyroscopic power from spindle rate harmonics. The data shown in FIGS. 13A and 13B was computed from the measurement of two-cycle torque in the spindle using discrete Fourier transform (DFT) analysis. To produce the test results shown in FIGS. 13A, 13B, and Table 2, the pair of rotors were oscillated in synchrony with each other. The arm oscillated the rotors about an orthogonal axis. The oscillation of the arm was in synchrony with the rotor oscillation. The oscillations generated output gyroscopic torque about the spindle axis. In the testing, the gyroscopic torque was not large enough to overcome the large impediment torques on the spindle, thus requiring aid from the spindle motor. The rotating spindle feeds back gyroscopic and centrifugal torques to amplify the amplitude of arm oscillation. Spindle rate was adjusted for centrical resonance. The test data shows that for certain regions of operation mechanical power output can be greater than the input (e.g., with the rotor amplitude at 18 degrees, 27 degrees, or 36 degrees).

The target position, load position, and current were recorded for the arm assembly 110, the rotors 114, and the controllers (e.g., the controller 148) for the first shaft 120 ("spindle"). The target position was the position that the controller 148 was programmed to attain, and the load position was the actual position of the motor at the time of the sample.

The oscillations generated output gyroscopic torque about the axis A$_1$ of the first shaft 120 (e.g., the spindle). The rotating first shaft 120 fed back gyroscopic and centrifugal torques to amplify the amplitude of oscillation of the arm assembly 110, and the rate of rotation of the first shaft 120 was adjusted for centrifugal resonance. Under some parameters, the mechanical power output appeared greater than the mechanical power input.

Figure 14A:
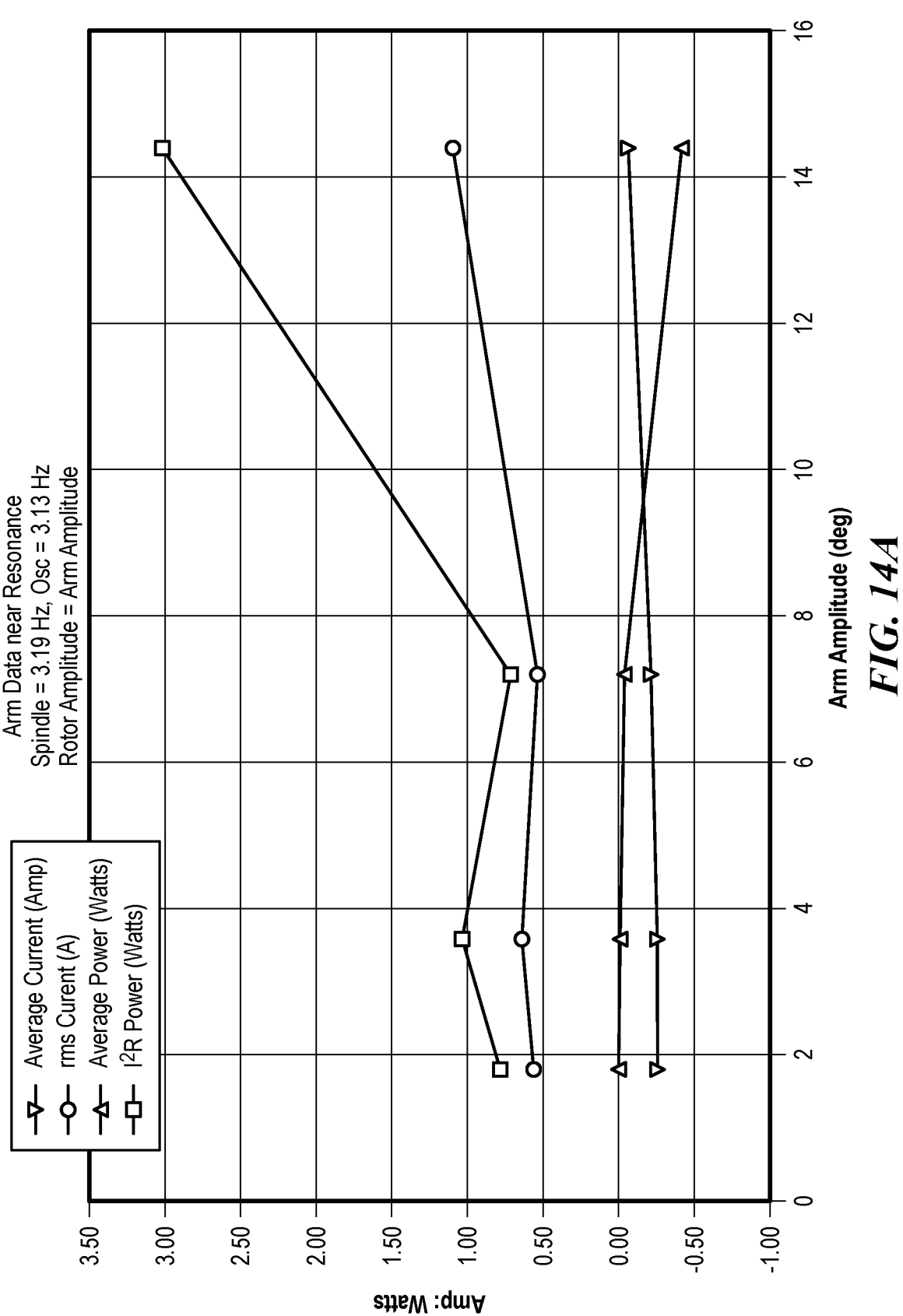
FIGS. 14A-14C are graphs illustrating sample test results for the centrifugal gyroscopic device of FIGS. 1A-1C.

Referring to FIG. 14A, the arm motor controller reported the current provided by the controller every 4 milliseconds. The average current (Amp) is the current samples averaged over an integer number of oscillation cycles in amperes. The fact that this current is negative means that arm is moving in the opposite direction as it normally moves for a current of this sign. The rms current (A) is the root-mean-square value of the recorded current. This number was used to calculate the I$^2$R power (watts). The average power (watts) is the torque (N-m) multiplied by the speed (rad/s). The torque was calculated from the current by multiplying the current by Kt which is the torque constant 0.34 N-m/Amp. In this graph, the average power is negative which means that the mechanical power out of the arm is more than the mechani-

TABLE 2

| Rotor Amplitude (Degrees) | Change in Spindle Power (Watts) | Gyroscopic Power (Watts) | Rotor Power (Watts) | Arm Power (Watts) | Total Input Power (Watts) | Output Power Minus Input Power (Watts) |
|---|---|---|---|---|---|---|
| 9 | 0* (Reference Value) | 0** (Gyroscopic power value unknown) | 0.22 | –0.13 | 0.09 | –0.09 |
| 18 | –0.58 | 0.58 | 0.80 | –0.49 | 0.31 | 0.27 |
| 27 | –0.82 | 0.82 | 1.24 | –0.87 | 0.37 | 0.45 |
| 36 | –1.87 | 1.87 | 1.42 | –1.22 | 0.20 | 1.67 |

Figure 14B:
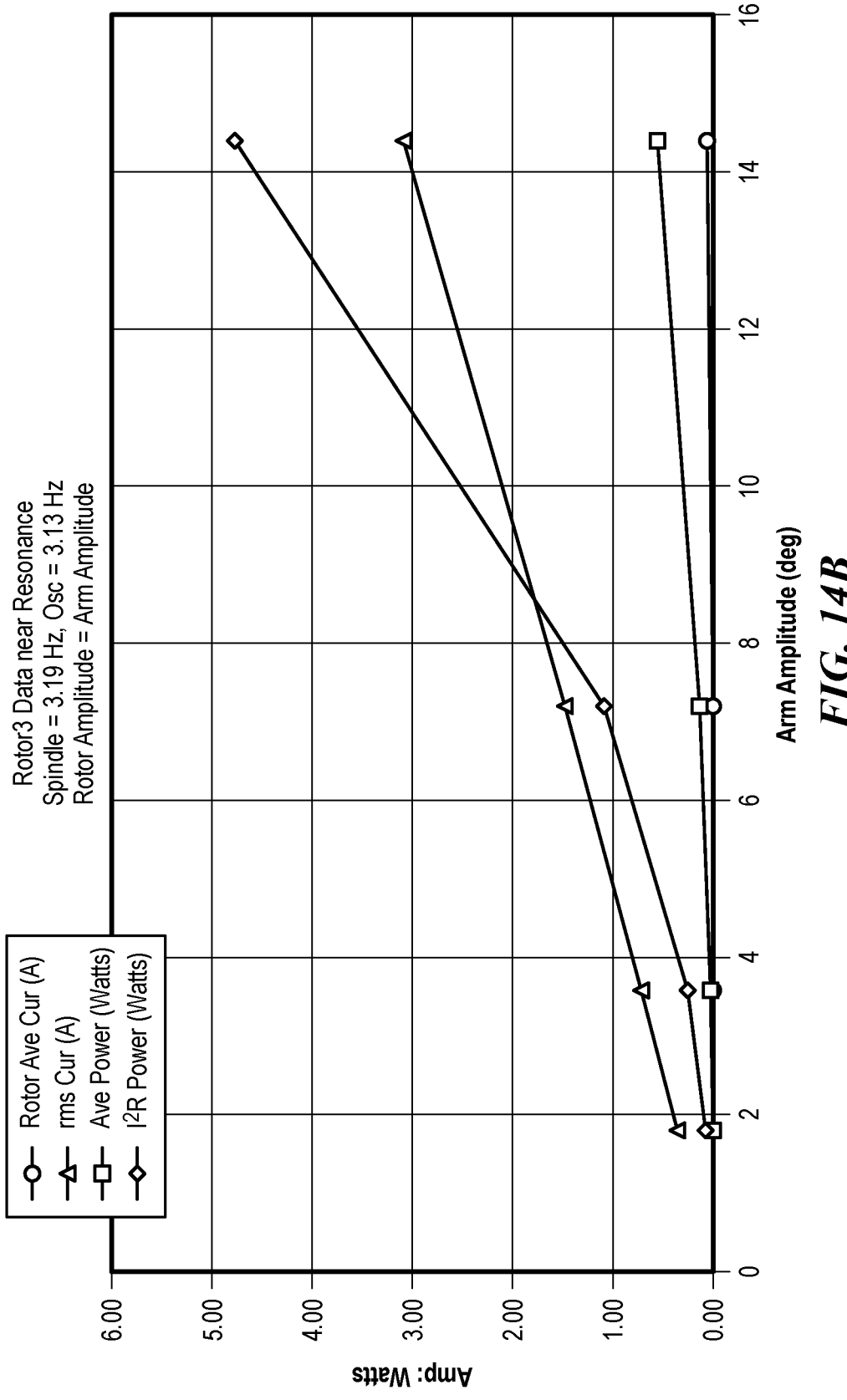
Figure 14C:
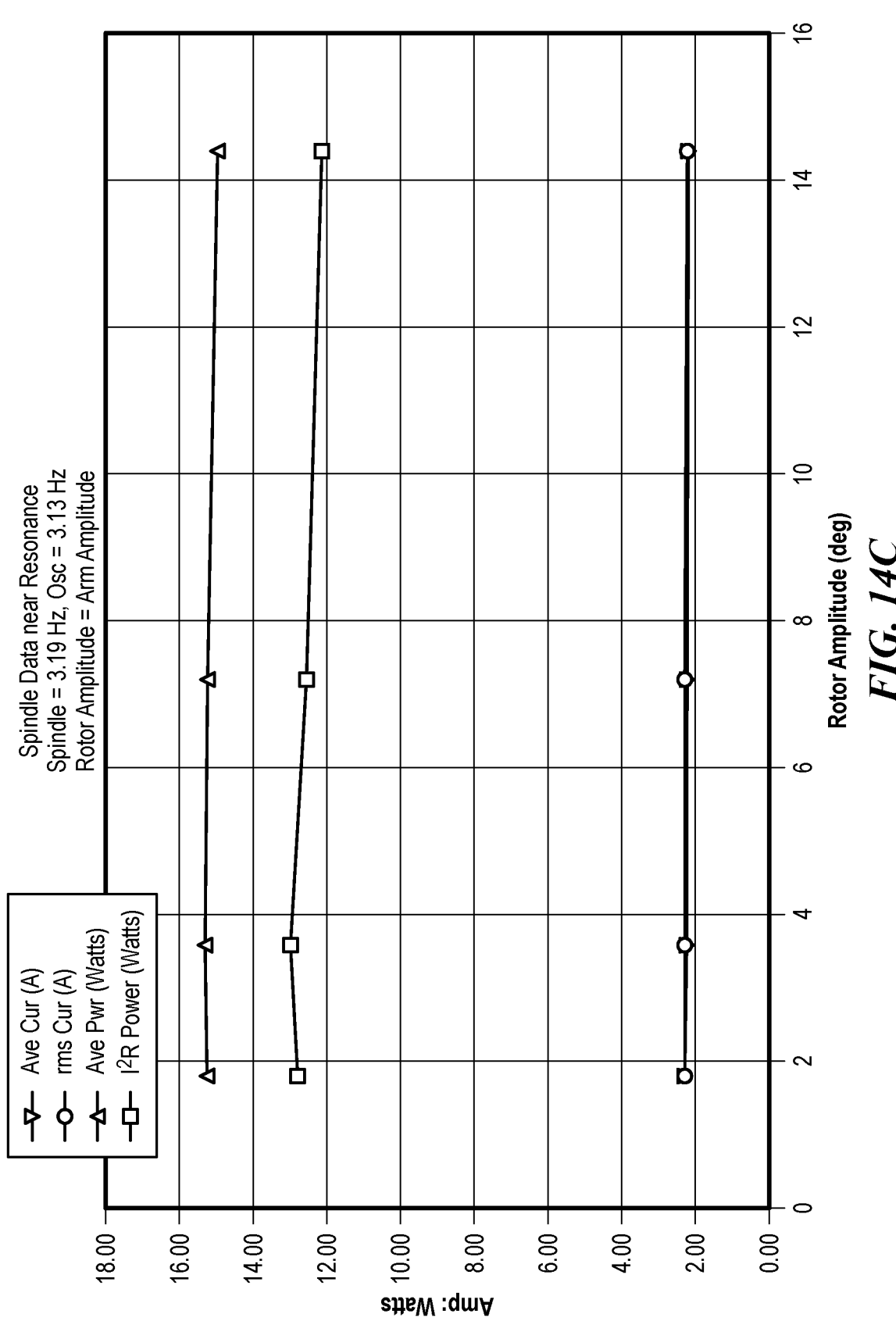

FIGS. 14A-14C are graphs illustrating further sample test results for the centrifugal gyroscopic device 100 having the characteristics described in Table 1 above. During the testing, (i) the pair of rotors 114 ("rotor") were oscillated in synchrony with each other, (ii) the arm assembly 110 ("arm") oscillated the rotors 114 about an orthogonal axis, and (iii) the oscillation of the arm assembly 110 was in synchrony with the oscillation of the rotors 114. Further, the arm assembly 110 and the rotors 114 were oscillated with the same amplitude and frequency and in phase with each other.

cal power (e.g., average current) that the motor controller puts into the arm. I$^2$R (watts) is the power dissipated in the windings of the motor. This is calculated from the rms current squared times the winding resistance.

Referring to FIG. 14B, this graph shows data for one of the rotors at the same settings as the previous graph of arm measurements. The data for position and current were taken at 10 millisecond intervals by the rotor motor controller. The rotor ave cur (A) line is the average of the current measured by the rotor motor controller over an integral number of cycles of the oscillation frequency. The rms cur (A) line is the root-mean-square value of the rotor motor current. This was used to calculate the I²R power that was dissipated in the resistance of the motor windings. The ave power (watts) line is the average of the torque times the velocity of the rotor averaged over an integral number of cycles of the oscillation frequency. The torque was calculated from the current by multiplying the current in amperes by the torque constant of the motor Kt which is 0.06 N/Amp for the rotor motors.

Referring to FIG. 14C, the spindle motor controller logged position and current at 4 milliseconds per sample. The ave cur (A) line is the average of the current over an integral number of cycles of the oscillation frequency. The rms cur (A) line is the root-mean-square of the current. Since the spindle current was always in the same direction, the rms and the average are very close to each other. The ave pwr (watts) line is the torque times the speed of the spindle. The torque is calculated from the current by multiplying the current by Kt which is 0.34 N-m/amp. The I²R pwr (watts) is the power dissipated in the resistance of the windings of the motor.

Notably, the power required of the spindle motor decreased as the amplitude of the oscillation increased. The arm motor also showed a decrease. The rotor motors showed an increase that may, but not necessarily, offset this decrease. If the decrease in spindle power with increasing amplitude is further confirmed, then this can be seen as evidence that the oscillation of the arm and rotors results in power being added to the spindle.

FIGS. 15A-15D are graphs illustrating sample test results for the effects of oscillation of the rotors 114 on movement of the arm assembly 120 of the centrifugal gyroscopic device 100. These effects were studied under two different conditions. First, the arm was held in a position with the motor controller while the rotor was oscillated. The current drawn by the arm motor was used to calculate the torque on the arm. In the second method, the arm motor controller was loaded with code which had the PID gains all set to zero. This allowed the position and current data to be recorded but the controller did not react to the position. The current in this case is the current generated by the motor when it moved under the influence of the rotor motions.

Figure 15A:
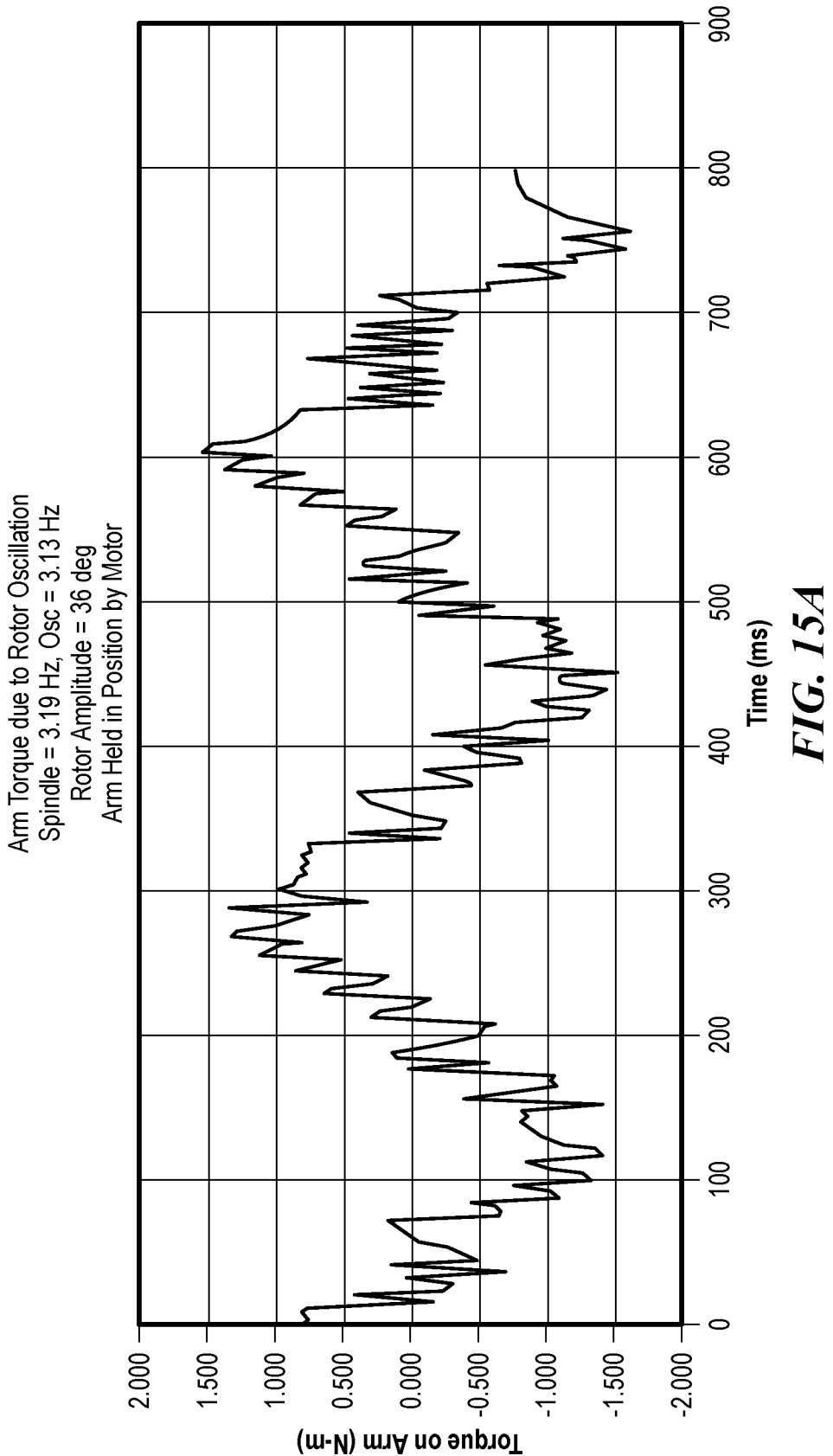
FIGS. 15A-15D are graphs illustrating sample test results for the effects of oscillation of the rotors on movement of the arm assembly of the centrifugal gyroscopic device FIGS. 1A-1C.

Referring to FIG. 15A, this graph shows the arm being held in position by the arm motor. During testing, the position varied only a small amount (+–0.3 degrees) and the speed was nearly zero. This is the torque calculated from the current by multiplying the current by Kt (0.34 N-m/amp). The data shows a gyroscopic torque being applied to the arm due to the oscillation of the rotor combined with the rotation of the spindle.

Figure 15B:
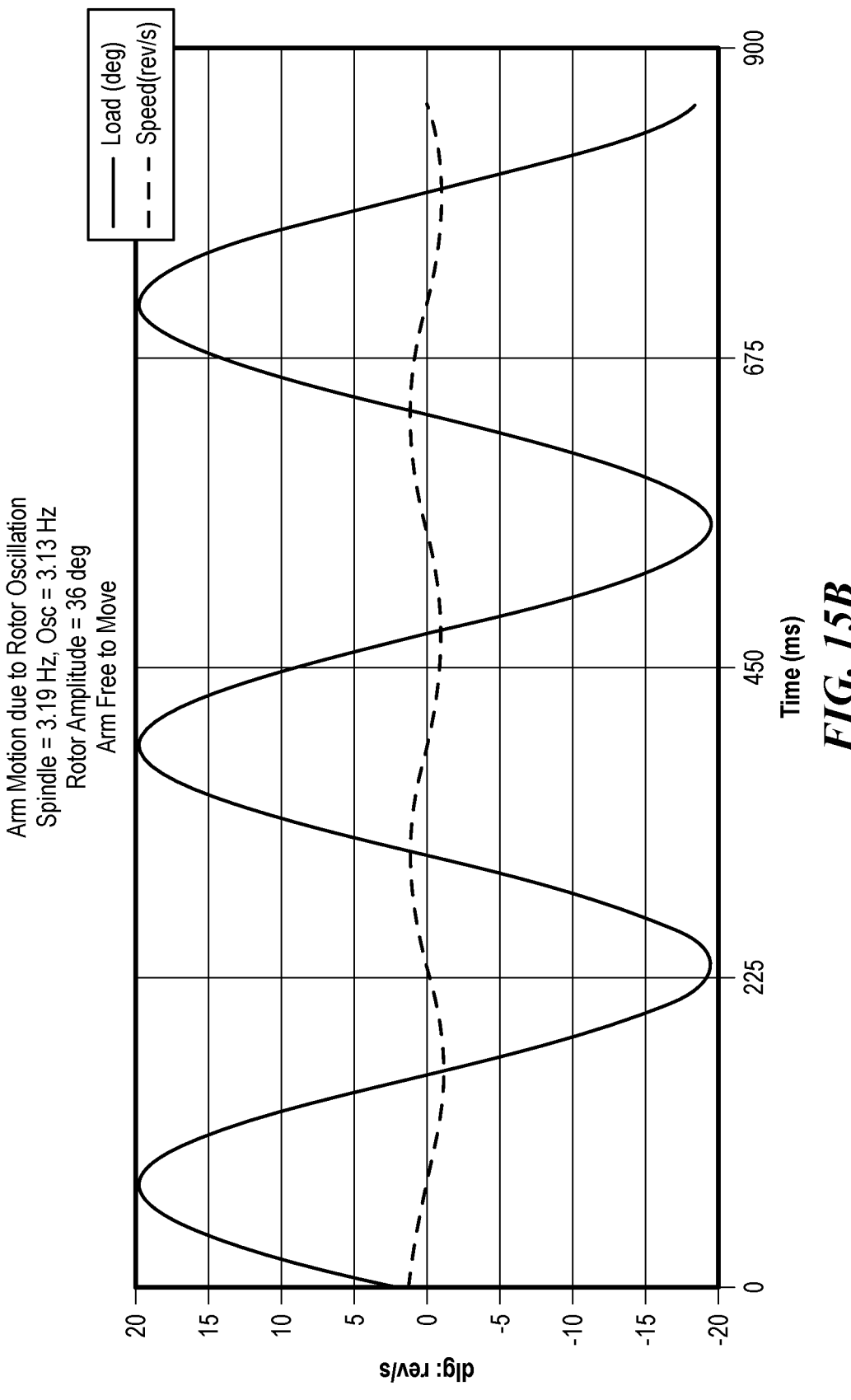

Referring to FIG. 15B, in this case the arm was left free to move and the arm motor controller was loaded with PID gains of zero so that the motion and current could be recorded. This graph shows the arm being oscillated by the influence of the rotor oscillations and spindle rotation.

Figure 15C:
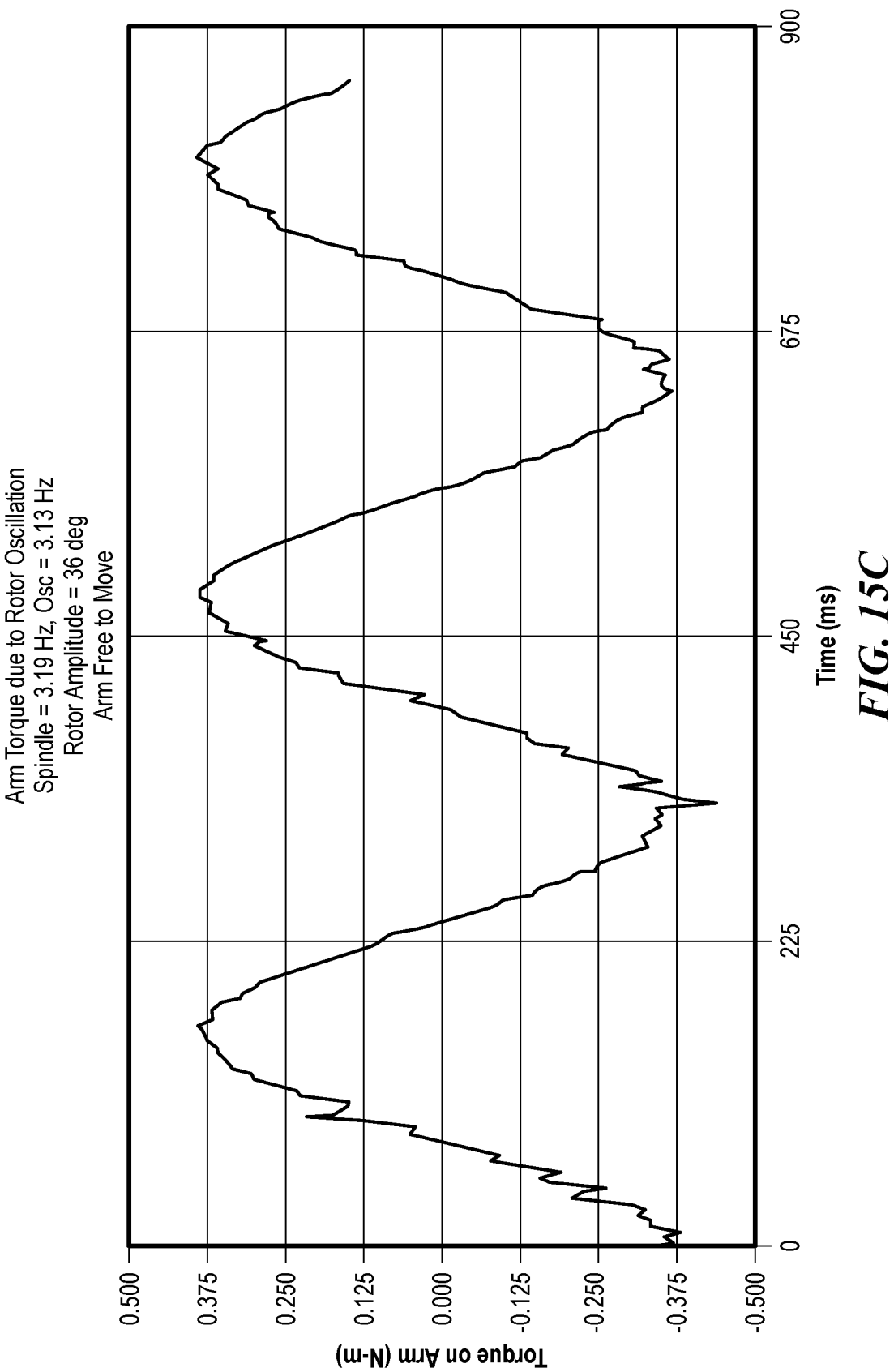

Referring to FIG. 15C, the torque applied to the arm was calculated from the current in the arm by multiplying by Kt (0.34 N-m/Amp) of the arm motor.

Figure 15D:
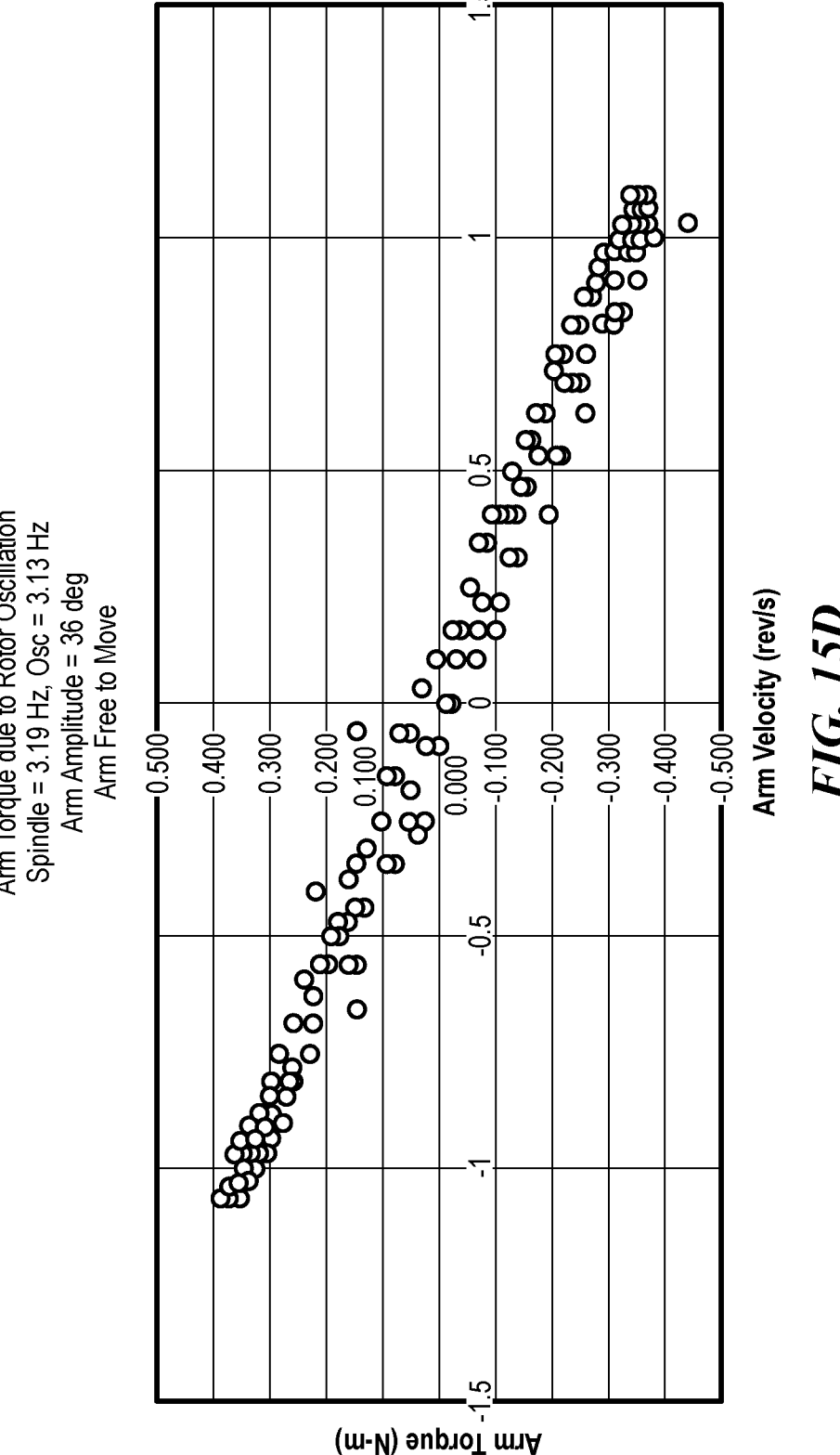

Referring to FIG. 15D, this graph shows a plot of torque versus speed to illustrate whether the device is consuming power or producing power. If the signs of the torque and the speed are the same, the motor is transferring power to the device. If the signs are different, then the device is transferring power to the motor. In the case of the controllers, this transfer of power to the motor may have been wasted by producing heat. In this case the speed and torque have opposite signs, implying that the arm motor is not transferring energy to the device.

FIGS. 16A-16F are graphs illustrating sample test results for the effects of oscillation of the arm assembly 120 on the torque of the rotors 114 of the centrifugal gyroscopic device 100. When the data was collected for the effect of the rotor on the arm motions, the position and current data for the rotor was also collected. This data was collected to determine if the rotors were supplying energy to the arm.

Figure 16A:
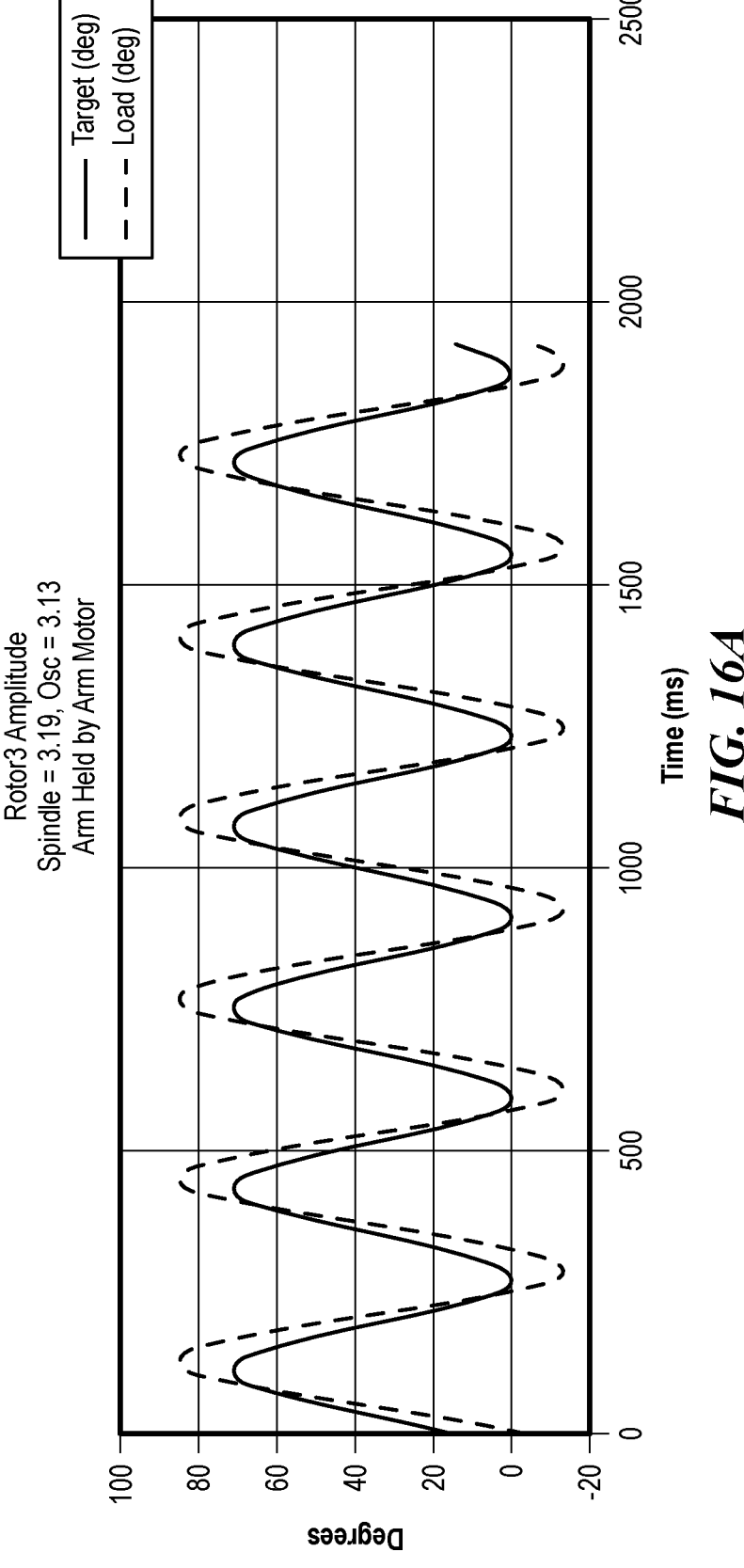

Referring to FIG. 16A, the data in this graph shows one of the rotors oscillating between 0 and 72 degrees. The actual position was arbitrary and was an artifact of the algorithm for generating the oscillation. The oscillation of the rotor can be considered to be oscillating +/–36 degrees. The actual oscillation amplitude is slightly larger than this and the phase lags a little from the programmed target position. In this case, the arm was held in a nearly fixed position while the rotor oscillated, and the spindle rotated.

Figure 16B:
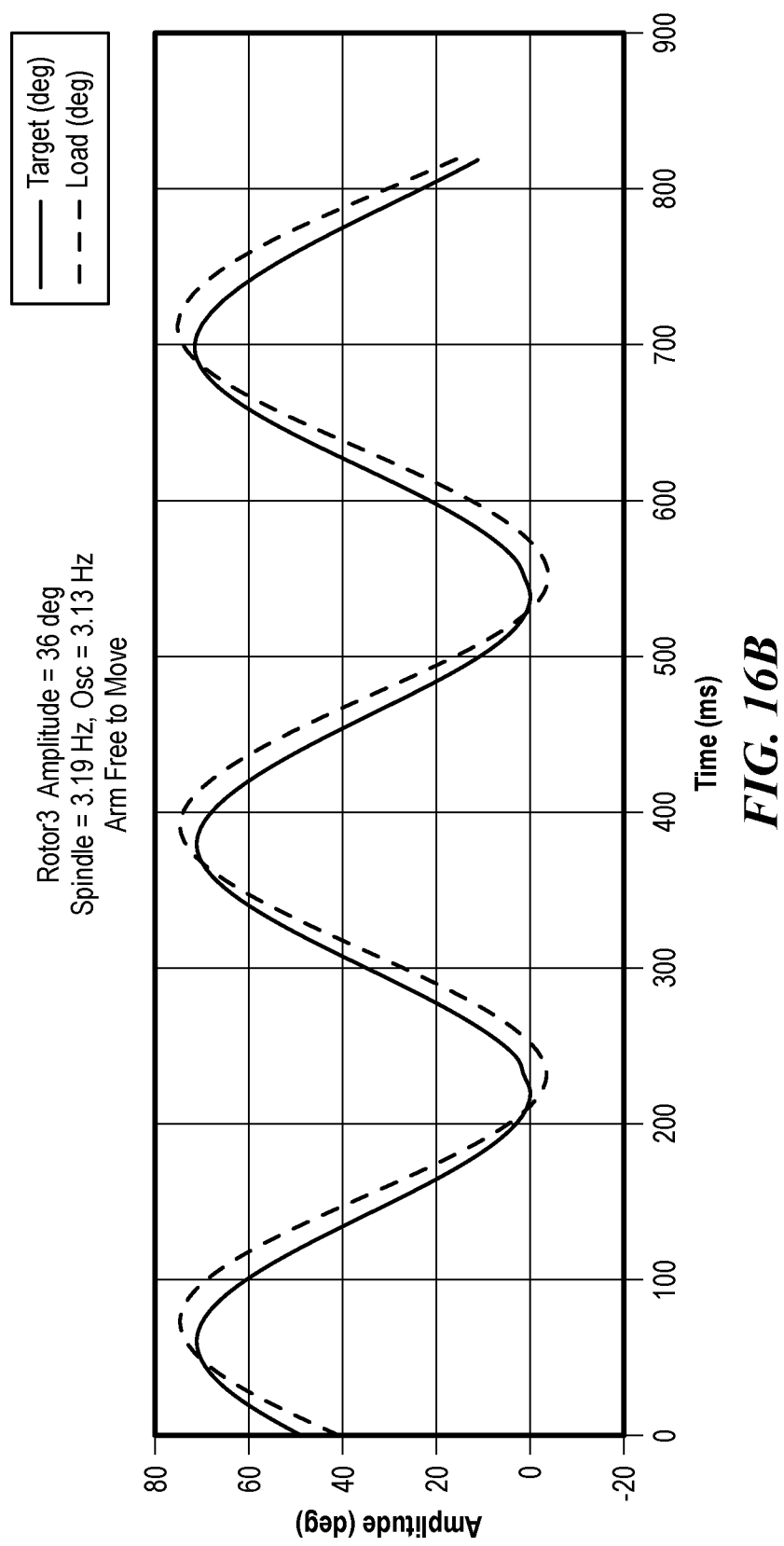

Referring to FIG. 16B, the rotor amplitude decreased when the arm was free to move compared to when the arm was held in position by the arm motor. This could be due to some energy being transferred from the rotor to the arm.

Figure 16C:
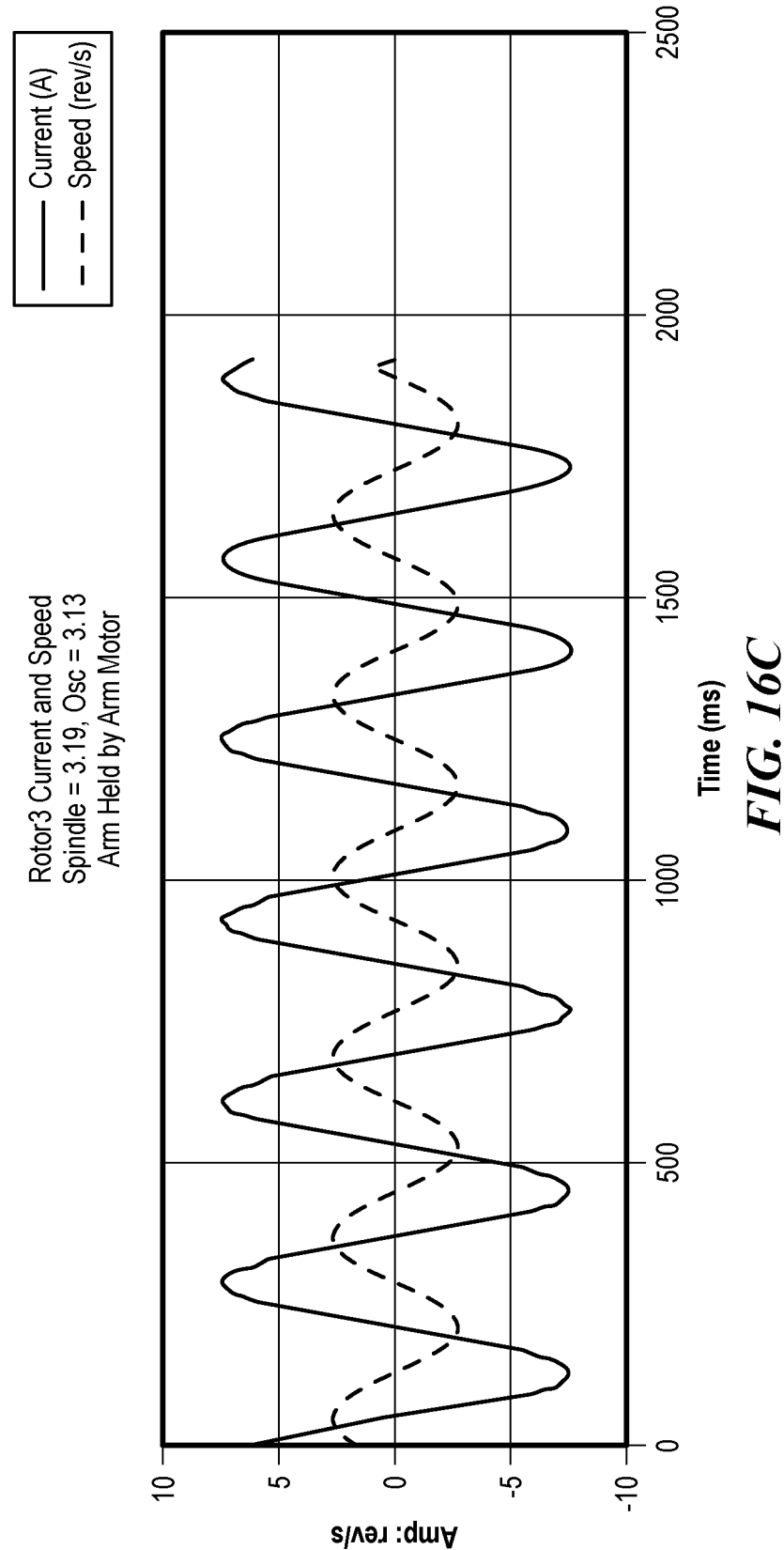

Referring to FIG. 16C, this graph shows current and speed data for the rotor with the arm held in position.

Figure 16D:
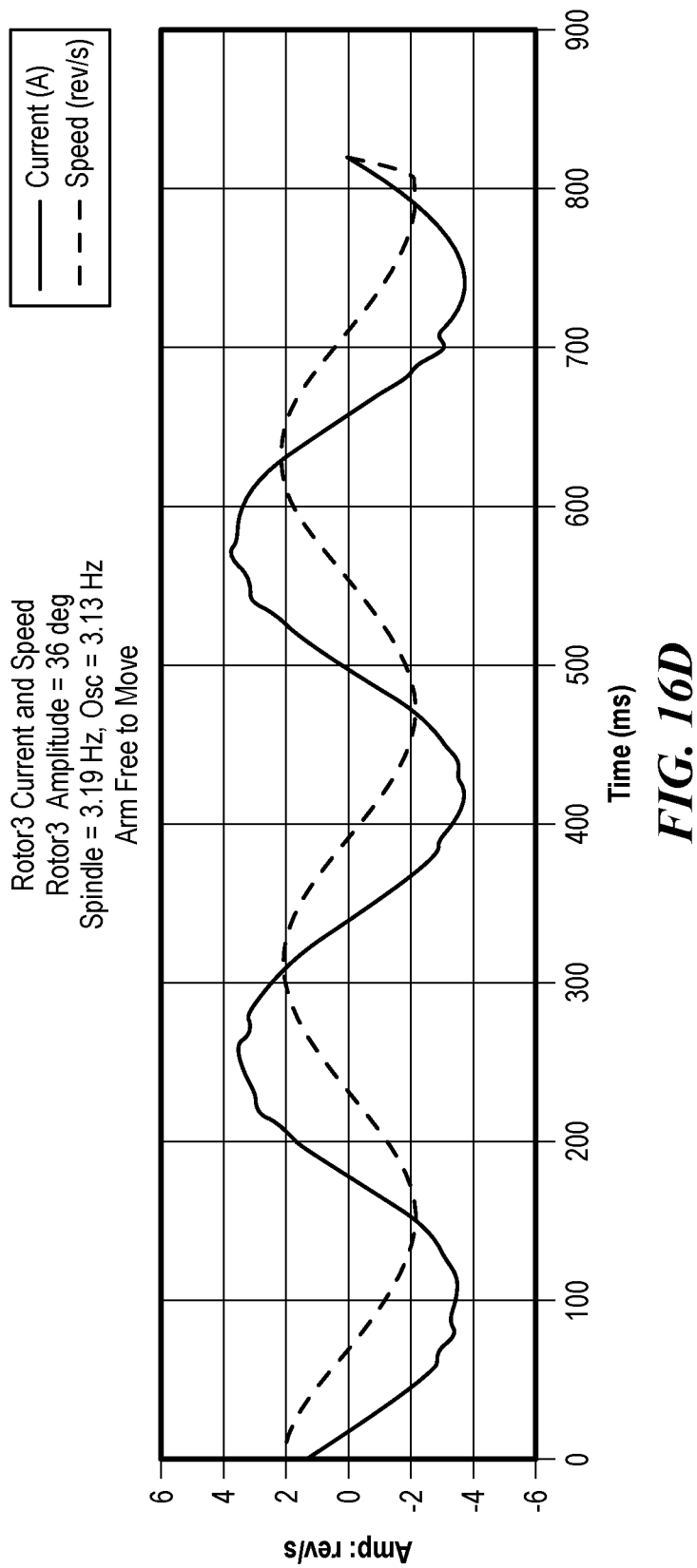

Referring to FIG. 16D, this graph shows the current and speed in the rotor with the arm free to move. The current in the arm was less when the arm is free to move. The graph of torque versus speed shows whether the rotor motor is transferring energy to the device or if the device is transferring energy to the motor. When the signs are the same, the motor is transferring energy to the device. When the signs are opposite, the transfer is the other way.

Figure 16E:
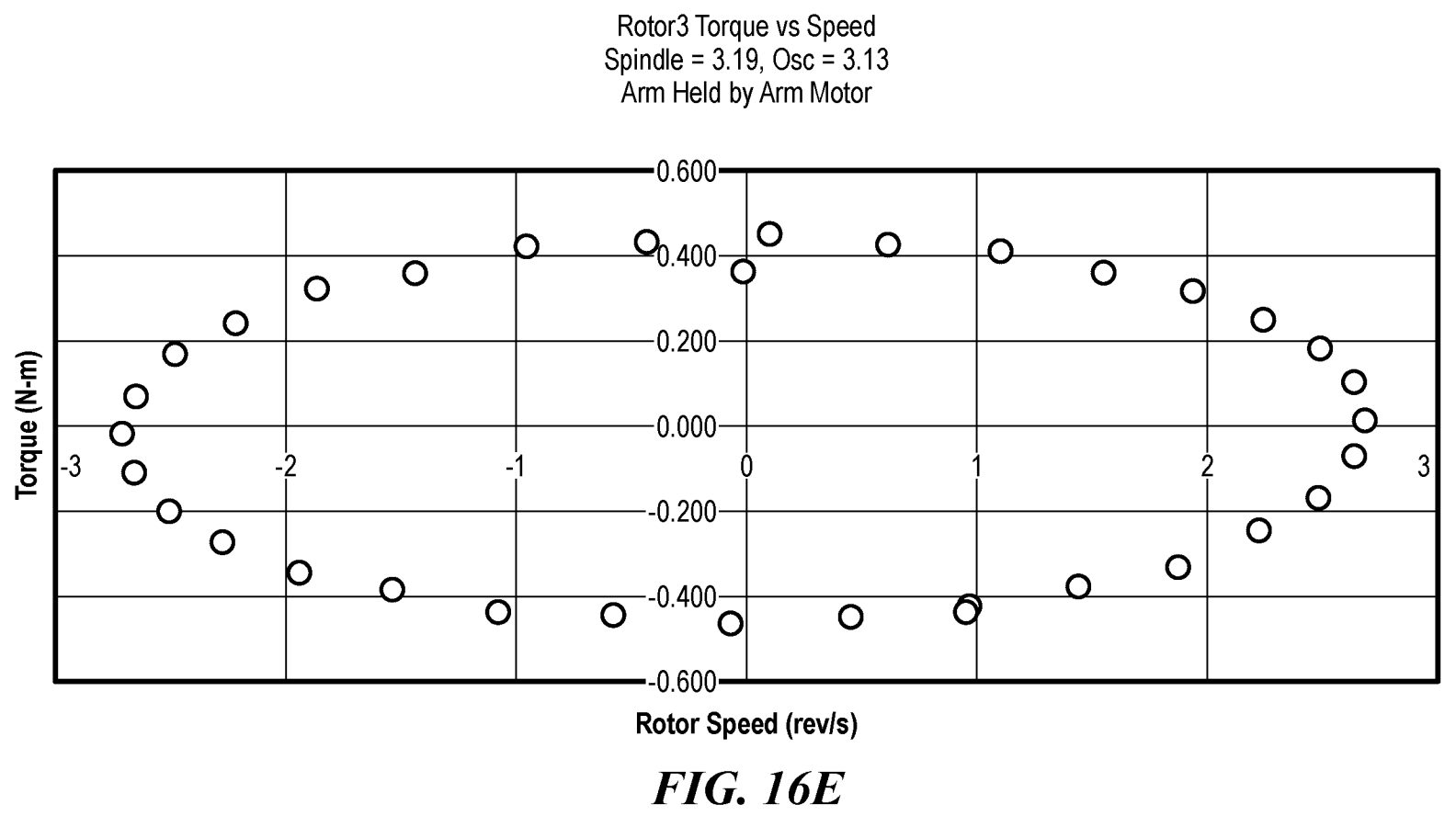

Referring to FIG. 16E, in the case where the arm was held in position by the arm motor, the resulting motion was an ellipse with an equal amount of energy transferred in both directions.

Figure 16F:
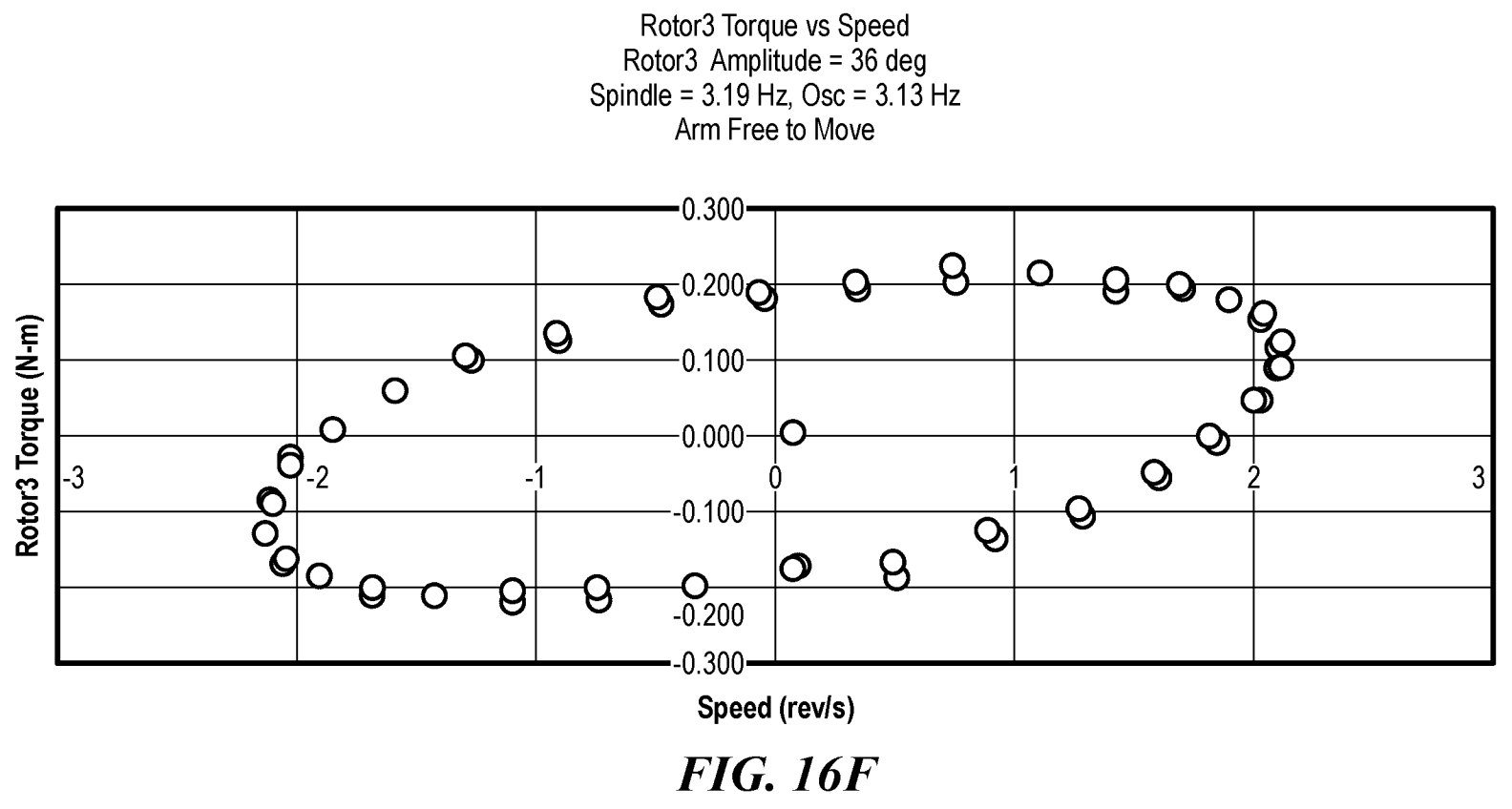

Referring to FIG. 16F, in the case where the arm was free to move, this graph is tilted to put more points in the two quadrants where the signs of the speed and torque are the same. This indicates that more energy is being transferred from the rotor motor to the rotor than is being transferred from the rotor to the motor. This is evidence that the rotor motor is providing energy to the arm motion. Notably, the amplitude of the current oscillation is not the factor that determines the amount of power transferred, but the relative phase of the torque and speed curves, which is confirmed by the fact that the amplitude of the current oscillation was greater in the case when there was little energy transfer from the motor and the amplitude of the current oscillation was smaller in the case when the transfer of energy from the motor to the rotor was greater.

IV. Select Embodiments Of Additional
Representative Characteristics and/or Operational
Parameters pf Representative Elements of
Centrifugal Gyroscopic Devices Table 3 below provides representative characteristics and/or operational parameters of various elements of the centrifugal gyroscopic devices described herein.

TABLE 3

| Representative Element of a Centrifugal Gyroscopic Embodiments of the Present Device in Accordance with Technology | Representative Characteristics and/or Operational Parameters |
|---|---|
| Rotors (e.g., Rotors 114) | Pivotable Movement: +/− 20 degrees at 15 Hertz.<br>Inertia: 12,112.5 grams × cm$^2$ (+/−1%).<br>Geometry: balanced/symmetric around its axis of rotation with majority of mass at outer ring.<br>Position on Rotor Arm: rotors positioned at a distance at least 2× the radius of the rotor from the center of the rotor arm.<br>Average Input Power: 97 watts.<br>Peak Input Power: 195 watts.<br>Rotor Mass: mass of the rotor minimized to increase the rotor arm inertia, and forces on the rotor axis gearbox. E.g., 260 grams.<br>Rotor Diameter: diameter of the rotor impacts the length of the rotor arm due to the requirement of distance from rotor arm center as set forth above.<br>In an example configuration, the motors to generate the rotor motion are straight-line coupled to the rotors. They are also kept toward the center of the arm to reduce rotor arm inertia.<br>Rotor Motor: Kollmorgen BLDC motor modeled in example as: AKM2G-33PL (48 VDC)/Low Voltage DC Drive with a 5:1 gearbox.<br>Rotor Gearbox Axial Force:<br>If the spindle is turning at 900 rpm, the rotor is at radius 25.66, traveling 54 mph, and pulling outward with 133 lb-f or 593 Newton.<br>In this example configuration the rotor is mounted directly to a gearbox, the bearings of the gearbox would be subjected to that axial force.<br>Rotor Gearbox Radial Force:<br>The rotor arm can accelerate/sweep through 21.5 degrees in 0.0166 second.<br>The rotor can be 25.7 centimeters from the center of the rotor arm. The chord length is about 0.096 meter.<br>Assuming a triangular acceleration profile, the acceleration of the rotor is 691.2 meters per second squared, causing a 180 Newton force on the rotor.<br>The distance from the gearbox flange to the rotor center plane can be 5 mm, such that the gearbox tilting torque is 180N × 0.005M = 0.9 N-Meter.<br>Rotor Drive Centrifugal Force:<br>An example of the forces generated by the motor gearbox combination:<br>Total Mass: 2300 gram/5.07 lb (1400 grams motor, 900 grams gearbox).<br>Center of Mass: 13.46 cm from center of arm.<br>Spinning at 900 RPM the motor/gearbox will pull on the coupling tube with 618.2 lb-f/ 2750 Newton.<br>Combined with the rotor pull force of (133 lb-f or 593 Newton) results in 751.2 lb-f 3,343 Newton at each end of center coupler. |
| Rotor Arm (e.g., Arm Assembly 110) | Pivotable Movement: +/−43 degrees at 15 Hertz.<br>Rotor Arm Motor:<br>Rotor Arm Assist Mode: AKM2G-44NL (96 VDC)/Low Voltage DC Drive with a 3.2:1 gearbox.<br>Rotor Arm Start Mode: AKM2G-44NL (96 VDC)/Low Voltage DC Drive with a 12:1 gearbox.<br>Average Input Power: 524 watts.<br>Peak Input Power: 1050 watts. |
| Spindle Shaft (e.g., Spindle 120) | Rotation: 15 revolutions per second or 900 rotations per minute (RPM).<br>Mass: 33,504 grams/74 pounds.<br>Inertia about "Z" axis: 17,128,266 grams × cm$^2$.<br>Spindle Arm: AKM2G-31ML (96 VDC)/Low Voltage DC Drive with an 8:1 gearbox.<br>Average Input Power: 16 watts.<br>Peak Input Power: 125 watts. |

TABLE 3-continued

| Representative Element of a Centrifugal Gyroscopic Embodiments of the Present Device in Accordance with Technology | Representative Characteristics and/or Operational Parameters |
| --- | --- |
| Power Source (e.g., Power Source 142) | The device power will not require 3-phase, not need more than 240 VAC split phase, can operate off standard 120 VAC 10-15 Amp residential AC outlet. |
| Regeneration | Predominantly the motion considered is accelerating and decelerating cyclically. To provide maximum efficiency, energy can be captured during braking/decelerating in capacitors on DC Bus that will provide energy for harvest on next acceleration move. Rotor Regeneration: Rotor Peak Velocity: 400 RPM. Rotor Inertia: 12,112.5 gram × cm$^2$ ‖ 0.00121125 KgM$^2$. Braking Joules: 1.0626 J. decelerating cyclically. Rotor Arm Regeneration: Rotor arm Peak Velocity: 428 RPM. Inertia handled by motor: 59,556 gram × cm$^2$ ‖ 0.00596 KgM$^2$. Braking Joules: 5.986 J. Total Regeneration: For a total of ~14 Joules (Watt-Seconds) to be captured in ¼ cycle (1/60) so average of about 845 watts for 0.0167 seconds. |

V. Additional Examples

The following examples are illustrative of several embodiments of the present technology:

1. A centrifugal gyroscopic device, comprising:
a shaft rotatable about a first axis;
an arm coupled to the shaft and configured to rotate with the shaft, wherein the arm is pivotable about a second axis different from the first axis;
at least one rotor coupled to the arm and configured to pivot with the arm about the second axis, wherein the at least one rotor is further pivotable about a third axis different from the first axis and different from the second axis; and
a control system operably coupled to at least one of the shaft, the arm, and the at least one rotor, wherein the control system is configured to bring the shaft, the arm, and the at least one rotor into at least approximately a resonant mode of operation in which (a) the shaft rotates about the first axis at a rotational rate, (b) the arm oscillates about the second axis at a first frequency, and (c) the at least one rotor oscillates about the third axis at a second frequency at least approximately equal to the first frequency.

2. The centrifugal gyroscopic device of example 1 wherein the first frequency and the second frequency are at least approximately equal to the rotational rate.

3. The device of example 1 or example 2 wherein the control system includes a motor assembly positioned to drive the at least one rotor to oscillate about the third axis at the second frequency.

4. The device of any one of examples 1-3 wherein the oscillation of the arm and the oscillation of the at least one rotor generate a gyroscopic torque which acts to rotate the shaft about the first axis, and wherein the gyroscopic torque is substantially maximized in the resonant mode of operation.

5. The device of example 4 wherein the control system is configured to change a phase relationship between the first frequency of the arm and the second frequency of the at least one rotor to change an average value of the gyroscopic torque.

6. The device of example 4 or example 5 wherein the control system further includes a motor assembly positioned to drive the arm to oscillate about the second axis at the first frequency.

7. The device of example 6 wherein the control system is configured to control the motor assembly to change a phase relationship between the first frequency of the arm and the second frequency of the at least one rotor to change an average value of the gyroscopic torque.

8. The device of any one of examples 1-7 wherein the rotation of the arm generates a centrifugal force that acts to oscillate the arm about the second axis.

9. The device of any one of examples 1-8, further comprising a power generator coupled to the shaft and configured to generate an output power from the rotation of the shaft.

10. The device of any one of examples 1-9, further comprising a power generator coupled to the arm and configured to generate an output power from the pivotable motion of the arm.

11. The device of any one of examples 1-10 wherein the second axis is orthogonal to the first axis.

12. The device of any one of examples 1-11 wherein the third axis is orthogonal to the second axis.

13. The device of any one of examples 1-12 wherein the at least one rotor includes a first rotor coupled to a first end portion of the arm and a second rotor coupled to a second end portion the arm.

14. A method of operating a centrifugal gyroscopic device, the method comprising: rotating a shaft of the centrifugal gyroscopic device about a first axis;
pivoting an arm of the centrifugal gyroscopic device about a second axis different from the first axis, wherein the arm is pivotably coupled to the shaft and configured to rotate with the shaft;

pivoting at least one rotor of the centrifugal gyroscopic device about a third axis different from the first axis and different from the second axis, wherein the at least one rotor is pivotably coupled to the arm and configured to pivot with the arm about the second axis; and controlling the rotation of the shaft, the pivoting of the arm, and/or the pivoting of the at least one rotor to bring the shaft, the arm, and the at least one rotor into a resonant mode of operation in which (a) the shaft rotates at a rotational rate, (b) the arm oscillates about the second axis at a first frequency, and (c) the at least one rotor oscillates about the third axis at a second frequency at least approximately equal to the first frequency.

15. The method of example 14 wherein the first frequency and the second frequency are at least approximately equal to the rotational rate.

16. The method of example 14 or example 15 wherein the method further comprises generating a gyroscopic torque by the oscillation of the arm and the oscillation of the at least one rotor which acts to rotate the shaft about the first axis.

17. The method of example 16 wherein the method further comprises changing a phase relationship between the first frequency of the arm and the second frequency of the at least one rotor to change an average value of the gyroscopic torque.

18. The method of any one of examples 14-17 wherein the method further comprises generating power, with a power generator coupled to the shaft, by the rotating the shaft.

19. The method of any one of examples 14-18 wherein the second axis is orthogonal to the first axis, and wherein the third axis is orthogonal to the second axis.

20. A centrifugal gyroscopic device, comprising:

a spindle rotatable about a first axis;

an arm coupled to the spindle and configured to rotate with the spindle, wherein the arm has a first end portion and a second end portion, and wherein the arm is pivotable about a second axis different from the first axis;

a first rotor coupled to the first end portion of the arm;

a second rotor coupled to the second end portion of the arm, wherein the first rotor and the second rotor are each pivotable about a third axis different from the first axis and different from the second axis; and a control system operably coupled to at least one of the shaft, the arm, the first rotor, and the second rotor, wherein the control system is configured to bring the shaft, the arm, the first rotor, and the second rotor into a resonant mode of operation in which (a) the shaft rotates at a rotational rate, (b) the arm oscillates about the second axis at a first frequency at least approximately equal to the rotational rate, and (c) the first rotor and the second rotor oscillate about the third axis at a second frequency at least approximately equal to the first frequency.

VI. Conclusion

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, other embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the terms "about," "approximately," "generally", "substantially," and the like refer to values within 10% of the stated value. As used herein, the phrase "and/or" as in "A and/or B" refers to A alone, B alone, and A and B. To the extent any materials incorporated herein by reference conflict with the present disclosure, the present disclosure controls. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A centrifugal gyroscopic device, comprising:

a shaft rotatable about a first axis;

an arm coupled to the shaft and configured to rotate with the shaft, wherein the arm is pivotable about a second axis different from the first axis;

at least one rotor coupled to the arm and configured to pivot with the arm about the second axis, wherein the at least one rotor is further pivotable about a third axis different from the first axis and different from the second axis; and a control system operably coupled to at least one of the shaft, the arm, and the at least one rotor, wherein the control system is configured to bring the arm and the at least one rotor into a mode of operation in which (a) the arm oscillates about the second axis at a first frequency and (b) the at least one rotor oscillates about the third axis at a second frequency at least approximately equal to the first frequency.

2. The centrifugal gyroscopic device of claim 1, further comprising a power generator coupled to the arm and configured to generate an output power from the pivotable motion of the arm.

3. The centrifugal gyroscopic device of claim 1 wherein the arm is configured to be coupled to a mechanical device to directly drive the mechanical device.

4. The centrifugal gyroscopic device of claim 1 wherein the control system comprises a motor assembly positioned to drive the at least one rotor to oscillate about the third axis at the second frequency.

5. The centrifugal gyroscopic device of claim 1 wherein the oscillation of the arm and the oscillation of the at least one rotor generate a gyroscopic torque which acts to rotate the shaft about the first axis.

6. The centrifugal gyroscopic device of claim 5 wherein the control system is configured to change a phase relationship between the first frequency of the arm and the second frequency of the at least one rotor to change an average value of the gyroscopic torque.

7. The centrifugal gyroscopic device of claim 1 wherein the second axis is orthogonal to the first axis.

8. The centrifugal gyroscopic device of claim 1 wherein the third axis is orthogonal to the second axis.

9. The centrifugal gyroscopic device of claim 1 wherein the at least one rotor includes a first rotor coupled to a first end portion of the arm and a second rotor coupled to a second end portion the arm.

10. The centrifugal gyroscopic device of claim 1 wherein the control system is further configured to bring the shaft, the arm, and the at least one rotor into the mode of operation in which the shaft rotates about the first axis at a rotational rate that is at least approximately equal to the first frequency and the second frequency.

11. A method of operating a centrifugal gyroscopic device, the method comprising:
   rotating a shaft of the centrifugal gyroscopic device about a first axis;
   pivoting an arm of the centrifugal gyroscopic device about a second axis different from the first axis, wherein the arm is pivotably coupled to the shaft and configured to rotate with the shaft;
   pivoting at least one rotor of the centrifugal gyroscopic device about a third axis different from the first axis and different from the second axis, wherein the at least one rotor is pivotably coupled to the arm and configured to pivot with the arm about the second axis; and
   controlling the rotating of the shaft, the pivoting of the arm, and/or the pivoting of the at least one rotor to bring the arm and the at least one rotor into a mode of operation in which (a) the arm oscillates about the second axis at a first frequency and (b) the at least one rotor oscillates about the third axis at a second frequency at least approximately equal to the first frequency.

12. The method of claim 11, further comprising generating power by the pivoting of the arm with a power generator coupled to the arm.

13. The method of claim 11, further comprising directly driving a mechanical device coupled to the arm via the pivoting of the arm.

14. The method of claim 11 wherein controlling the rotating of the shaft, the pivoting of the arm, and/or the pivoting of the at least one rotor comprises driving the at least one rotor with a motor to oscillate about the third axis at the second frequency.

15. The method of claim 11, further comprising generating a gyroscopic torque by the oscillation of the arm and the oscillation of the at least one rotor which acts to rotate the shaft about the first axis.

16. The method of claim 11, further comprising changing a phase relationship between the first frequency of the arm and the second frequency of the at least one rotor to change an average value of the gyroscopic torque.

17. The method of claim 11 wherein the at least one rotor includes a first rotor coupled to a first end portion of the arm and a second rotor coupled to a second end portion the arm.

18. The method of claim 11 wherein the third axis is orthogonal to the second axis.

19. A centrifugal gyroscopic device, comprising:
   a spindle rotatable about a first axis;
   an arm coupled to the spindle and configured to rotate with the spindle, wherein the arm has a first end portion and a second end portion opposite the first end portion, wherein the arm is pivotable about a second axis different from the first axis, and wherein the first axis is orthogonal to the second axis;
   a first rotor coupled to the first end portion of the arm;
   a second rotor coupled to the second end portion of the arm, wherein the first rotor and the second rotor are each pivotable about a third axis different from the first axis and different from the second axis; and
   a control system operably coupled to at least one of the shaft, the arm, the first rotor, and the second rotor, wherein the control system is configured to bring the arm, the first rotor, and the second rotor into a mode of operation in which (a) the arm oscillates about the second axis at a first frequency and (b) the first rotor and the second rotor oscillate about the third axis at a second frequency at least approximately equal to the first frequency.

20. The centrifugal gyroscopic device of claim 19 wherein the control system comprises a motor assembly positioned to drive the first rotor and the second rotor to oscillate about the third axis at the second frequency.

* * * * *